(12) United States Patent
Neligan et al.

(10) Patent No.: US 12,466,279 B2
(45) Date of Patent: Nov. 11, 2025

(54) HIGH POWER CHARGING STATION

(71) Applicant: Jolt Energy GmbH, Munich (DE)

(72) Inventors: Maurice Neligan, Munich (DE);
Markus Ostermeier, Munich (DE);
Roland Gersch, Munich (DE)

(73) Assignee: Jolt Energy GmbH, Munich (DE)

( * ) Notice: Subject to any disclaimer, the term of this patent is extended or adjusted under 35 U.S.C. 154(b) by 819 days.

(21) Appl. No.: 17/757,378

(22) PCT Filed: Dec. 16, 2020

(86) PCT No.: PCT/EP2020/086437
§ 371 (c)(1),
(2) Date: Jun. 15, 2022

(87) PCT Pub. No.: WO2021/122759
PCT Pub. Date: Jun. 24, 2021

(65) Prior Publication Data
US 2023/0045735 A1 Feb. 9, 2023

(30) Foreign Application Priority Data
Dec. 16, 2019 (EP) .................................... 19216546

(51) Int. Cl.
*B60L 53/31* (2019.01)
*B60L 53/14* (2019.01)
(Continued)

(52) U.S. Cl.
CPC ................ *B60L 53/31* (2019.02); *B60L 53/14* (2019.02); *B60L 53/16* (2019.02); *B60L 53/18* (2019.02);
(Continued)

(58) Field of Classification Search
CPC ....................................................... B60L 53/31
(Continued)

(56) References Cited

U.S. PATENT DOCUMENTS

2019/0305672 A1* 10/2019 Shen .................. H02M 3/1584
2019/0337406 A1 11/2019 Mingenbach et al.
(Continued)

FOREIGN PATENT DOCUMENTS

DE 10 2014 100 957 A1 8/2014
DE 10 2017 215 882 A1 3/2019
(Continued)

OTHER PUBLICATIONS

International Search Report corresponding to International Patent Application No. PCT/EP2020/086437, mailed Mar. 16, 2021 (3 pages).
(Continued)

*Primary Examiner* — Jerry D Robbins
(74) *Attorney, Agent, or Firm* — Maginot, Moore & Beck, LLP

(57) ABSTRACT

A high power charging station used to exchange electrical power with a battery of an electrically powered vehicle by means of a power cable connecting the high power charging station with the vehicle, wherein the high power charging station comprises a DC/DC converter adapted to convert electrical DC power, wherein a suppression of unwanted frequencies generated by the DC/DC converter by means of electronic filters is controlled by a control unit of the high power charging station.

20 Claims, 44 Drawing Sheets

(51) Int. Cl.
| | |
|---|---|
| *B60L 53/16* | (2019.01) |
| *B60L 53/18* | (2019.01) |
| *B60L 53/20* | (2019.01) |
| *B60L 53/30* | (2019.01) |
| *B60L 53/51* | (2019.01) |
| *B60L 53/52* | (2019.01) |
| *B60L 53/53* | (2019.01) |
| *B60L 53/54* | (2019.01) |
| *B60L 53/57* | (2019.01) |
| *B60L 53/62* | (2019.01) |
| *B60L 53/66* | (2019.01) |
| *B60L 53/67* | (2019.01) |
| *B60P 1/54* | (2006.01) |
| *B60P 3/22* | (2006.01) |
| *H02J 7/00* | (2006.01) |
| *B60L 53/302* | (2019.01) |
| *H02J 7/34* | (2006.01) |
| *H02M 3/158* | (2006.01) |

(52) U.S. Cl.
CPC ............. *B60L 53/20* (2019.02); *B60L 53/30* (2019.02); *B60L 53/305* (2019.02); *B60L 53/51* (2019.02); *B60L 53/52* (2019.02); *B60L 53/53* (2019.02); *B60L 53/54* (2019.02); *B60L 53/57* (2019.02); *B60L 53/62* (2019.02); *B60L 53/66* (2019.02); *B60L 53/665* (2019.02); *B60L 53/67* (2019.02); *B60P 1/54* (2013.01); *B60P 3/22* (2013.01); *H02J 7/0042* (2013.01); *H02J 7/007194* (2020.01); *B60L 53/302* (2019.02); *B60L 2240/525* (2013.01); *H02J 7/342* (2020.01); *H02M 3/1582* (2013.01)

(58) Field of Classification Search
USPC ........................................................ 320/109
See application file for complete search history.

(56) References Cited

U.S. PATENT DOCUMENTS

| | | | |
|---|---|---|---|
| 2020/0321797 A1* | 10/2020 | Gerrits | ............... B60L 53/52 |
| 2021/0070138 A1* | 3/2021 | Schumacher | ............ H02J 7/35 |
| 2021/0265977 A1* | 8/2021 | Hubert | ................ H02M 3/335 |
| 2024/0213885 A1* | 6/2024 | Facanha De Oliveira ................ H02M 5/4585 |

FOREIGN PATENT DOCUMENTS

| | | |
|---|---|---|
| WO | 2016/203383 A1 | 12/2016 |
| WO | 2018/204964 A1 | 11/2018 |

OTHER PUBLICATIONS

Extended European Search Report corresponding to European Patent Application No. 19 21 6546, search completed Jun. 17, 2020 (8 pages).

* cited by examiner

Footprint of the portable charging station and the base plate

Symmetry of the interface of the motion redirection mechanism

HIGH POWER CHARGING STATION

PRIORITY CLAIM

This application is a 35 U.S.C. § 371 National Stage Application of PCT/EP2020/086437, filed on Dec. 16, 2020, which claims the benefit of priority to Serial No. 19216546.2, filed on Dec. 16, 2019, in Europe, the disclosures of which are incorporated herein by reference in their entirety.

TECHNICAL FIELD

The invention relates to a high-power charging station for a distributed charging system used to charge batteries of electrically powered devices, in particular electrically powered vehicles, connected to the high-power charging station.

TECHNICAL BACKGROUND

Electro-mobility provided by electrically powered vehicles requires a recharging of the vehicle batteries. A vehicle battery represents a key component of an electrified drive train of the vehicle. A battery system comprises the battery cells, the battery management system including battery cell monitoring, electrical and sensor systems, safety elements, cooling periphery and a housing which determine the efficiency of the electrically powered vehicle. Electric mobility requires affordable, safe and efficient battery storage.

An electric vehicle is any vehicle that comprises at least one electric motor in the power train of the vehicle. The electricity required to power the electric motor is derived from a battery or generated in a fuel cell.

Electric vehicles can comprise vehicles of different categories including battery electric vehicles, plug-in hybrid vehicles and/or fuel cell electric vehicles. A key requirement for electromobility is that the chargeable battery cells of the electrically powered vehicles can be recharged. The recharging of a vehicle battery may take considerable time. With the increasing number of electric vehicles, in particular in an urban environment, the number of available recharging stations cannot easily meet the demand. A further problem of conventional charging stations is that they have to be connected to the urban power supply grid. Most charging stations use alternating current where the recharging or loading of vehicle batteries may require several hours. Consequently, a conventional recharging station can be occupied by a single vehicle connected to the charging station for reloading its batteries for a considerable time so that other vehicles have to wait until they can be connected to the recharging station for reloading of the batteries. Accordingly, there is a need for a new concept to charge batteries of electrically powered vehicles or other mobile devices efficiently.

During charging of the mobile devices, in particular battery powered vehicles, connected to the charging station, electromagnetic protection requirements have to be met.

Accordingly, there is a to provide a high-power charging station which provides electromagnetic protection with minimal electrical losses.

SUMMARY

The invention provides according to a first aspect a high-power charging station used to exchange electrical power with a battery of an electrically powered vehicle by means of a power cable connecting the high-power charging station deployed on ground with the vehicle, wherein the high-power charging station comprises a DC/DC converter adapted to convert electrical DC power, wherein a suppression of unwanted frequencies generated by the DC/DC converter by means of electronic filters of the high-power charging station is controlled by a control unit of the high-power charging station.

In a preferred embodiment of the high-power charging station according to the first aspect of the present invention, the suppression of the unwanted frequencies generated by the DC/DC converter by means of the electronic filters is controlled by the control unit of the high-power charging station depending on electromagnetic requirements of the vehicle notified to the control unit of the high-power charging station.

In this embodiment, the controller of the vehicle can communicate with the control unit of the high-power charging station via a communication link and a communication module to inform the control unit of the high-power charging station about the specific electromagnetic requirements of the respective vehicle.

In a further possible embodiment of the high-power charging station according to the first aspect of the present invention, the high-power charging station comprises a grid connection interface adapted to receive electrical AC power converted by an AC/DC converter of the high-power charging station into a DC power supplied to an input of the DC/DC converter of the high-power charging station.

Also, the AC/DC converter can generate unwanted frequencies which can be suppressed by means of electronic filters of the high-power charging station controlled by the control unit of the high-power charging station.

In a possible embodiment of the high-power charging station according to the first aspect of the present invention, the DC/DC converter and the AC/DC converter of the high-power charging station include switching transistor components which during conversion operation generate switching frequencies and associated harmonic switching frequencies which are suppressed automatically by the electronic filters of the high-power charging station.

In a further possible embodiment of the high-power charging station according to the first aspect of the present invention, the high-power charging station is adapted to operate with a high exchanged electrical power of more than 500 kW.

In a possible embodiment, the high-power charging station is adapted to operate with a high exchanged electrical power of more than 1 Megawatt.

In a further possible embodiment of the high-power charging station according to the first aspect of the present invention, the control unit of the high-power charging station is adapted to communicate via a communication interface module with a controller of the electrically powered vehicle being connected to a charging plug of the high-power charging station by means of the power cable for exchange of electrical power.

In a still further possible embodiment of the high-power charging station according to the first aspect of the present invention, the high-power charging station is connected via the grid connection interface to a local power supply grid or to a public power supply grid.

In a still further possible embodiment of the high-power charging station according to the first aspect of the present invention, the control unit of the high-power charging station receives a power supply from a battery pack integrated in the high-power charging station or from an auxiliary battery integrated in the high-power charging station or attached to the high-power charging station or from a battery of a mobile device of a vehicle connected to the high-power charging station.

In a still further possible embodiment of the high-power charging station according to the first aspect of the present invention, the high-power charging station comprises a first controllable switch which is provided to switch the at least one battery pack of the high-power charging station either directly to an input of the first DC/DC converter or indirectly via a power path including a second DC/DC converter connected in series with a first electronic filter.

In a still further possible embodiment of the high-power charging station according to the first aspect of the present invention, the high-power charging station further comprises a second controllable switch provided to connect or disconnect an output of the AC/DC converter being connected in series with a second electronic filter to the grid connection interface from the input of the first DC/DC converter.

In a still further possible embodiment of the high-power charging station according to the first aspect of the present invention, the high-power charging station further comprises a third controllable switch which is provided to switch the output of the first DC/DC converter either directly or indirectly via an electronic filter of a group of parallel electronic filters to a charging plug of the high-power charging station for connection via the power cable to the battery of the electrically powered vehicle.

In a further possible embodiment of the high-power charging station according to the first aspect of the present invention, the controllable first, second and third switch are controlled by a control program executed on a processor of the control unit of the high-power charging station.

In a still further possible embodiment of the high-power charging station according to the first aspect of the present invention, the control unit of the charging station is adapted to receive via the communication module information concerning electromagnetic protection requirements and information concerning a maximum admissible charging current of the vehicle from the controller of the electrically powered vehicle being connected to the charging plug of the high-power charging station by means of the power cable, wherein the information concerning the electromagnetic protection requirements of the vehicle indicate required signal attenuations for specific frequency ranges and wherein the information concerning the vehicle's maximum admissible charging current indicates a maximum charging current amplitude to avoid overheating of the vehicle's power electronics and/or the vehicle's battery during the power exchange by means of the power cable.

In a still further possible embodiment of the high-power charging station according to the first aspect of the present invention, the vehicle's maximum charging current is calculated continuously by the controller of the vehicle based on sensor data provided by sensors, in particular by temperature sensors, of the vehicle and then communicated via the communication module to the control unit of the high-power charging station.

In a still further possible embodiment of the high-power charging station according to the first aspect of the present invention, the control unit of the high-power charging station is adapted to determine a charging current as the minimum of the communicated vehicle's maximum charging current and the charging station's momentary maximum charging current and to control the suppression of unwanted frequencies generated by switching transistor components of the DC/DC converters and/or by the switching transistor components of the AC/DC converter by means of the electronic filters with minimum electrical power losses on the basis of the determined charging current and on the basis of the received information concerning the electromagnetic protection requirements of the vehicle.

In a further possible embodiment of the high-power charging station according to the first aspect of the present invention, the high-power charging station comprises a portable high-power charging station which can be deployed by a lifting mechanism of a transport unit of a distributed charging system on ground or placed on a base frame of the distributed charging system to establish electrical connection with a local power supply grid or with a public power supply grid via the grid connection interface of the high-power charging station.

In a further possible embodiment of the high-power charging station according to the first aspect of the present invention, the electronic filters used for suppression of the unwanted frequencies comprise electronic power filters with electronic power components including coils, capacitors and resistors.

In a possible embodiment of the high-power charging station according to the first aspect of the present invention, the electronic power filters of the high-power charging station comprise components having filter characteristics adjustable by the control unit of the high-power charging station, in particular having filter characteristics being adjustable depending on the electromagnetic requirements of the vehicle notified to the control unit of the high-power charging station.

The invention further provides according to a further aspect a method for energy efficient suppression of electromagnetic disturbances caused by one or more converters of the high-power charging station used to exchange electrical power with a battery of a vehicle connected to the high-power charging station, wherein suppression of unwanted frequencies generated by the converters by means of electronic filters is controlled by a control unit of the high-power charging station.

In a possible embodiment of the method for energy efficient suppression of electromagnetic disturbances, the suppression of unwanted frequencies generated by the converters by means of electronic filters is controlled by the control unit of the high-power charging station depending on electromagnetic protection requirements of the vehicle notified by a controller of the vehicle to the control unit of the high-power charging station via a communication link.

The invention provides according to a further aspect a computer-implemented method for increasing safety during charging of a battery of a vehicle by a charging station wherein the method comprises the steps of: calculating a forecast value for a maximum safe charging current by the controller of the vehicle based on sensor data generated by sensors of the vehicle and adjusting the charging current provided by the charging station in response to the forecast value of the maximum safe charging current.

In a possible embodiment of the computer-implemented method for increasing safety during charging of a vehicle battery of a vehicle by the charging station, first, a communication link is established between a control unit of the charging station and the controller of the vehicle. After the communication link has been established, the forecast value for the maximum safe charging current is calculated by the controller of the vehicle based on the sensor data generated by the sensors of the vehicle, wherein the calculated forecast value for the maximum safe charging current is communicated by the controller of the vehicle via the established communication link to the control unit of the charging station. Finally, the charging current provided by the charging station is adjusted by the control unit of the charging station in response to the communicated forecast value of the maximum safe charging current.

In a possible embodiment of the computer-implemented method, the sensor data comprises temperature sensor data generated by temperature sensors provided at measurement points including measurement points at the vehicle battery, connectors of the vehicle battery, of the vehicle's (6) charging socket and at power electronic components of the vehicle.

In a still further possible embodiment of the computer-implemented method, the control unit communicates with the controller of the vehicle via a wired or wireless communication link through a communication module of the charging station.

In a still further possible embodiment of the computer-implemented method, the currently observed rate of change in the temperature is calculated by the controller of the vehicle on the basis of the temperature sensor data generated by the temperature sensors of the vehicle.

In a still further possible embodiment of the computer-implemented method, a temperature forecast for each measurement point is calculated by the controller of the vehicle by extrapolation on the basis of the rate of change of the temperature at the respective measurement point.

In a still further possible embodiment of the computer-implemented method, a forecast maximum safe charging current is determined by the controller of the vehicle iteratively based on the calculated temperature forecasts for the different measurement points and communicated to the control unit of the charging station via the established communication link.

In a further possible embodiment of the computer-implemented method, the control unit of the charging station and the controller of the vehicle monitor continuously the communication link established between them.

In a still further possible embodiment of the computer-implemented method, a forecast maximum safe charging current value is communicated by the controller of the vehicle to the control unit of the charging station periodically every 10 to 100 msecs.

In a still further possible embodiment of the computer-implemented method, the charging current is provided by a DC/DC converter of the charging station controlled by the control unit of the charging station in response to the communicated forecast value of the maximum safe charging current.

In a further possible embodiment of the computer-implemented method, the DC/DC converter of the charging station converts a DC power provided by the at least one battery pack of the charging station or a DC power provided by an AC/DC converter of the charging station into a DC power supplied as the charging current to the vehicle battery of the vehicle via a power cable.

In a further possible embodiment of the computer-implemented method according to the present invention, the amplitude of the charging current provided by the charging station is in a range between 100 Ampere and 1500 Ampere to provide a charging power of more than 1 Megawatt.

The invention provides according to a further aspect a charging station comprising a control unit adapted to receive continuously forecast values for a maximum safe charging current via a communication link from a controller of a vehicle connected to the charging station via a power cable for charging the vehicle's battery in a charging process and adapted to adjust automatically the charging current provided by the charging station via the power cable to the vehicle battery during the charging process in response to the received forecast values.

In a possible embodiment of the charging station, a successful continuous transmission of forecast values is monitored by the control unit of the charging station and/or by the controller of the vehicle during the charging process.

In a further possible embodiment of the charging station according to the present invention, the charging station comprises a communication module adapted to establish a communication link with the controller of the vehicle to receive forecast values for a maximum safe charging current periodically every 10 to 100 msecs.

In a further possible embodiment of the charging station according to the present invention, the received forecast values for a maximum safe charging current are stored in a data memory and processed by a processor of the control unit of the charging station to determine an admissible amplitude of the electrical charging current supplied by the charging station via the power cable to the vehicle battery of the vehicle.

The invention further provides according to a further aspect a transport unit for a distributed charging system comprising a charging station transportable by the transport unit, wherein the transport unit comprises a lifting mechanism adapted to lift a fluid exchanger onto a base frame of the charging system installed on a ground floor.

In a possible embodiment of the transport unit, the fluid exchanger lifted on a base frame by a lifting mechanism of the transport unit is adapted to exchange a cooling fluid with a fluid tank connected to the base frame via pipes.

In a further possible embodiment of the transport unit of the distributed charging system, the fluid exchanger lifted by the lifting mechanism of the transport unit comprises an integrated fluid pump connected via one or more tubes to at least one fluid tank of the transport unit.

In a further possible embodiment of the transport unit of the distributed charging system, the fluid pump integrated in the fluid exchanger lifted by the lifting mechanism of the transport unit is adapted to pump fluid from the fluid tank of the transport unit into the fluid tank at the base frame or is adapted to pump fluid in the opposite direction from the fluid tank of the base frame into the fluid tank of the transport unit in response to a control signal received from a controller of the fluid exchanger.

In a further possible embodiment of the transport unit of the distributed charging system, the controller of the fluid exchanger is adapted to communicate with a remote-control unit handheld by a user or integrated in the transport unit or with a local control unit of a local power supply grid.

In a further possible embodiment of the transport unit of the distributed charging system, the fluid exchanger lifted by the lifting mechanism of the transport unit has a housing comprising a lifting interface unit connectable to the lifting mechanism of the transport unit.

In a further possible embodiment of the transport unit of the distributed charging system, the housing of the fluid exchanger comprises fluid ports adapted to provide a connection with fluid ports of a base frame when the fluid exchanger is lifted by the lifting mechanism of the transport unit on the base frame such that fluid can either be pumped from the fluid tank of the transport unit into the fluid tank at the base frame or can be pumped in the opposite direction from the fluid tank of the base frame into the fluid tank of the transport unit.

In a further possible embodiment of the transport unit of the distributed charging system, the controller of the fluid exchanger lifted by the lifting mechanism of the transport unit is adapted to communicate with a control unit of the base frame to control pumps provided at the fluid tank located at the base frame.

In a further possible embodiment of the transport unit of the distributed charging system, the fluid tanks of the transport unit and/or the fluid tank at the base frame comprise sensors adapted to measure a filling level of the fluid tanks and/or a fluid temperature of the fluid contained in the fluid tanks, wherein the filling levels and/or fluid temperatures are communicated to a fluid temperature control unit at the base frame and/or to the controller of the fluid exchanger.

In a further possible embodiment of the transport unit of the distributed charging system, a fluid pump rate of a fluid pump of the fluid exchanger is controlled by the controller of the fluid exchanger depending on the measured filling levels of the fluid tanks of the transport unit and the measured filling levels of the fluid tank at the base frame and/or depending on the measured fluid temperatures of the fluid contained in the fluid tanks of the transport unit and the measured fluid temperature of the fluid contained in the fluid tank of the base frame.

The invention provides according to a further aspect a distributed charging system comprising a plurality of charging stations transportable by charging station transport unit, wherein each charging station transport unit has at least one lifting mechanism adapted to lift at least one charging station deployed on a ground floor onto a transport platform of the charging station transport unit for transport to another location, wherein each transportable charging station has at least one battery pack with rechargeable battery cells adapted to store electrical energy which is used to charge batteries of electrically powered vehicles connected to charging stations of at least one local power supply grid (microgrid).

The housing of the portable charging station can comprise a ground locking interface unit adapted to lock the charging station mechanically and/or electrically to a base frame installed on the ground floor. The housing of the portable charging station can also be deployed directly on the ground floor.

The charging station transport unit can comprise a charging station transport truck with a transport platform adapted to transport several charging stations between locating of distribute local power supply grids and at least one energy center for recharging.

The transportable charging stations used by the distributed charging system according to the first aspect of the present invention allow for fast charging of rechargeable batteries of electrically powered vehicles when connected, e.g., via a power cable to the charging station of a local power supply grid (microgrid). This is possible since the transportable charging stations of the distributed charging system according to the first aspect of the present invention can employ DC (direct current) charging or recharging batteries of connected electrically powered vehicles.

A further advantage of the distributed charging system according to the first aspect of the present invention is that the transportable charging stations when deployed directly on the ground floor do not require an electrical connection to a local or public power supply grid. Consequently, the transportable charging stations can be deployed in any environment or location without any requirements concerning the existing infrastructure.

Since the charging stations are transportable, they can be easily brought to a location where a current demand for recharging of vehicle batteries or batteries of other mobile devices does exist. Consequently, the distributed charging system according to the first aspect of the present invention provides a maximum of flexibility to meet a demand of electrically powered vehicles or other mobile device (e.g., mobile phones) for recharging of their batteries. Further, the distributed charging system according to the first aspect of the present invention is easily scalable to an increasing demand and/or number of electrically powered vehicles within a predefined area such as a city or country. These electrically powered vehicles include e-cars but also e-bikes.

In a possible embodiment of the distributed charging system according to the first aspect of the present invention, the at least one base frame is connected to a local power supply grid (microgrid) or to a public power supply grid to provide electrical current via the electrical contacts of the ground locking interface unit and power supply lines to a battery loading circuitry of the deployed transportable charging station.

In a further possible embodiment of the distributed charging system according to the first aspect of the present invention, the ground locking interface unit of the transportable charging station comprises a remote-controlled or automatic mechanical locking mechanism adapted to lock the housing of the transportable charging station mechanically to a base frame of a local power supply grid or to a base frame on a transport platform of a transport unit such as a transport truck.

In a further possible embodiment of the distributed charging system according to the first aspect of the present invention, the local power supply grid (microgrids) comprises at least one power generation unit adapted to generate electrical energy locally at the site of the base frame.

In a possible embodiment of the distributed charging system according to the first aspect of the present invention, the power generation unit can comprise at least one photovoltaic panel and/or at least one wind turbine.

In a further possible embodiment of the distributed charging system according to the first aspect of the present invention, the locally generated electrical energy is used to charge battery cells of at least one battery pack of a charging station connected electrically to the local power supply grid via a base frame.

In a further possible embodiment of the distributed charging system according to the first aspect of the present invention, the locally generated electrical energy is used to perform a local load balancing between different charging stations connected electrically via the base frame to the respective local power supply grid.

In a further possible embodiment of the distributed charging system according to the first aspect of the present invention, the locally generated electrical energy is fed into a public power supply grid connected to said base frame.

In a possible embodiment of the distributed charging system according to the first aspect of the present invention, each transportable charging station comprises at least one lifting interface unit provided at a housing of the transportable charging station and used by the lifting mechanism of the charging station transport unit to lift the charging station on the transport platform of the charging station transport unit for transport to another location. The transport unit comprises a transport truck or another transport unit such as a transport train.

In a possible embodiment of the distributed charging system according to the first aspect of the present invention, the lifting interface unit of the transportable charging station comprises at least one fixture provided for lifting the housing of the charging station by a crane of the lifting mechanism of the charging station transport unit.

In a further possible embodiment of the distributed charging system according to the first aspect of the present invention, the lifting interface unit of the transportable charging station comprises at least one fork lift entrance adapted to receive a fork lift of the lifting mechanism of the charging station transport unit.

The use of a crane and/or a fork lift allows to lift charging stations with a considerable weight on the transport platform of the charging station transport unit. Consequently, the battery packs integrated in the housing of the transportable charging station can comprise considerable electrical capacity to store electrical power.

In a further possible embodiment of the distributed charging system according to the first aspect of the present invention, the lifting interface unit of the charging station comprises a clamping mechanism adapted to clamp the charging station mechanically to the lifting mechanism of the charging station transport unit.

In a further possible embodiment of the distributed charging system according to the first aspect of the present invention, the lifting mechanism of the charging station transport unit is adapted to lift the transportable housing of the charging station to a docking frame provided at the transport platform of the charging station transport unit and connected to a transport unit power grid of the charging station transport unit.

The provision of a docking frame on the transport platform of the charging station allows for a safe transport of the charging station for reloading of the charging station at a central reloading station which can be located at an energy center. Further, the local transport unit power grid of the charging station transport unit makes it possible to balance the electrical charge of the connected transportable charging stations loaded on the transport platform during the transport by the charging station transport unit. This can reduce the loading time required for reloading the charging stations at the central recharging station of the energy center of the distributed charging system.

In a further possible embodiment of the distributed charging system according to the first aspect of the present invention, the housing of the charging station can comprise a ground locking interface unit adapted to lock the charging station mechanically to a base frame installed on the ground floor at a local power supply grid or installed on a transport platform of a transport unit.

This embodiment provides the advantage that the charging station deployed on a ground floor or platform cannot be easily removed by a third party.

In a possible embodiment of the present invention, the ground locking interface unit of the transportable charging station is implemented without moving parts and a ground locking interface unit of the base frame is implemented with moving parts. This has the advantage of decreasing the weight of the transportable charging station and of reducing the mechanical stress on the moving parts, as a base plate of the base frame is not moved in operation.

In a possible embodiment of the present invention, the ground locking interface unit of the transportable charging station is implemented with moving parts and the ground locking interface unit of the base frame is implemented without moving parts. This has the advantage that the ground locking interface unit of the base frame—which is exposed to its environment if no portable charging station is present—is less vulnerable to vandalism.

In a further possible embodiment of the distributed charging system according to the first aspect of the present invention, the ground locking interface unit comprises electrical contacts adapted to connect electrically the charging station to a corresponding base frame. This embodiment provides the advantage that the battery packs of the deployed charging station can be charged via the base frame, e.g., by a power generation unit of a local power supply grid.

In a possible embodiment of the present invention, a base plate of the base frame includes electrical contacts that are covered when no portable charging station is present on the base plate of the base frame, and that are galvanically connected to contacts on the portable charging station when the portable charging station sits on the base plate of the base frame. This embodiment has the advantage that the electrical contacts are protected from environmental influences even when no portable charging station sits on the base plate. This embodiment also reduces the risk of electrical accidents when no portable charging station sits on the base plate of the base frame.

In a possible embodiment of the present invention, the base plate of the base frame includes electrical contacts that are automatically covered when a portable charging station is removed from the base plate, and that are automatically uncovered when the portable charging station is lowered onto the base plate of the base frame. This embodiment allows for a speedier replacement of the portable charging station. This embodiment also reduces the opportunity for handling errors.

In a possible embodiment of the present invention, the base plate can be connected to a local data network connection. This embodiment provides the advantage that the portable charging station can use the network connection of the base frame to connect to a centralized server to obtain information to display on a screen, to process transactions, to signal for replacement and to report status.

In a further possible embodiment of the distributed charging system according to the first aspect of the present invention, the base frame can be connected to a local power supply grid adapted to perform a load balancing between different charging stations electrically connected via base frames to the respective local power supply grid. Accordingly, a local power supply grid can be set up at any location where the load of the different charging stations can be balanced to provide a sufficient power supply to the connected electrical vehicles.

In a further possible embodiment of the distributed charging system according to the first aspect of the present invention, the locking mechanism of the ground locking interface unit can be remote-controlled by a remote-control unit to lock the transportable charging station mechanically to a base frame of a local power supply grid or to release the charging station from the base frame installed on the ground floor. The remote-control unit can be a handheld device of a user such as the driver of a transport unit.

In a possible embodiment of the distributed charging system according to the first aspect of the present invention, the ground locking interface unit is adapted to engage automatically as a portable charging station is lowered onto the base plate of the base frame. This speeds up the operation and reduces the opportunity for handling errors.

In a possible embodiment of the present invention, the automatic engagement of the ground locking interface unit is implemented using a detection system and an actuation system combined with a mechanical locking setup. The detection system is triggered by the seating of the distributed charging station onto the base plate of the base frame. When the detection system is triggered, it causes the actuation system to activate. The actuation system drives the mechanical locking system into the locked position.

In a possible embodiment of the present invention, the automatic engagement of the ground locking interface unit is implemented using a motion redirection mechanism and a mechanical locking setup. The motion redirection mechanism is adapted so that the motion of the distributed charging system lowered onto the base plate of the base frame produces a redirected motion that drives the mechanical locking setup into the locked position.

In a possible embodiment of the present invention, the mechanical locking setup is implemented by one or multiple bolts or bars attached to a motion distribution mechanism, each bar or bolt is aimed at a recess. The motion distribution mechanism can drive the bolts or bars into the recesses and pull them back out. The recesses can be implemented on the portable charging station and the bolts/bars with the motion distribution mechanism on the base plate, or vice versa.

In a possible embodiment of the present invention, the mechanical locking setup is implemented by a clamp on the base plate of the base frame that can be closed to seize a protrusion on the distributed charging unit. It can also be implemented by a clamp on the portable charging station that can be closed to seize a protrusion on the distributed charging unit.

In a possible embodiment of the present invention, the automatic engagement of the ground locking interface unit is implemented in such a way that it only engages if the alignment of the portable charging station on the base plate of the base frame is correct. Correct alignment of the portable charging station has the advantage of leveling the portable charging station, thus reducing mechanical stresses on both the portable charging station and the base plate of the base frame. It also has the advantage that the portable charging unit does always face oncoming electric vehicles.

In one possible embodiment of the present invention including a base plate of the base frame and an automatic engagement of a ground locking interface unit using a motion distribution mechanism and a mechanical locking setup, the correct alignment is achieved by designing the portable charging station with a rectangular but not quadratic footprint commensurate with the footprint of the base plate of the base frame. This leaves only one possible wrong alignment, which is eliminated if the motion redirection mechanism has a triangular interface.

In a possible embodiment of the distributed charging system according to the first aspect of the present invention, the remote-control unit can comprise a handheld remote-control unit.

In an alternative embodiment of the distributed charging system according to the first aspect of the present invention, the remote-control unit can be integrated in the charging station transport truck.

In a still further possible alternative embodiment of the distributed charging system according to the first aspect of the present invention, the remote-control unit can be integrated in a central control unit of the distributed charging system.

In a possible embodiment of the distributed charging system according to the first aspect of the present invention, each transportable charging station comprises a number of charging connectors adapted to connect a corresponding number of electrically powered vehicles and/or other electrically powered devices to said charging station when deployed on the ground floor.

In a possible embodiment, the electrically powered vehicles can comprise electric cars, electric bikes and/or electric scooters. Other electrically powered devices may for instance comprise chargeable mobile phones or laptops, audio and/or video equipment.

In a still further possible embodiment of the distributed charging system according to the first aspect of the present invention, each charging connector of the transportable charging station receives a DC charging current from an associated DC/DC converter via a switch controlled by a controller of a control unit of the respective charging station.

In a further possible embodiment of the distributed charging system according to the first aspect of the present invention, the charging station comprises a first communication module connected via an internal communication bus to the DC/DC converters for controlling a charging process of a connected battery of an electrically powered vehicle.

In a possible embodiment of the distributed charging system according to the first aspect of the present invention, the internal communication bus can comprise a CAN bus.

In a still further possible embodiment of the distributed charging system according to the first aspect of the present invention, the control unit of the transportable charging station can be connected via the internal communication bus to a battery management system of the transportable charging station.

In a further possible embodiment of the distributed charging system according to the first aspect of the present invention, the transportable charging station comprises a powerline communication, PLC, module, for communication with a control entity of an electrically powered vehicle or a device connected to the charging station by means of a charging connector.

In a further possible embodiment of the distributed charging system according to the first aspect of the present invention, the transportable charging station further comprises a recharging unit adapted to generate electrical power from a fluid or gas filled into at least one fluid container integrated in the housing of the transportable charging station or connected to the housing of the transportable charging station.

This has the advantage that the transportable charging station when deployed on the ground floor can be recharged even without transport to a remote center or reloading station by means of a charging station transport truck. This increases significantly the flexibility when using a plurality of transportable charging stations at different locations.

In a further possible embodiment of the distributed charging system according to the first aspect of the present invention, a recharging unit integrated in the housing of the transportable charging station comprises fuel cells adapted to generate electrical power from methanol or a redox-flow battery module to generate electrical power from an electrolyte.

In a further possible embodiment of the distributed charging system according to the first aspect of the present invention, the electrical power generated by the recharging unit of the transportable charging station is used to recharge the battery packs of the transportable charging station.

In a further possible embodiment of the distributed charging system according to the first aspect of the present invention, the lifting interface unit of the transportable charging station comprises a fluid input adapted to receive fluid or gas from a fluid supply container of the charging station transport truck for storage in the fluid container of the transportable charging station connected to the recharging unit of the transportable charging station via an internal fuel supply pipe.

In a further possible embodiment of the distributed charging system according to the first aspect of the present invention, a control unit of the transportable charging station comprises a communication module for communication with the controller of the base frame and/or with one or more backend servers to provide services, in particular authorization services, electronic payment services, digital streaming, predictive logistic services, predictive maintenance services, intrusion detection services and/or antitheft protection services.

In a further possible embodiment of the distributed charging system according to the first aspect of the present invention, the transportable charging station further comprises an integrated temperature control system adapted to cool and/or heat components of the transportable charging station.

In a possible embodiment of the distributed charging system according to the first aspect of the present invention, the temperature control system of the transportable charging station comprises a battery temperature control unit adapted to cool or heat the rechargeable battery cells of the battery packs.

In a further possible embodiment of the distributed charging system according to the first aspect of the present invention, the temperature control system of the transportable charging station comprises a fluid temperature control unit adapted to cool and/or heat a fluid or gas filled into a fluid container of the transportable charging station for supply of the recharging unit of the transportable charging station with cooled or heated fluid and/or with cooled or heated gas.

In a further possible embodiment of the distributed charging system according to the first aspect of the present invention, the base frame comprises a temperature control system adapted to provide heating and/or cooling to the transportable charging station. This embodiment has the advantage that the temperature control system does not need to be transported with the transportable charging station.

In a further possible embodiment of the present invention, the temperature control system in the base frame is adapted to heat and/or cool a fluid and to exchange this fluid with the portable charging station. This embodiment has the advantage that heat can be transported quickly from the transportable charging station to the base frame and vice versa.

In a further possible embodiment of the present invention, the temperature control system comprises a fluid temperature control unit adapted to cool and/or heat a fluid or gas filled into a fluid container or fluid tank of the base frame for supply of the transportable charging station with cooled or heated fluid and/or with cooled or heated gas. This embodiment has the advantage that the liquid does not need to be transported with the transportable charging station.

In a further possible embodiment of the present invention, the fluid tank of the base frame is installed in the ground below the base plate of the base frame. This embodiment has the advantage that the volume of fluid or gas stored can be larger.

In a further possible embodiment of the present invention, the fluid tank of the base frame is adapted to exchange heat with the ground. This embodiment has the advantage that the temperature control system can more easily cool and/or heat the fluid or gas if the ground temperature is favorable.

In a further possible embodiment of the present invention, the temperature control system of the base frame is adapted to circulate the fluid or gas through the fluid tank of the base frame if a temperature inside the fluid tank is favorable.

In a further possible embodiment of the present invention, the temperature control system of the base frame is adapted to allow the fluid tank of the base frame to exchange heat with the ground if the ground temperature is favorable and to insulate the fluid tank of the base frame from the ground if the ground temperature is not favorable.

In a still further possible embodiment of the distributed charging system according to the first aspect of the present invention, the temperature control system of the transportable charging station comprises a power electronics cooling unit adapted to cool power electronics components of the DC/DC converters.

In a further possible embodiment of the distributed charging system according to the first aspect of the present invention, the base frame comprises a fluid tank and a recharging unit that is adapted to generate electrical power from the fluid or gas in the fluid tank.

In a still further possible embodiment of the distributed charging system according to the first aspect of the present invention, the transportable charging station further comprises an integrated antitheft protection unit adapted to detect an unauthorized removal of the transportable charging station from a base frame and/or from ground floor and/or from a docking frame of the charging station transport truck.

In a still further possible embodiment of the distributed charging system according to the first aspect of the present invention, the control unit of the transportable charging station is connected to a user interface of the transportable charging station adapted to display information to a user of the transportable charging station and/or to receive user input commands from a user of the transportable charging station.

In a still further possible embodiment of the distributed charging system according to the first aspect of the present invention, a base frame can be connected to a public or local power supply grid.

In a further possible embodiment of the distributed charging system according to the first aspect of the present invention, the base frame installed on the ground floor can comprise protection barriers protecting the transportable charging station from traffic participants.

In a further possible embodiment of the distributed charging system according to the first aspect of the present invention, the charging connectors of the transportable charging station can be galvanically isolated from each other.

In a further possible embodiment of the distributed charging system according to the first aspect of the present invention, a housing of the transportable charging station comprises a thermal insulation.

In a further possible embodiment of the distributed charging system according to the first aspect of the present invention, the transportable charging station comprises a sensor-based positioning system used for automatic swapping of the transportable charging station with another transportable charging station carried on the transport platform of the charging station transport truck.

In a further possible embodiment of the distributed charging system according to the first aspect of the present invention, the local grid connecting several base frames can comprise an interface to other local grids to provide a load balancing between different local grids.

The invention provides according to a further aspect a charging station transport truck comprising a lifting mechanism adapted to lift a transportable charging station of a distributed charging system according to the first aspect of the present invention on a transport platform of the charging station transport truck for transport to another location.

In a possible embodiment of the charging station transport truck, the transport platform comprises at least one docking frame to receive a transportable charging station.

In a further possible embodiment of the charging station transport truck according to the second aspect of the present invention, the docking frame provides an electrical connection between a vehicle power grid of the charging station transport truck and the at least one received charging station.

In a further possible embodiment of the charging station transport truck according to the second aspect of the present invention, the transport truck further comprises a fluid container adapted to transport a fluid to be filled into containers of transportable charging stations having recharging units adapted to generate electrical power from the fluid. A refilling of the containers of the transportable charging stations can take place during a transport or also when the charging stations are deployed on the ground floor.

The invention further provides according to a further aspect a charging system comprising at least one local power supply grid or microgrid having one or more charging stations deployed on a ground floor or placed on base frames by a charging station transport unit, in particular by a charging station transport truck, wherein each charging station includes at least one battery pack with rechargeable battery cells adapted to store electrical power which is used to charge vehicle batteries of electrically powered vehicles or other mobile devices connectable to the charging stations of the local power supply grid.

The local power supply grid can comprise one or more parking lots for electrical vehicles connected via power cables to charging columns of the local power supply grid (microgrid) which are connected via under earth cables to deployed charging stations placed on base frames and/or placed directly on ground terrain.

In a possible embodiment of the charging system, the at least one charging station placed on a base frame of the local power supply grid is electrically connected via the base frame to at least one local power generation unit and/or to at least one load device of the respective local power supply grid.

In a further possible embodiment of the charging system, the local power supply grid (i.e., microgrid) comprises a local control unit, LCU, adapted to communicate with a central control unit, CCU, of an IT center of the charging system via a wired or wireless communication link.

In a further possible embodiment of the charging system, one or more local power supply grids (i.e., microgrids) are connected to a public wide area power supply grid of the charging system wherein the public power supply grid is adapted to receive electrical power from at least one power plant connected to the public power supply grid and controlled by the central control unit, CCU, of the IT center of the charging system.

In a further possible embodiment of the charging system, the local control unit, LCU, of the local power supply grid comprises a control unit or controller integrated in the housing of a charging station connected within said local power supply grid.

In a further possible embodiment of the charging system, the central control unit of the charging system is adapted to receive via the wired or wireless communication link from the local control units of the distributed local power supply grids measurement data including the state of charge of the battery packs of the charging stations, a charge and discharge power of the battery packs of the charging stations within the respective local power supply grids.

In a further possible embodiment of the charging system according to the present invention, the central control unit, CCU, of the charging system is adapted to communicate via a wired or wireless communication link with the local control units, LCUs, of the local power supply grids to provide setpoints including a power to be discharged by the respective local power supply grid into the public power supply grid or a power to be charged from the public power supply grid into the local power supply grids.

In a further possible embodiment of the charging system, the local control unit, LCU, of a local power supply grid is adapted to receive measurement data indicating the electrical power generated by the at least one local power generation unit, PGU, of the local power supply grid and to receive measurement data indicating the electrical power consumed by the at least one load device, 1D, of the local power supply grid, wherein the local control unit, LCU, of the local power supply grid is adapted to forward the measurement data via a wired or wireless communication link to the central control unit, CCU, of the charging system.

In a further possible embodiment of the charging system according to the present invention, the central control unit, CCU, of the charging system comprises a data processing unit adapted to calculate a total power generated by the power generation units, PGUs, of all distributed local power supply grids and the total power consumed by the load devices, LDs, of all local power supply grids of the charging system and/or the total power used to load vehicle batteries or other batteries of mobile devices connected to the distributed local power supply grids.

In a further possible embodiment of the charging system, the central control unit, CCU, of the charging system is adapted to perform a grid stabilization of the public power supply grid by controlling the distributed local power supply grids connected to the public power supply grid. In particular, a frequency of the public AC power supply grid can be stabilized.

In a further possible embodiment of the charging system, the local control unit of each distributed local power supply grid is adapted to perform a local charge balancing between battery packs of different charging stations connected within the respective local power supply grid, i.e., a local balancing of the state of charges, SOC, of the battery packs of different charging stations at the same local power supply grid.

In a further possible embodiment of the charging system, the central control unit, CCU, of the charging system is adapted to calculate a replacement order of charging stations being deployed on the ground in the field or being placed on base frames of local power supply grids to be replaced by other charging stations recharged by recharging stations provided at energy centers of the charging system and transported by charging station transport units to the locations of the distributed local power supply grids.

In a further possible embodiment of the charging system, the central control unit, CCU, of the charging system is adapted to navigate the charging station transport units depending on the calculated replacement order of the charging stations and depending on position data of the charging stations deployed on the ground in the field or placed on base frames of local power supply grids using a predefined optimization function.

The invention further provides according to a further aspect a local power supply grid (microgrid), wherein the local power supply grid comprises at least one transportable charging station deployed on ground floor or placed on a base frame by a transport unit, wherein the transportable charging station includes at least one battery pack with rechargeable battery cells adapted to store electrical power which is used to charge vehicle batteries of electrically powered vehicles or batteries of other mobile devices connectable to the charging stations of the local power supply grid.

In a possible embodiment of the local power supply grid, the local power supply grid further comprises a local control unit, LCU, adapted to communicate with a central control unit, CCU, of an IT center of the charging station via a wired or wireless communication link, at least one local power generation unit, PGU, adapted to generate electrical power, at least one local load device, LD, adapted to consume electrical power and/or a metering device, MD, adapted to measure electrical power exchanged by the local power supply grid with a public power supply grid of the charging system.

BRIEF DESCRIPTION OF THE FIGURES

In the following, different aspects of the present invention are described in more detail with reference to the enclosed figures.

DETAILED DESCRIPTION OF EMBODIMENTS

Figure 1:
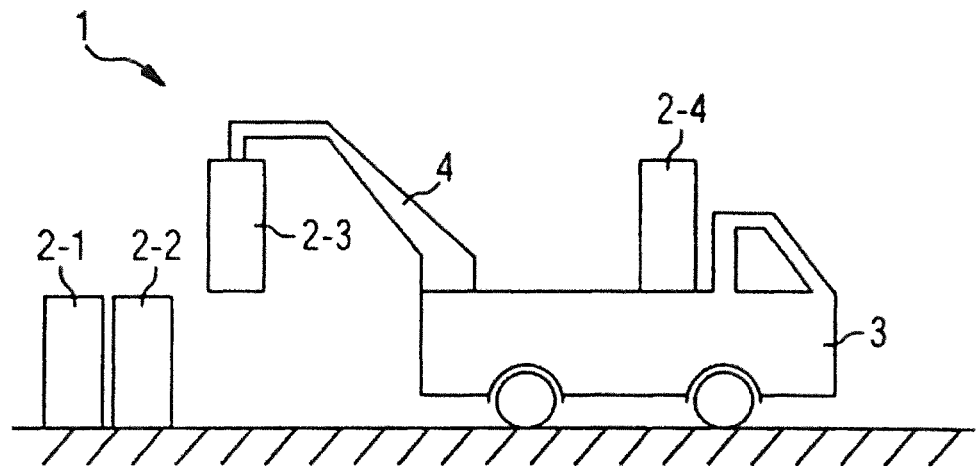
FIG. 1 shows schematically the components of a distributed charging system according to the first aspect of the present invention.
Figure 2:
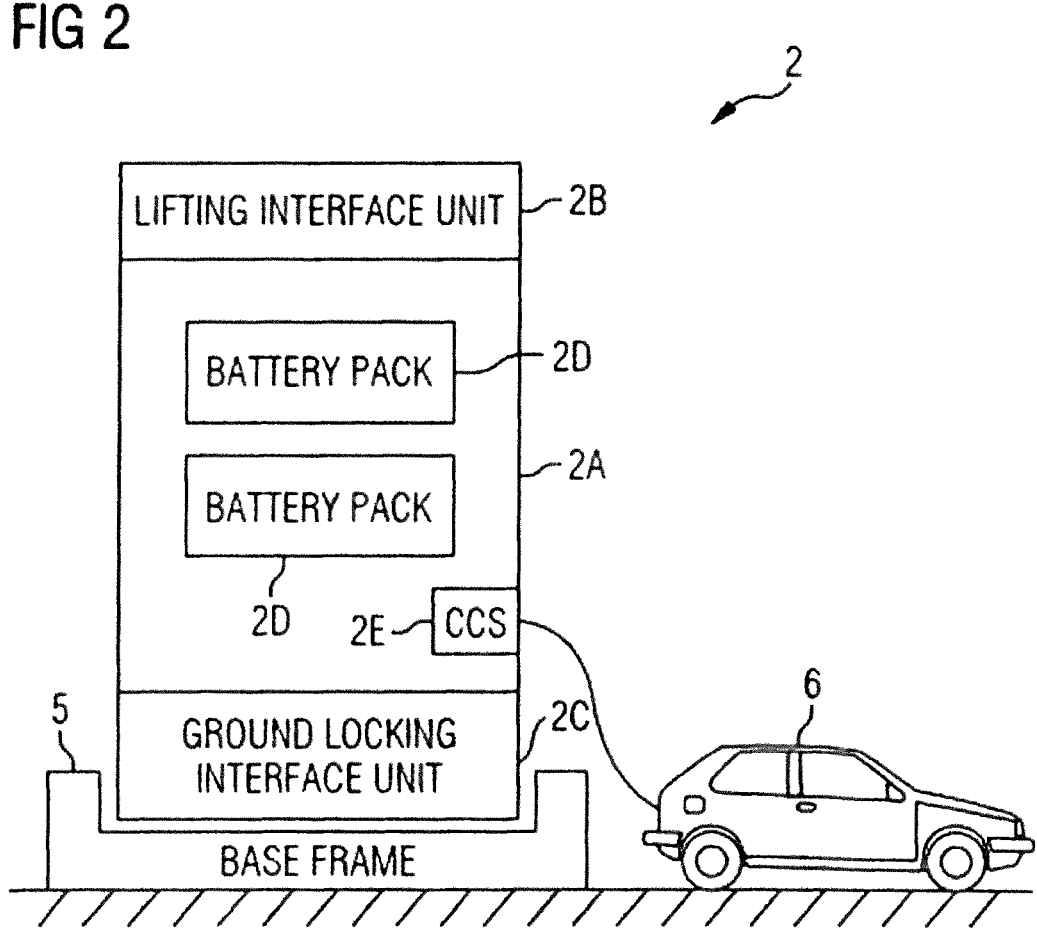
FIG. 2 shows schematically a possible embodiment of a transportable charging station used in the distributed charging system according to the first aspect of the present invention.

As can be seen from FIG. 1, a distributed charging system 1 according to the first aspect of the present invention may comprise a plurality of charging stations 2 transportable by charging station transport units 3. The transport units 3 comprise mostly transport trucks but may also include transport trains or transport ships having transport platforms to receive transportable charging stations 2. The charging station transport unit 3 can comprise a platform for transporting one or more transportable charging stations 2. In the illustrated example of FIG. 1, the charging station transport unit is a truck 3, which has loaded a charging station 2-4 on its platform. The charging station transport truck 3 comprises a lifting mechanism 4 which is adapted to lift at least one charging station 2 onto the transport platform 3B of the charging station transport truck 3. In the illustrated example of FIG. 1, a lifting mechanism 4 is in the process of lifting the transportable charging station 2-3 onto the transport platform 3B of the charging station transport truck 3. The lifting mechanism 4 of the charging station transport truck 3 is also used for unloading charging stations 2 from the transport platform 3B of the truck 3 to the ground floor. In the illustrated example of FIG. 1, charging stations 2-1, 2-2 are deployed directly on the ground floor and can be used by electrically powered vehicles 6 or of the mobile devices to reload their vehicle batteries as also shown in FIG. 2. The charging stations 2-1, 2-2 may also be placed on base frames of the local power supply grids or microgrids. The charging station transport truck 3 comprises at least one transport platform 3B for receiving uploaded charging stations 2-i for transport to another location. Each transportable charging station 2-i has at least one battery pack or battery 2D with rechargeable battery cells adapted to store electrical energy which is used to charge batteries of electrically powered vehicles 6 connected to charging stations 2 deployed on the ground floor. The charging station transport unit 3 transports charging stations 2 with fully charged battery packs 2D to a predefined location or site where they can be unloaded to the ground floor. The deployed charging stations 2 comprise charging connectors 2E which can be used by electrically powered vehicles 6 to connect to the battery packs 2D of the deployed charging station 2 for reloading their integrated vehicle batteries. Electrically powered vehicles 6 can comprise for instance electric cars, electric bikes and/or electric scooters. Other devices can also be connected to the charging connectors 2E of the transportable charging stations 2-i when deployed on the ground floor. This may for instance comprise mobile phones of users walking through a street in an urban environment. As can be seen in FIG. 1, more than one charging station 2 can be deployed or placed at a specific charging location. The battery of the charging station 2 comprises at least one battery pack 2D. When the battery packs 2D of a deployed charging station 2 have been discharged and the electrical power stored in the battery packs 2D falls beneath a certain threshold, the charging station transport unit 3, in particular a charging station transport truck 3 as shown in FIG. 1, can be directed or navigated to the empty charging station 2 to upload the transportable charging station 2 with its lifting mechanism 4 to the transport platform 3B. The uploaded charging station 2 is then transported by the transport truck 3 to a central reloading station for reloading the battery packs 2D of the charging station 2. After the charging station 2 has been reloaded at the central reloading station it can be transported by the charging station transport truck 3 to another charging location or site where a demand for recharging electrically powered vehicles 6 does exist. For each region or area, at least one recharging central station can be provided for recharging transportable charging stations 2 transported by a plurality of charging station transport trucks 3 of the distributed charging system 1 to the central reloading station.

Figure 6:
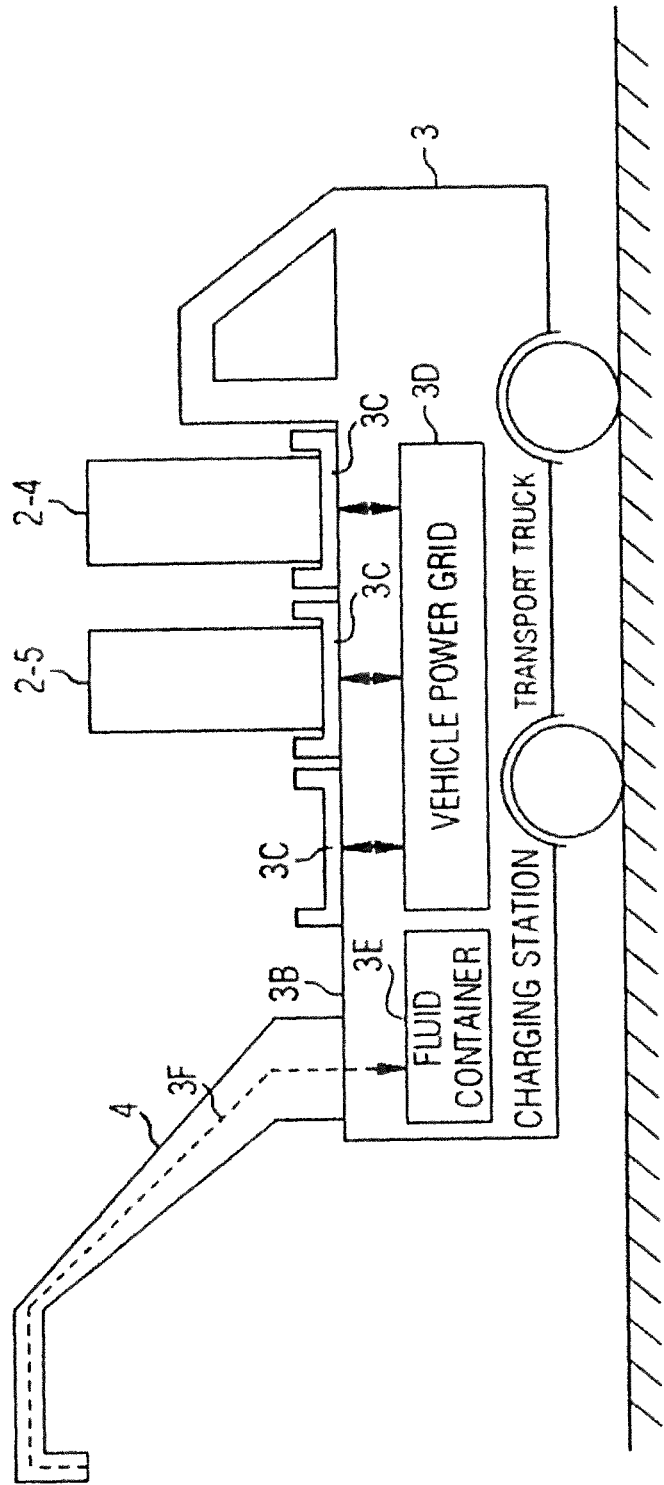
FIG. 6 shows schematically a possible exemplary embodiment of a charging station transport truck according to a further aspect of the present invention.

The transportable charging station 2-i comprises at least one lifting interface unit 2B provided at a housing 2A of the transportable charging station 2. The lifting interface unit 2B can be used by the lifting mechanism 4 of the charging station transport truck 3 to lift the charging station 2 onto the transport platform 3B of the charging station transport truck 3 for transport to another charging location and/or to a central reloading station of the system 1. The lifting interface unit 2B of the transportable charging station 2 can comprise in a possible embodiment at least one fixture provided for lifting the housing 2A of the charging station 2 by a crane of the lifting mechanism 4 of the charging station transport truck 3 as also illustrated schematically in FIG. 1. The lifting mechanism 4 may vary for different embodiments of the transportable charging station 2. For example, the lifting mechanism 4 of the charging station transport truck 3 may also comprise at least one fork lift which can be used for lifting a transportable charging station 2 onto the transport platform 3B of the charging station transport truck 3. The housing 2A of the transportable charging station 2 can comprise in a possible implementation at least one fork lift entrance adapted to receive a fork lift of the lifting mechanism 4 of the charging station transport truck 3. The fork lift is used to unload fully charged charging stations 2 on the ground floor and to reload empty charging stations 2 back onto the transport platform 3B of the charging station transport truck 3. Accordingly, the charging station transport truck 3 having reached a predefined charging location can exchange charging stations 2 with empty battery packs 2D, i.e., with an empty battery, by charging stations 2 having fully loaded battery packs 2D. In a possible embodiment, the lifting mechanism 4 of the charging station transport truck 3 is adapted to lift the portable housing of the charging station 2 to a docking base frame 3C provided at the transport platform 3B of the charging station transport truck 3. The docking frame 3C can be connected in a possible embodiment to a transport truck power grid 3D of the charging station transport truck 3 as also illustrated in FIG. 6. The transport truck power grid 3D forms a microgrid of the truck 3. A parked transport truck 3 can form itself a local power supply grid or microgrid 7. In a possible embodiment such a micro-grid 7 can also be connected to a public power supply grid 8 via a metering device.

Figure 4:
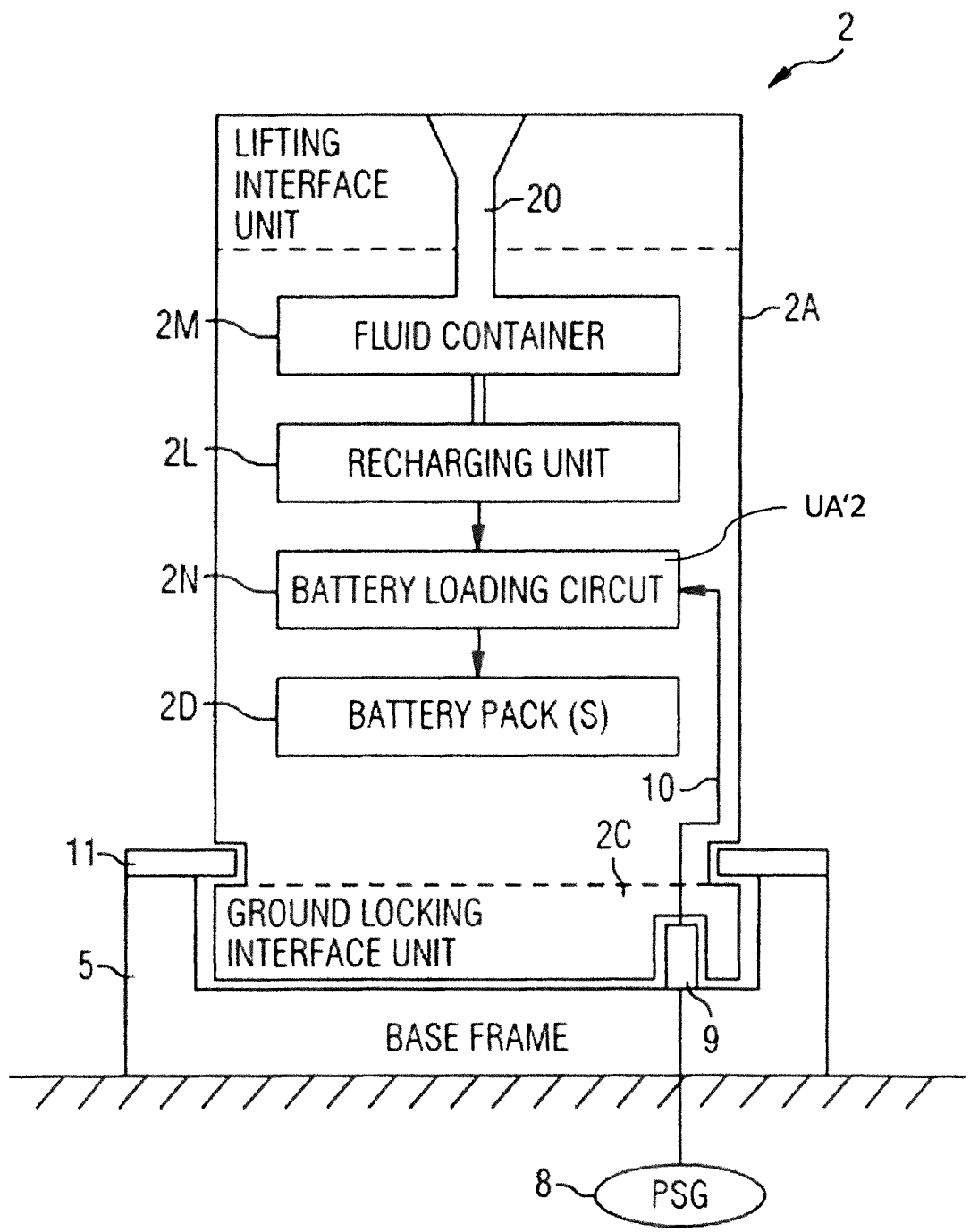
FIG. 4 shows a further schematic block diagram for illustrating another possible embodiment of a transportable charging station used in a distributed charging system according to the first aspect of the present invention.
Figure 37:
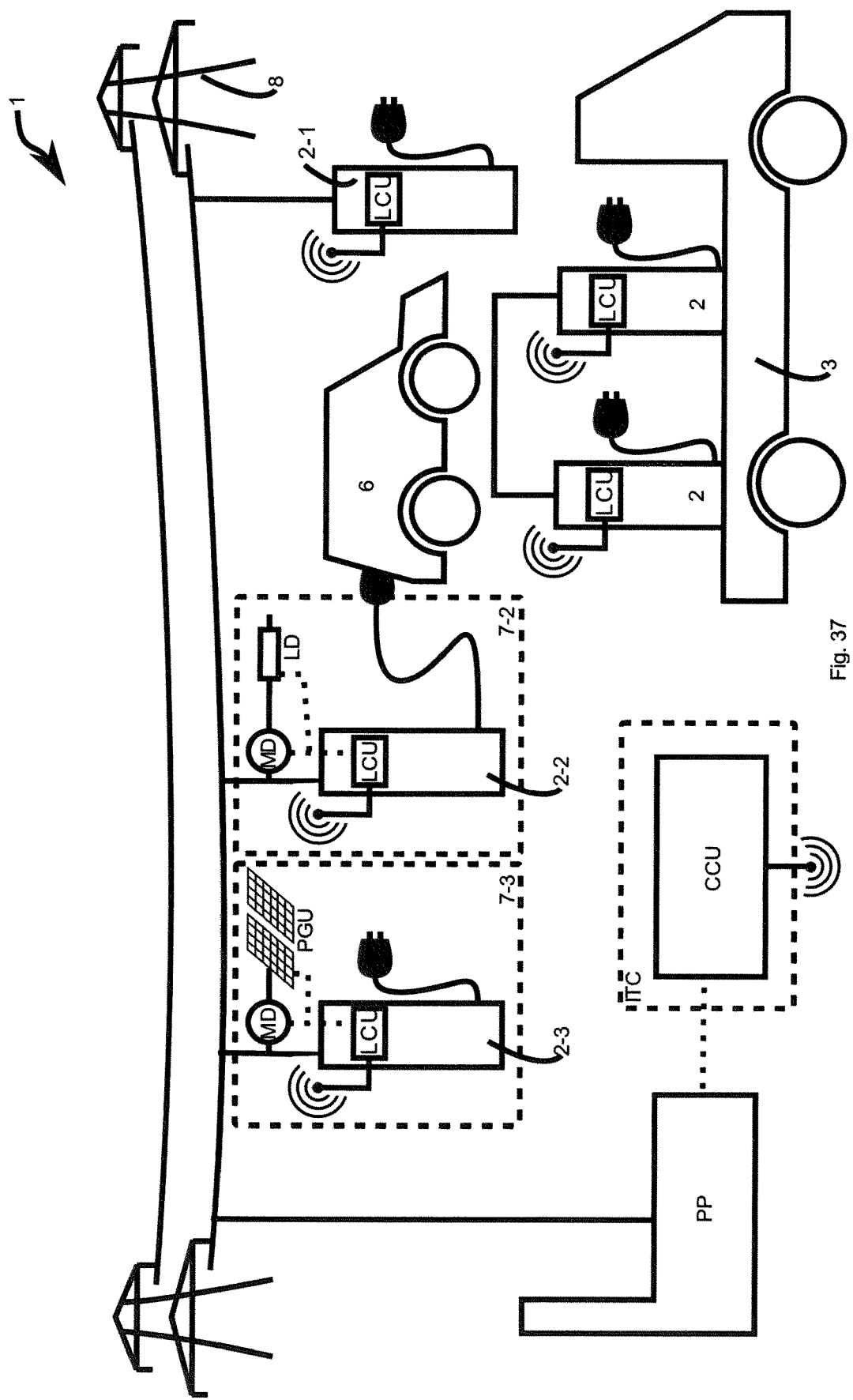
FIG. 37 shows a schematic diagram for illustrating a possible architecture of a distributed charging system according to the first aspect of the present invention.
Figure 39:
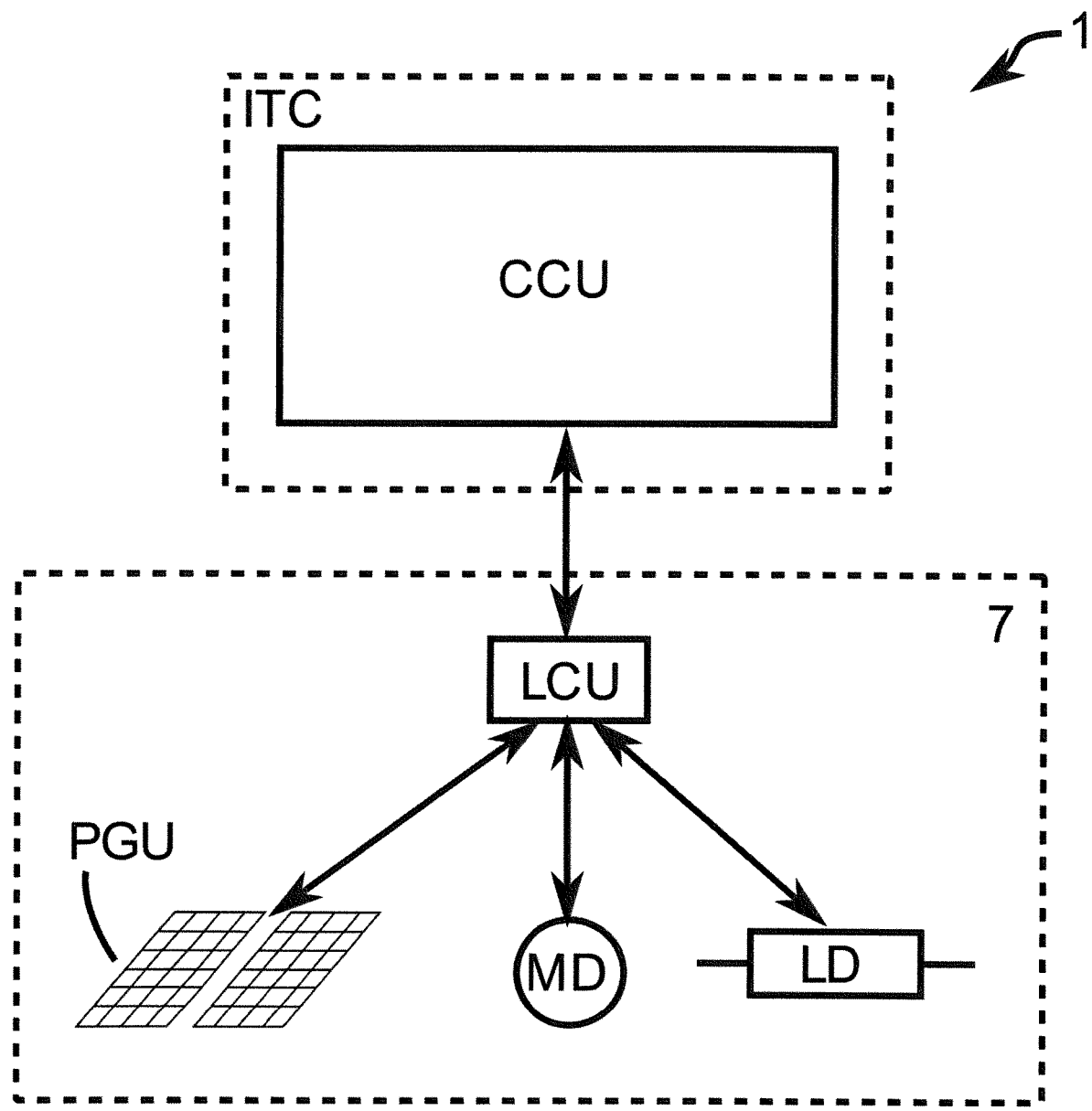
FIG. 39 shows schematically a possible exemplary embodiment of a local grid which can form part of a distributed charging system according to the first aspect of the present invention.

In a further possible embodiment of the distributed charging system 1, the housing 2A of the portable charging station 2 can also comprise a ground locking interface unit 2C adapted to lock the charging station 2 mechanically to a base frame 5 installed on the ground floor. The ground locking interface unit 2C of the charging station 2 can comprise, in a possible implementation, electrical contacts 9 adapted to connect electrically the charging station 2 to the base frame 5 as shown in FIG. 4. In a possible embodiment, the base frame 5 of the distributed charging system 1 can be connected to a local grid or micro-grid 7 adapted to perform a load balancing between different charging stations 2 electrically connected via base frames 5 to the local grid. The local grid (microgrid) 7 comprises a local control unit LCU as also shown in FIG. 39. The local control unit LCU can also be formed by a control unit CU 2H of a connected charging station 2. The local control unit LCU can in a possible embodiment communicate with a central control unit CCU. In a possible embodiment, a locking mechanism 11 of the ground locking interface unit 2C of the charging station 2 can be remote-controlled by a remote-control unit RCU to lock the transportable charging station 2 mechanically to the base frame 5 or to release the charging station 2 from the base frame 5 installed on the ground floor. In a possible embodiment, the remote-control unit RCU can comprise a handheld remote-control unit which can be operated for instance by the driver of the charging station transport truck 3. In a further possible embodiment, the remote-control unit RCU can also be integrated in the charging station transport truck 3 and used by the driver of the truck 3. In a possible embodiment the RCU is also used to control placement of an uplifted charging station 2 on a docking frame 3C at the transport platform 3B of the transport unit 3. In a still further possible embodiment, the remote-control unit RCU can also form part of a central control unit CCU of the distributed charging system 1. The central control unit CCU of the distributed charging system 1 may support and/or control the unloading and/or uploading of a plurality of transportable charging stations 2 by different charging station transport units 3 at different charging locations and/or charging areas. The central control unit CCU can be located at an IT center ITC as illustrated in FIG. 37.

Figure 3:
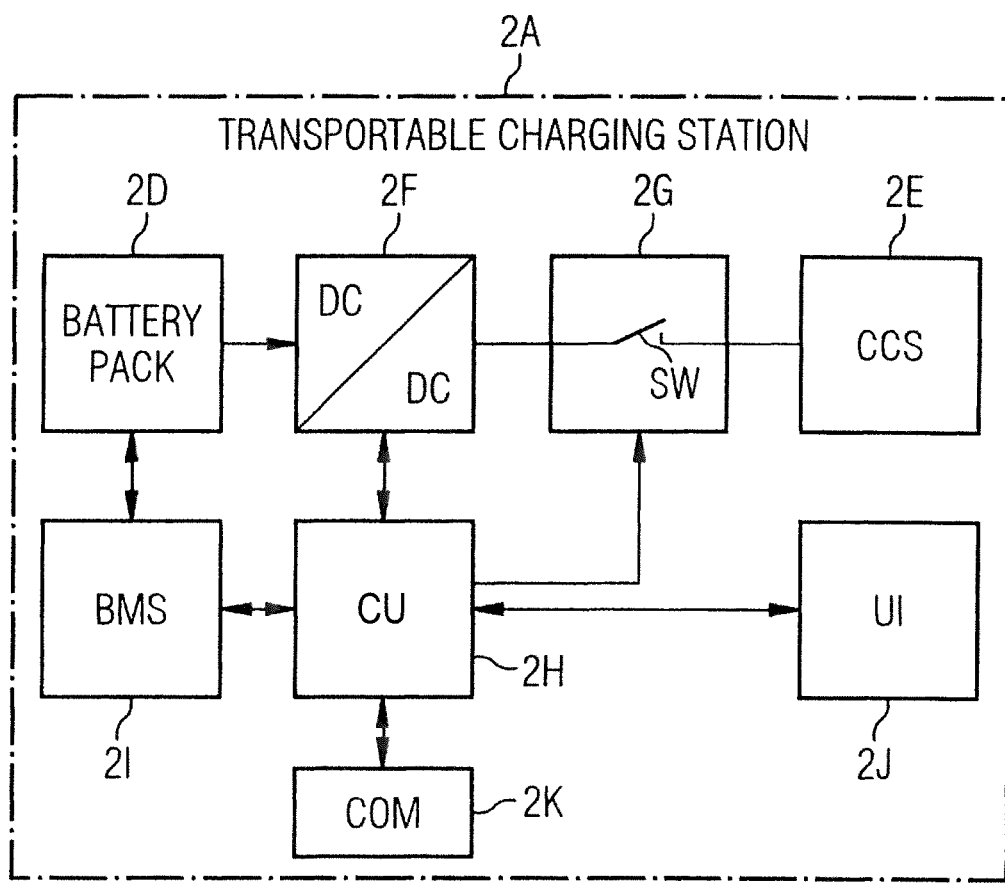
FIG. 3 shows a block diagram for illustrating a possible exemplary embodiment of a transportable charging station used in a distributed charging system according to the first aspect of the present invention.

As shown in FIGS. 2, 3, the transportable charging station 2 comprises a number of charging connectors 2E adapted to connect a corresponding number of electrically powered vehicles 6 and/or other electrically powered devices to the charging station 2. The number and types of charging connectors 2E may vary depending on the use case. Each charging connector 2E of the transportable charging station 2 receives a DC charging current from an associated DC/DC converter 2F via a switch 2G that can be controlled by a controller of a control unit CU 2H integrated in the housing 2A of the charging station 2. The charging station 2 can comprise in a possible embodiment a communication module connected via an internal communication bus to the integrated DC/DC converters 2F for controlling the different charging processes. This internal communication bus may comprise in a possible implementation a CAN bus. In a possible embodiment, the control unit 2H integrated in the housing 2A of the transportable charging station 2 can be connected via the internal communication bus to a battery management system 21 of the transportable charging station 2. In a possible embodiment, the transportable charging station 2 can comprise a powerline communication (PLC) module for communication with a control entity of an electrically powered vehicle 6 or device connected to the charging station 2 via a charging connector CCS 2E. Some or all of the charging stations 2 illustrated in FIG. 1 can comprise a recharging unit 2L adapted to generate electrical power from fluid or gas filled into at least one fluid container 2M integrated in the housing 2A of the transportable charging station 2 or connected to the housing 2A of the transportable charging station 2 as also shown in FIG. 4. In a possible implementation, the recharging unit 2L of a charging station 2 can comprise fuel cells adapted to generate locally electrical power from methanol and/or a redox-flow battery module to generate power from an electrolyte. Electrical power generated by the recharging unit 2L of the transportable charging station 2 can be used to recharge the battery packs or batteries 2D integrated in the housing 2A of the transportable charging station 2. In a possible embodiment, the lifting interface unit 2B of the transportable charging station 2 may comprise a fluid input 2Q adapted to receive a fluid or gas from a fluid supply container of the charging station transport truck 3 for storage in the fluid container 2M of the transportable charging station 2 connected to the recharging unit 2L of the transportable charging station 2 via an internal fuel supply pipe.

In a further possible embodiment, the control unit CU 2H integrated in the housing 2A of the transportable charging station 2 can comprise a communication module 2K for communication with a controller integrated in the base frame 5 and/or with one or more backend servers to provide different kinds of services as shown in FIG. 3. These services can comprise in particular authorization services, electronic payment services, digital streaming services, predictive logistic services, predictive maintenance services, intrusion detection services and/or antitheft protection services. The controller integrated in the base frame 5 or in the housing 2A of a charging station 2 can form a local control unit LCU of a local micro-grid 7 deployed in the field.

Figure 5:
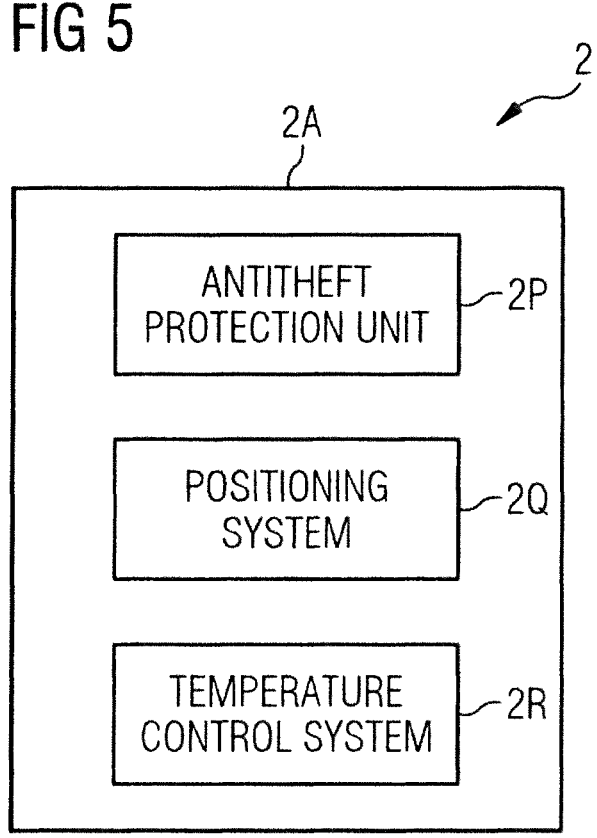
FIG. 5 shows a further schematic block diagram for illustrating a possible exemplary embodiment of a transportable charging station used in a distributed charging system according to the first aspect of the present invention.

In a possible embodiment, the transportable charging station 2 can comprise an integrated temperature control system 2R adapted to cool and/or to heat components of the transportable charging station 2 as shown in FIG. 5. In a possible embodiment, the temperature control system of the charging station 2 can comprise a battery temperature control unit adapted to cool and/or to heat the rechargeable battery cells of the integrated battery packs 2D.

In a further possible embodiment, the temperature control system 2R of a charging station 2 can also comprise a fluid temperature control unit adapted to cool or heat a fluid or gas filled into a fluid container 2M of the transportable charging station 2 for supply of the recharging unit of the transportable charging station 2 with cooled or heated fluid and/or with cooled or heated gas.

In a further possible embodiment, the temperature control system of the transportable charging station 2 may further comprise a power electronic cooling unit adapted to cool power electronic components of the DC converters.

In a possible embodiment, each transportable charging station 2 as illustrated in FIG. 2 can comprise an integrated antitheft protection unit 2P adapted to detect an unauthorized removal of a transportable charging station 2 from a base frame 5 and/or from a docking frame 3C of the charging station transport unit 3.

In a possible embodiment of the distributed charging system 1 according to the present invention, the control unit CU 2H of the transportable charging station 2 is connected to a user interface UI 2J of the transportable charging station 2 and is adapted to display information to a user of the transportable charging station 2 and/or to receive user input commands from a user of the transportable charging station 2.

In a possible embodiment, each transportable charging station 2 can comprise a sensor-based positioning system 2Q used for automatic swapping of the transportable charging station 2 with another transportable charging station 2 carried on the transport platform 3B of the charging station transport unit 3. In a possible embodiment, the transportable charging station 2 can be switched between different operation modes. These operation modes may comprise in a possible implementation a transportation mode and/or a security mode. For instance, if the transportable charging station 2 is not in a transportation mode but is being tipped may be switched automatically into a security mode. This security mode of the charging station 2 can shut off all its non-safety functionalities and may send its current position together with an alarm message continuously to an IT center ITC of the distributed charging system 1. The IT center ITC can comprise a central control unit CCU as illustrated in FIG. 37.

FIG. 2 shows schematically a possible exemplary embodiment of a transportable charging station 2 used in a distributed charging station 1 according to the first aspect of the present invention. In the illustrated embodiment, the transportable charging station 2 comprises a housing 2A used for integrating a variety of different components. In the illustrated embodiment, the transportable charging station 2 comprises at least one lifting interface unit 2B provided at the housing 2A of the transportable charging station 2. The lifting interface unit 2B can be used by the lifting mechanism 4 of the charging station transport unit 3 to lift the charging station 2 on the transport platform 3B of the charging station transport truck 3 for transport to another location. The charging station 2 further comprises in the illustrated embodiment a ground locking interface unit 2C adapted to lock the charging station 2 mechanically to a base frame 5 installed on the ground floor. The ground locking interface unit 2C can comprise, in a possible implementation, electrical contacts 9 adapted to connect electrically the charging station 2 to the base frame 5. In a possible embodiment, the ground locking interface unit 2C can comprise a locking mechanism 11 which can be remote-controlled by a remote-control unit RCU to lock the transportable charging station 2 mechanically to the base frame 5 or to release the charging station 2 from the base frame 5 installed on the ground floor. This remote-control unit RCU can comprise a handheld remote-control unit operated by the driver of the charging station transport unit 3. In an alternative embodiment, the remote-control unit RCU can be integrated in the charging station transport unit 3. In a still further possible embodiment, the remote-control unit RCU can also be integrated in the central control unit CCU of an IT center ITC of the distributed charging system 1 as also shown in FIG. 37.

As illustrated in FIG. 2, the one or more battery packs 2D are integrated in the housing 2A of the transportable charging station 2. Each battery pack or battery 2D can comprise a plurality of rechargeable battery cells adapted to store electrical power. The charging station 2 comprises at least one charging connector 2E adapted to connect the electrically powered vehicle 6 to the charging station 2 by means of a power cable as illustrated in FIG. 2. The number and types of the charging connectors 2E of the charging station 2 can vary in different use cases. The electrically powered vehicle 6 can comprise electric cars, electric bikes and/or electric scooters or any other powered vehicle used by users for transporting goods or persons.

The lifting interface unit 2B of the transportable charging station 2 as shown in FIG. 2 can comprise in a possible implementation at least one fixture provided for lifting the housing 2A of the charging station 2 by a crane of the lifting mechanism 4 of the charging station transport unit 3. In an alternative embodiment, the lifting interface unit 2B comprises at least one fork lift entrance adapted to receive a fork lift of the lifting mechanism 4 of the charging station transport unit 3. The lifting mechanism 4 of the charging station transport unit 3 is adapted to lift the transportable charging station 2 of considerable weight having several battery packs 2D with a plurality of rechargeable battery cells. In a possible embodiment, the lifting interface unit 2B of the charging station 2 may comprise a clamping mechanism adapted to clamp the charging station 2 mechanically to the lifting mechanism 4 of the charging station transport unit 3. The lifting mechanism 4 of the charging station transport unit 3 can lift the portable housing 2A of the charging station 2 to a docking frame 3C provided at the transport platform 3B of the charging station transport unit 3. In a possible embodiment, the base frame 5 illustrated in FIG. 2 can also be connected to a local grid 7 or public power supply grid 8. In a possible embodiment, the base frame 5 installed on the ground floor can also comprise protection barriers protecting the charging station from traffic participants.

The weight of the charging station 2 may be more than 1000 kg so that the charging station 2 cannot be removed manually but only with a transport unit 3 such as a transport truck. This considerable weight of e.g., 3000 kg provides inherent antitheft protection. Further the locking mechanism 11 and the antitheft protection unit 2P protect the charging station 2 against unwanted removal.

FIG. 3 shows a block diagram for illustrating a possible exemplary embodiment of a transportable charging station 2 used in a distributed charging system 1 according to the first aspect of the present invention.

As can be seen in FIG. 3, the transportable charging station 2 comprises several main components integrated in the housing 2A of the charging station 2. The charging station 2 comprises a number of charging connectors 2E adapted to connect a corresponding number of electrically powered vehicles 6 and/or other electrically powered devices to the charging station 2. Each charging connector 2E of the transportable charging station 2 can receive a DC charging current from an associated DC/DC converter 2F via a switch 2G controlled by a controller of a control unit 2H of the transportable charging station 2. The control unit 2H of the charging station 2 can be connected via an internal communication bus to a battery management system 21 of the transportable charging station 2. The control unit 2H further comprises a communication module connected via an internal communication bus to the DC/DC converters 2F for controlling the individual charging processes. In a possible embodiment, the control unit 2H of the transportable charging station 2 can also comprise a powerline communication (PLC) module for communication with an external control entity of an electrically powered vehicle 6 or device connected to the charging station 2 by means of a charging connector 2E. In a possible embodiment, the control unit 2H of the transportable charging station 2 can be connected to a user interface 2J of the transportable charging station 2 adapted to display information to a user of the transportable charging station 2 and/or to receive user input commands from a user of the transportable charging station 2. In a still further possible embodiment, the control unit CU 2H of the transportable charging station 2 can comprise a connection to a communication module 2K of the transportable charging station 2. The communication module 2K can be provided for communication with one or more backend servers of the distributed charging system 1. The backend servers can provide different kinds of services, in particular authorization services, electronic payment services, digital streaming services, predictive logistic services, predictive maintenance services, intrusion detection services and/or antitheft protection services. The backend servers can be provided at the IT center ITC or other locations. A communication module 2K can also be used for communication with a controller of a vehicle 6 connected to one of the charging connectors 2E.

FIG. 4 shows a block diagram for illustrating a further possible exemplary embodiment of a transportable charging station 2 which can be used in a distributed charging system 1 according to the first aspect of the present invention. In the illustrated embodiment of the transportable charging station 2, a recharging unit 2L is integrated in the housing 2A of the charging station 2. The recharging unit 2L is adapted to generate electrical power from a fluid or gas filled into at least one fluid container 2M integrated in the housing 2A of the transportable charging station 2 as also illustrated in FIG. 4. In an alternative embodiment, the fluid container 2M can also be connected to the housing 2A of the transportable charging station 2. The recharging unit 2L of the charging station 2 comprises in a possible embodiment fuel cells adapted to generate electrical power from methanol and/or a redox-flow battery module to generate electrical power from an electrolyte. The electrical power generated by the recharging unit 2L can be used to recharge the battery packs 2D of the transportable charging station 2. In a possible embodiment, the charging station 2 comprises an integrated battery loading circuitry 2N connected to the recharging unit 2L using the electrical power generated by the recharging unit 2L to recharge the battery packs 2D integrated in the housing 2A of the transportable charging station 2. In a possible implementation, the lifting interface unit 2B of the transportable charging station 2 can comprise a fluid input 20 adapted to receive fluid or gas from a fluid supply container of the charging station transport truck 3 for storage in the fluid container 2M of the transportable charging station 2. The fluid container 2M can be connected to the recharging unit 2L via an internal fuel supply pipe as also illustrated in FIG. 4. In the illustrated embodiment of FIG. 4, a ground locking interface unit 2C comprises electrical contacts 9 adapted to connect electrically the charging station 2 to a base frame 5. In the illustrated embodiment, the base frame 5 can be connected to a local grid 7 or to a public power supply grid 8 to provide electrical current via the electrical contacts 9 of the ground locking interface unit 2C and power supply lines 10 to the battery loading circuitry 2N of the transportable charging station 2. Accordingly, when the charging station 2 has been unloaded and lifted onto the base frame 5, an electrical connection can be established automatically to supply the battery loading circuitry 2N from the local grid 7 or from a public power supply grid 8. The ground locking interface unit 2C of the illustrated embodiment of FIG. 4 can comprise a locking mechanism 11 to lock the housing 2A of the transportable charging station 2 mechanically to the base frame 5. The locking mechanism 11 of the ground locking interface unit 2C can be remote-controlled in a possible implementation. The base frame 5 comprises electrical contacts to receive the electrical contacts 9 of the ground locking interface unit 2C. The base frame contacts of the base frame 5 establish an electrical connection with a local grid 7 or a public grid 8.

FIG. 5 shows schematically a further possible embodiment of a transportable charging station 2 which can be used in a distributed charging system 1 according to the first aspect of the present invention. In the illustrated embodiment of FIG. 5, the charging station 2 further comprises an antitheft protection unit 2P, a positioning system 2Q and a temperature control system 2R. The antitheft protection unit 2P is adapted to detect an unauthorized removal of the transportable charging station 2 from the base frame 5 or from a docking frame 3C of the charging station transport unit 3.

The charging station 2 further comprises a sensor-based positioning system 2Q which can be used for automatic swapping of the transportable charging station 2 with another transportable charging station 2 carried on the transport platform 3B of the charging station transport unit 3.

In the illustrated embodiment of FIG. 5, the transportable charging station 2 further comprises an integrated temperature control system 2R adapted to cool and/or heat components of the transportable charging station 2.

Figure 25:
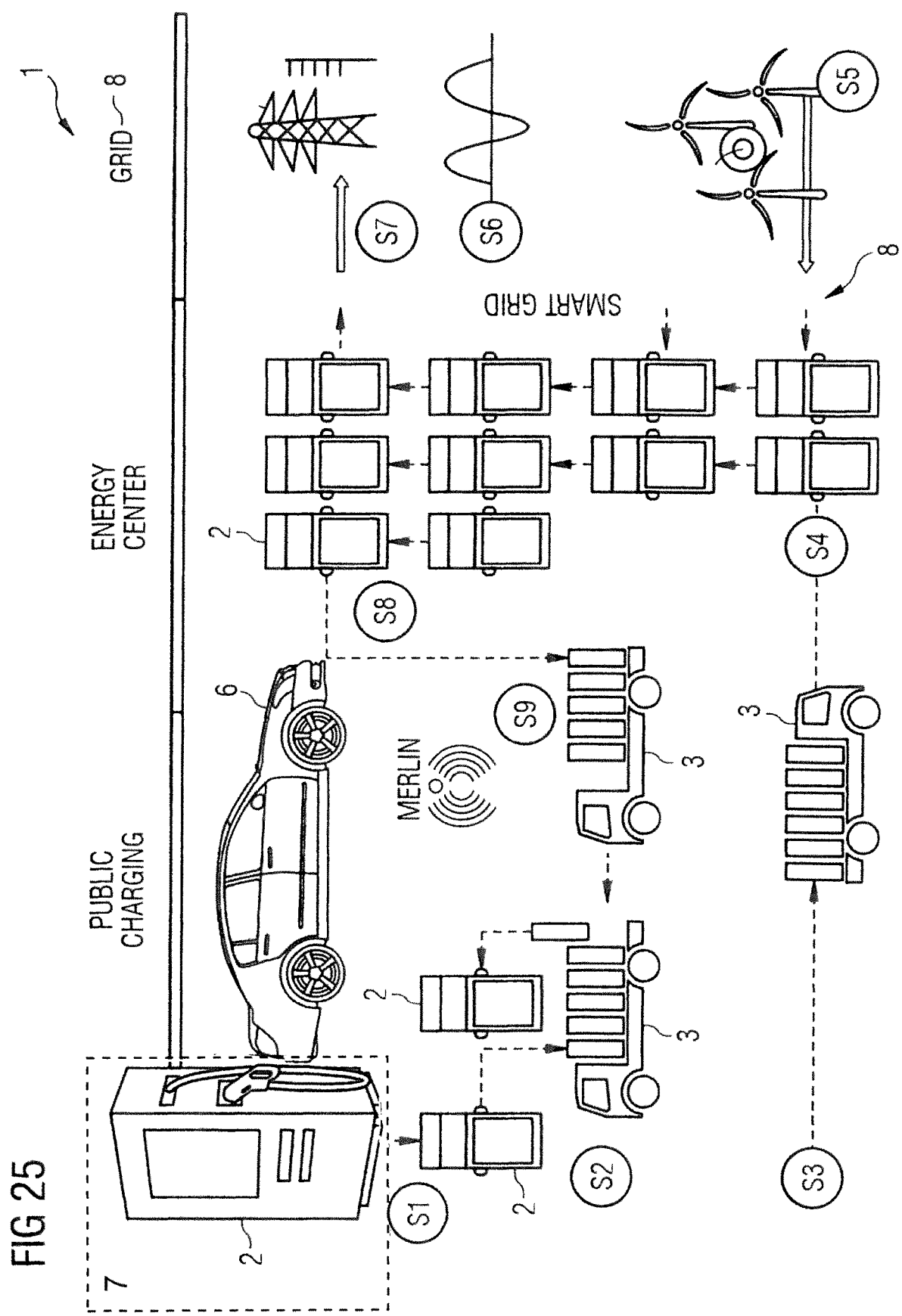
FIG. 25 shows schematically a general concept of the distributed charging system according to the first aspect of the present invention.
Figure 26:
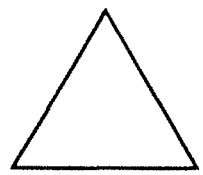
FIG. 26 shows schematically an alignment of a portable charging station to a base plate according to a further aspect of the present invention.

FIG. 6 shows schematically a possible exemplary embodiment of a charging station transport truck 3 used in the distributed charging system 1 according to the first aspect of the present invention. The charging station transport truck 3 comprises in the illustrated embodiment a lifting mechanism 4 adapted to lift the transportable charging station 2 of the distributed charging system 1 onto a transport platform 3B of the charging station transport unit 3 for transport to another location. The transport platform 3B comprises one or more docking frames 3C to receive transportable charging stations 2. In the illustrated example of FIG. 6, two transportable charging stations 2-4, 2-5 have been lifted by the lifting mechanism 4 onto the transport platform 3B and into the corresponding docking frames 3C. The docking frames 3C can comprise a similar structure as a base frame 5 mounted on a ground floor. The docking frames 3C provide an electrical connection between a vehicle power grid 3D of the charging station transport unit 3 and the received charging stations 2-i. In the illustrated exemplary embodiment of FIG. 6, the charging station transport truck 3 further comprises a fluid container 3E adapted to transport a fluid to be filled into fluid containers 2M of transportable charging stations 2-i having recharging units 2L adapted to generate electrical power from the received fluid. A fluid pipe 3F can be integrated in the lifting mechanism 4 such as a crane to transport the fluid stored in the fluid container 3E to the fluid input 20 of the transportable charging station 2 as illustrated in the embodiment of FIG. 4. The transport truck 3 comprises several docking frames 3C where the transportable charging station 2 can be placed for transportation. By putting the charging stations 2 onto the docking frames 3C, they can be automatically connected to the vehicle power grid 3D of the truck 3. Consequently, the charging station transport truck 3 can use in a possible embodiment the still available electrical power stored in the transported charging stations 2. In a preferred embodiment, the charging station transport truck 3 is also electrically powered and comprises an electro motor as well as vehicle batteries. The vehicle batteries of the charging station transport truck 3 can use some of the available electrical power stored in the charging stations 2-i connected to the local vehicle power grid 3D by means of the docking stations 3C. When the charging station transport truck 3 does arrive at the energy hub, i.e., the central reloading station, the charging stations 2-i can be unloaded and can be connected to the energy hub automatically. In a possible implementation, the docking stations 3C are connected to each other mechanically to provide a complete frame for loading or unloading a group of charging stations 2 by means of the lifting mechanism 4 for one loading/unloading operation. For instance, a group of e.g., four charging stations 2-i can then be loaded or unloaded by the lifting mechanism 4 of the charging station transport truck 3. In a possible embodiment, the charging stations 2-i transported by the charging station transport truck 3 can be transported to a designated charging area or a charging location. There it can be unloaded and used to charge electrically powered vehicles 6 such as electro cars. This discharging process does empty the energy battery packs 2D of the charging station 2. As soon as the charging station 2 reaches a low energy level of e.g., 10%, it can send in a possible embodiment via a communication interface a message to a central IT center of the distributed charging system 1. This message can trigger a charging station transport truck 3 to pick up the almost empty charging station 2. The charging station transport truck 3 as illustrated in FIG. 6 can collect discharged charging stations 2 at the same or different charging locations to transport them to the energy hub for reloading. The charging station transport truck 3 picks up the charging station 2 and can bring it to the energy center where the charging station 2 is unloaded and recharged or may be used to offer grid balancing services. This complete cycle can also be referred to as a milkround cycle of the distributed charging system 1 according to the first aspect of the present invention as also illustrated in FIG. 25. In a possible embodiment, the IT center of the distributed charging system 1 can comprise a server having a processing unit performing a self-learning algorithm to optimize the milkround of the distributed charging system 1. The self-learning algorithm may comprise in a possible embodiment also a machine learning, ML, algorithm training an artificial intelligence module AIM implemented in a processor of the server. This allows for predictive logistic services formed by the distributed charging system 1 according to the present invention.

In regions such as a city, there can always be areas which are not used for a considerable time, e.g., months, because they are waiting for a new usage. These areas can be for instance used to install a charging facility comprising several transportable charging stations 2. Such a charging facility can also be used as an intermediate solution before a fixed wired charging station 2 can be built up at the unused area.

The optimal location for setting up a charging station facility including one or more charging stations 2 may be time-dependent and/or depending on the behavior of users of the electro driven vehicles 6. According to an implementation, the central control unit CCU of the distributed charging system 1 can run an algorithm to calculate automatically optimal locations for setting up charging facilities including one or more charging stations 2 based on user data collected by the system 1 during the operations. The charging stations 2 of the distributed charging system 1 according to the first aspect of the present invention can also be operated as an energy storage system in a local or micro grid 7 as also shown in FIG. 39. In case of a bigger event such as a music concert requiring electric energy for a plurality of participants, a number of transportable charging stations 2 can be collected and transported to the location of the music event by one or more charging station transport units 3 to offer charging services to the visitors and/or participants of the respective music event. The energy level of different charging stations 2 may differ. Based on experience and predictive energy level calculation, an algorithm can be executed by the IT center ITC of the system 1 to calculate automatically how much balancing services can be offered by the distributed charging system 1 according to the first aspect of the present invention. The distributed charging system 1 according to the present invention can also provide the functionality to enable multi-station balancing.

In a possible embodiment, a matching process of a location ID with a station ID of a transportable charging station 2 can be executed. A transportable charging station 2 can be transported during its operation lifetime to a plurality of different charging locations or sites. In a possible embodiment, the history of the different locations of the charging station 2 can be memorized in a database of the system 1. During each cycle, the charging station 2 can undergo different operation phases and can be switched between different operation modes. When the charging station 2 is unloaded and deployed on the ground floor it can switch automatically to a deployment operation mode. When the charging station 2 is lifted up to the transport platform 3B of the charging station transport unit 3 it can switch in a possible embodiment to a transport operation mode. When the charging station 2 gets connected to the energy hub, it may be switched to a hub operation mode.

Figure 7:
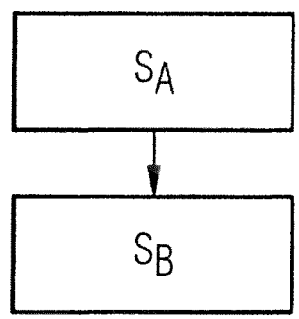
FIG. 7 shows a flowchart of a possible exemplary embodiment of a method for supplying at least one electrically powered vehicle with electrical power according to a further aspect of the present invention.

FIG. 7 shows a flowchart of a possible exemplary embodiment of a method for supplying at least one electrically powered vehicle 6 with electrical power according to a further aspect of the present invention.

In a first step SA, at least one transportable charging station 2, can be unloaded from a transport platform 3B of a charging station transport unit 3 to a ground floor.

The charging station 2 can be placed on a base frame 5 to establish a mechanical and electrical connection with a local micro-grid 7. The charging station 2 may also be placed alternatively on ground floor terrain in the field.

In a further step SB, at least one electrically powered vehicle 6 or other mobile device can be connected to a charging connector 2E of the unloaded charging station 2 to receive electrical power from battery packs 2D integrated in a housing 2A of the unloaded charging station 2 via a power cable.

The transportable charging station 2 forms a mobile, battery powered DC charging station. In a possible embodiment, it does not comprise any power mains connection. In an alternative embodiment, the transportable charging station 2 can also comprise an optional power mains connection. The power mains connection can be used to establish a connection with a local micro-grid 7 or with a public or wide area power supply grid 8. The transportable charging station 2 may comprise one or more charging connectors 2E which can be galvanically isolated. The different charging station connectors 2E may deliver power to several connected vehicles 6 at the same time.

The charging station 2 can be used to charge a vehicle battery of the electrically powered vehicle 6. The energy is delivered by the battery pack 2D and can be regulated by the associated DC/DC converter 2F. The output of the DC/DC converter 2F can be connected to the charging connector cable attached to the charging station 2. In a possible embodiment, during charging of the vehicle battery, the control entity of the connected vehicle 6 and the control unit 2H of the charging station 2 may communicate with each other, e.g., according to IEC 61851-Mode 4 (DC). This communication can ensure that the vehicle battery of the electrically powered vehicle 6 or connected mobile device is charged with correct parameters of charge voltage and/or charge current. The battery management of the connected vehicle 6 can be responsible for detecting the actual battery charge parameters. The control unit 2H of the charging stations 2 is responsible that each charging process does stay within the transmitted limits of voltage and current. The high-level communication during Mode 4 can be done via a powerline communication PLC. This can follow ISO 15118-2.

In a possible embodiment, the control unit 2H of the transportable charging station 2 can communicate with an operator server, for instance via the communication interface 2K. A charge request from a user may be approved or rejected by the control unit 2H. In a possible embodiment, the transportable charging station 2 is capable of reading RFID cards for verification or to get a release by an SMS request. Both services may work over OCPP (open charge point protocol). The communication interface 2K can comprise a wireless interface or transceiver connected to an antenna as also illustrated in FIG. 37. The communication interface 2K can be used to establish a wireless communication link with a central control unit CCU.

The transportable charging station 2 according to the present invention can comprise in a possible embodiment, several battery strings with corresponding DC/DC converters 2F ensuring a galvanic isolation between the connected vehicles 6. In a possible embodiment, the operation temperature of the transportable charging station 2 can be in a range between −30° C. up to 50° C. To achieve this large temperature range, a thermal insulation of the housing 2A can be provided. Further, a thermal management including battery heating/cooling power electronics can be provided by a temperature control system 2R of the charging station 2.

The size and weight of the transportable charging station 2 can vary depending on the use case. The transportability of the charging station 2 by means of a truck 3 has to be ensured. In a possible implementation, the transportable charging station 2 may have a weight of several tons. This provides additional antitheft protection.

In a possible embodiment of the charging station 2, the number of battery packs 2D integrated in the housing 2A can correspond to the number of charging station connectors 2E, i.e., to the number of vehicles 6 connectable to the charging station 2. In a possible embodiment, power balancing between the different battery packs 2D of the charging station 2 can be performed. For instance, the battery management system 21 integrated in the transportable charging station 2 as illustrated in FIG. 3 can be used to perform power balancing between different battery packs 2D of the transportable charging station 2. Each battery pack 2D can comprise a plurality of battery modules including a plurality of rechargeable battery cells. The battery management system 21 may provide the features of state of charge SOC control, precise cell voltage monitoring, state of health (SOH) monitoring, balancing, state of function (SOF), battery cell failure detection, thermal modeling and management as well as charge management.

Figure 8:
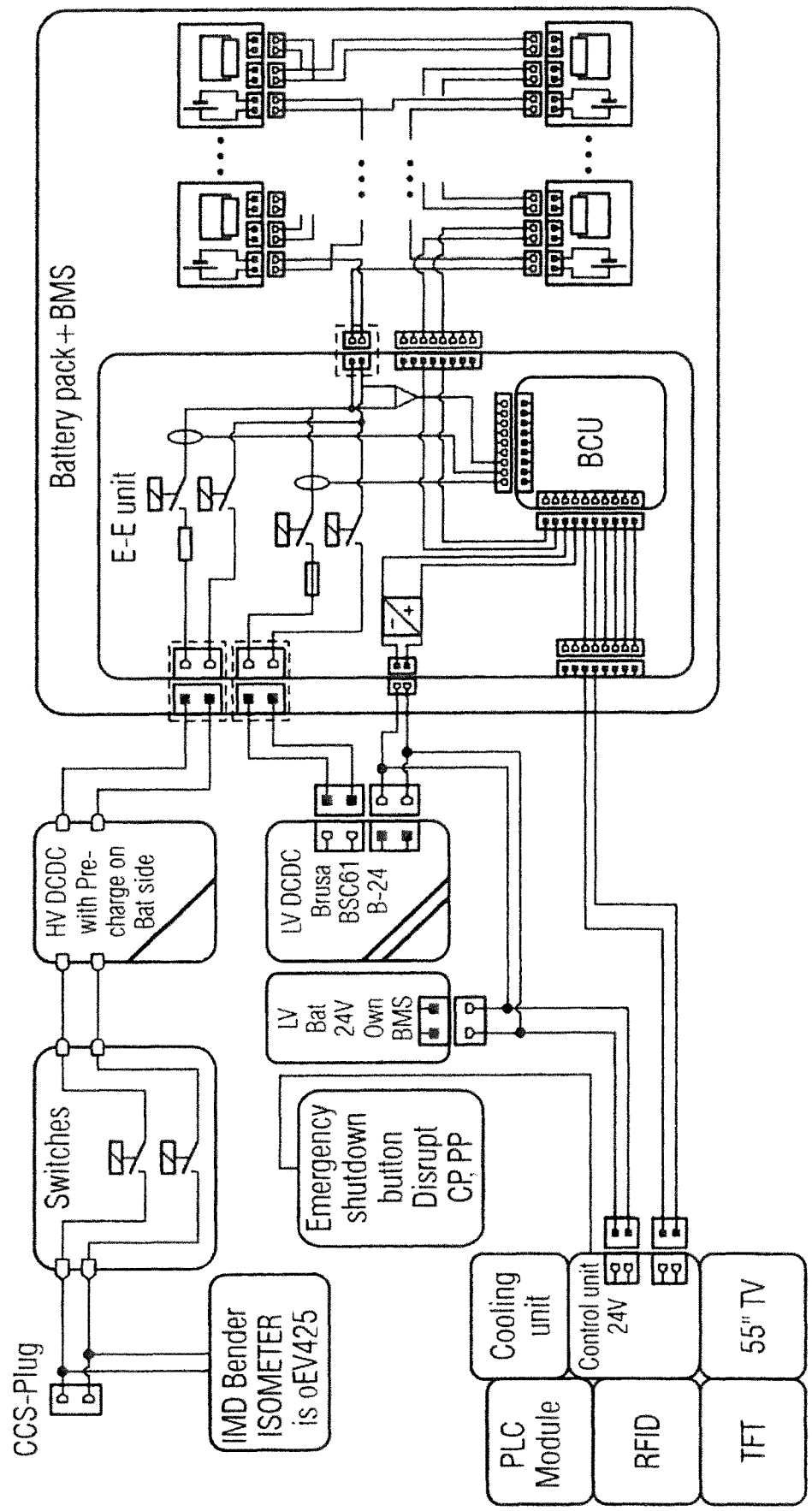
FIG. 8 shows a possible exemplary implementation of a battery string in a distributed charging system according to the first aspect of the present invention.

FIG. 8 shows an exemplary embodiment of a battery string with LV supply in a possible implementation of a transportable charging station 2. As can be seen in FIG. 8, a CCS plug 2E can be connected via switches 2G and a DC/DC converter 2F to battery packs 2D with an integrated battery management system 21. The battery management system BMS can run in a possible embodiment on a battery control unit BCU which can comprise an electronic board placed in the EE-unit. The battery management system BMS has deep discharge and overcharge protection, overcurrent protection, overcurrent protection, current derating dependent on temperature and state of charge SOC. In a possible embodiment, the battery management system BMS can handle up to 900 V and may comprise an isolation monitoring. In a possible embodiment, the battery control unit BCU can comprise a CAN interface and can monitor a number of MCUs.

The DC/DC converters 2F of the transportable charging station 2 can convert the battery voltage of the battery pack 2D into a correct output voltage which is needed to charge the battery of the connected vehicle 6. The setpoint for this voltage can be updated in a possible embodiment every 10 to 50 ms via the CAN connecting the DC/DC converter 2F to the control unit 2H of the charging station 2 as illustrated in the embodiment of FIG. 3. The current control can be performed by the DC/DC converter 2F. The setpoint generation can be done by the controller of the control unit 2H based on BMS limits received from the battery management system BMS 21 of the charging station 2. A current sensor on the output side of the DC/DC converter 2F can provide the DC/DC converter 2F with the amplitude of the electrical current output to the connected vehicle 6.

The DC/DC converters 2F of the charging station 2 can be implemented in different ways. One-stage DC/DC converters 2F have the disadvantage that one side needs to be always higher in voltage than the other side. An overlap of voltage range is not allowed. The charging station 2 of the distributed charging system 1 is capable in a possible embodiment to charge vehicles at a 800 V level.

Figure 9:
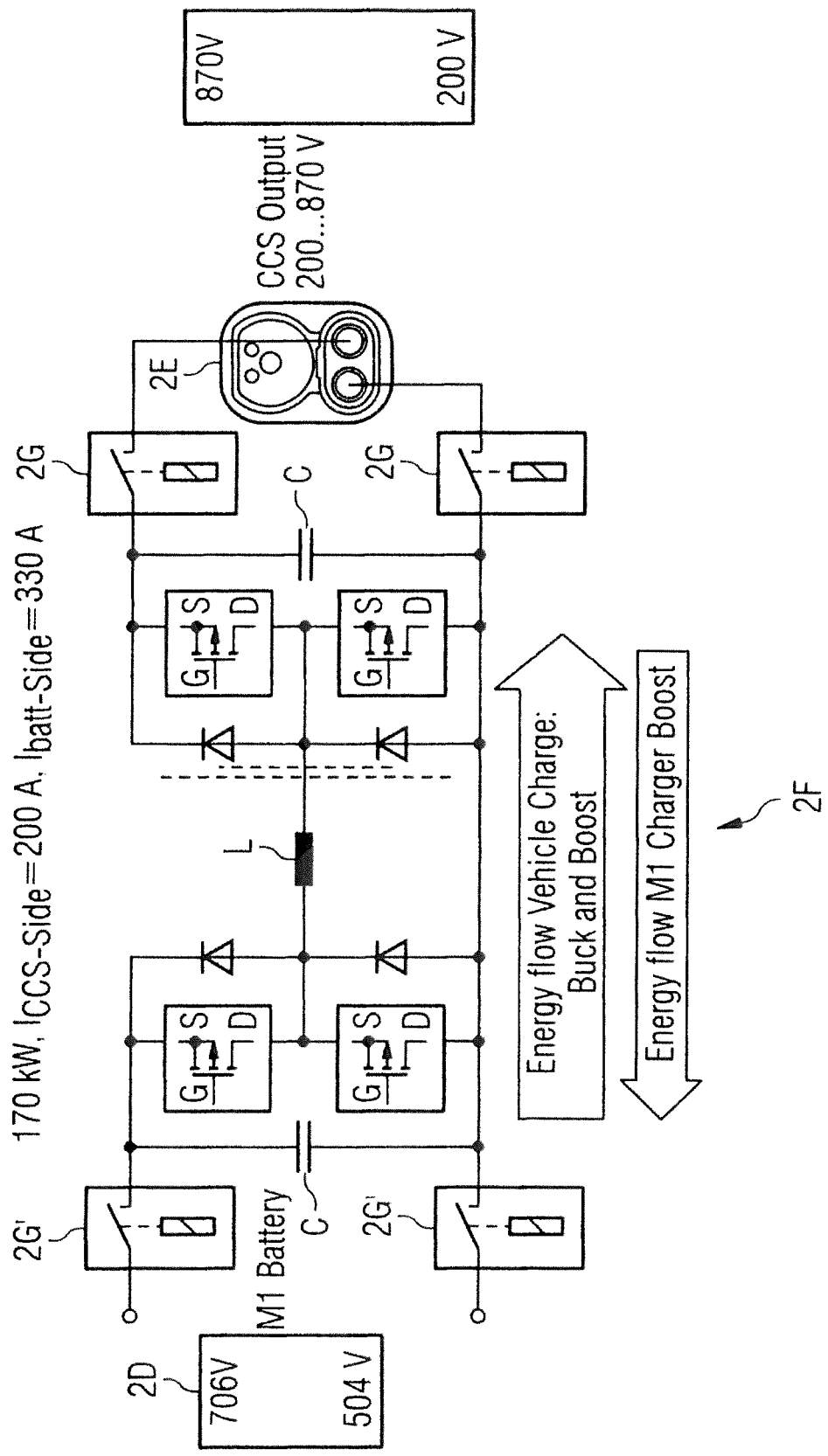
FIG. 9 shows a possible exemplary implementation of a DC/DC conversion used in a distributed charging system according to the first aspect of the present invention.

FIG. 9 shows a possible implementation of a DC/DC converter 2F used in a transportable charging station 2. The illustrated DC/DC converter 2F is a full bridge DC/DC converter. It allows for voltage regulation buck and boost in both directions.

Figure 10:
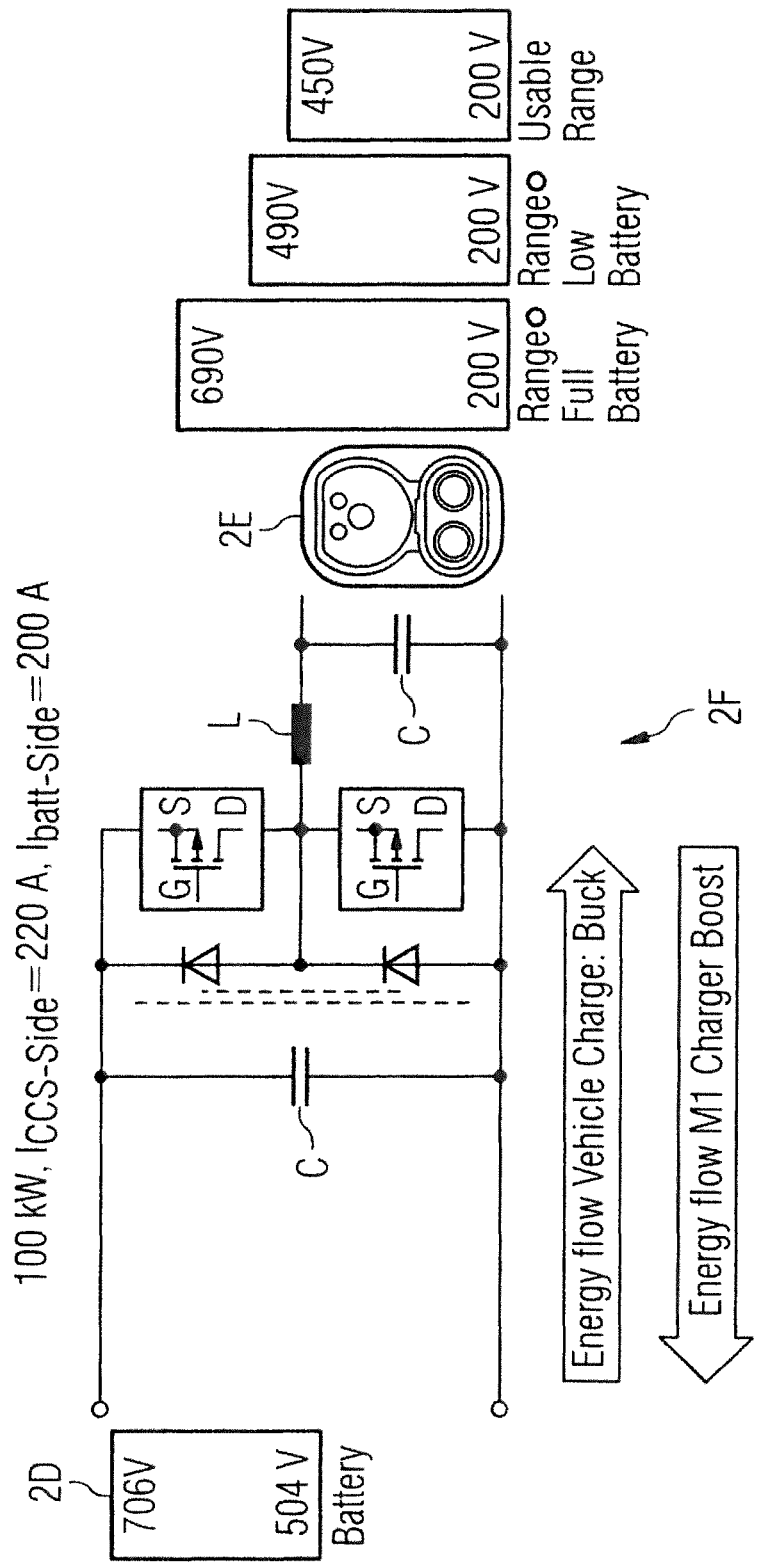
FIG. 10 shows a further alternative implementation of a possible DC/DC conversion performed in a distributed charging system according to the first aspect of the present invention.

FIG. 10 shows an alternative embodiment of a DC/DC converter 2F of a charging station 2.

Figure 11:
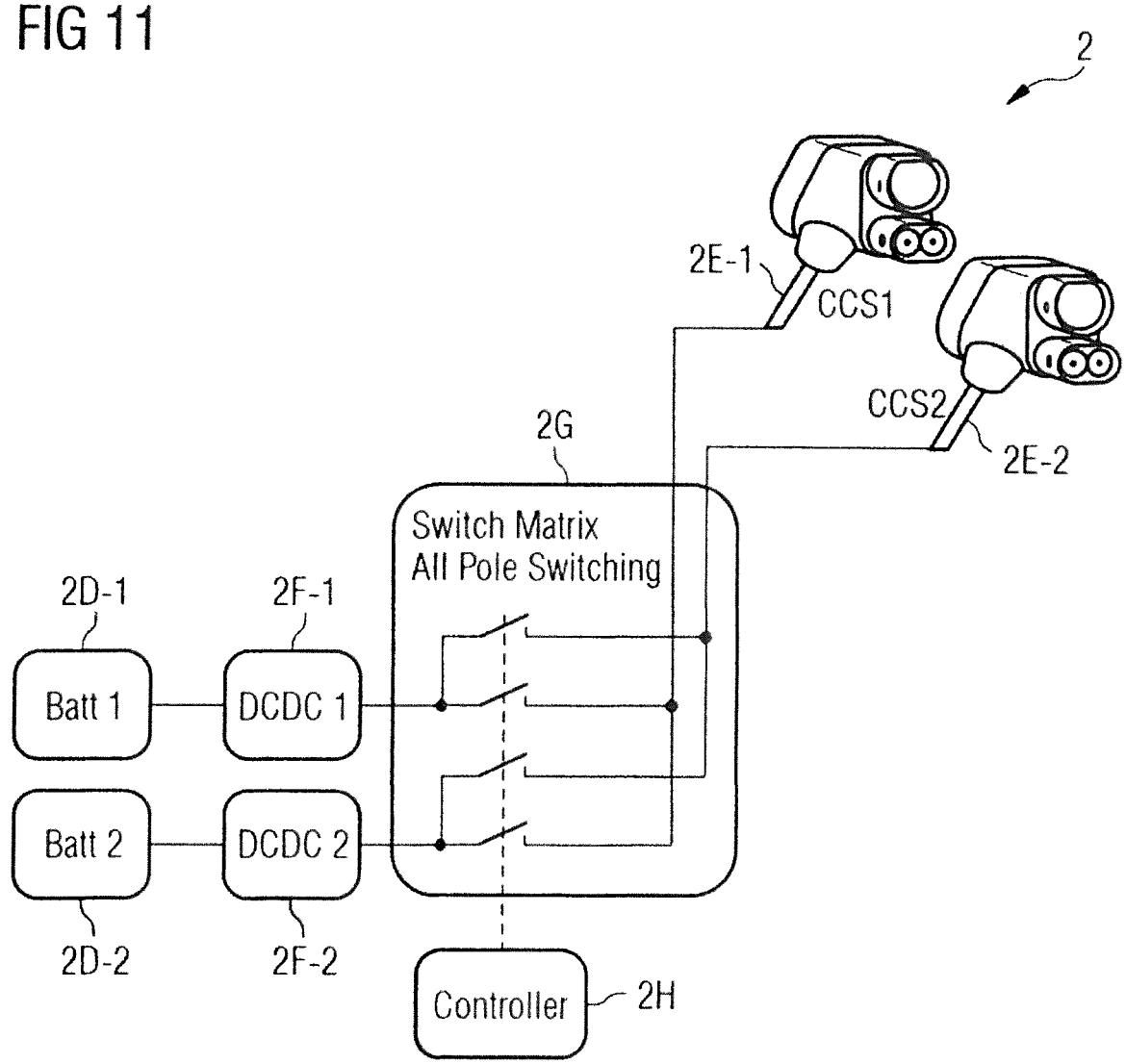
FIG. 11 shows schematically the provision of several charging connectors for a transportable charging station used in a distributed charging system according to the first aspect of the present invention.

FIG. 11 shows schematically a possible exemplary embodiment of a transportable charging station 2 comprising two charging connectors 2E connected by switches 2G of the switch matrix to corresponding DC/DC converters 2F connected to associated battery packs 2D. The controller of the control unit 2H is adapted to control the switches 2G of the switch matrix as shown in FIG. 11. The contactor switch matrix can be integrated to enable a flexible correlation from a first charge cable or a second charge cable to a first or second battery pack 2D. The controller of the control unit 2H can be responsible to make that decision. The decision made by the controller may depend on the SOC levels of the battery packs 2D or e.g., vehicle charge plans, if known. For example, an electro vehicle 6 that has a high energy demand, e.g., 100 kWh, gets supplied first from a first battery pack 2D-1 and then after e.g., 50 kWh have been reached, a change is performed automatically to the other battery pack 2D-2.

The control unit 2H is provided to coordinate the different components of the charging station 2 and to control the individual charging processes. This is also illustrated schematically in FIG. 12. In the illustrated embodiment, the charging control unit 2H has a CAN interface for communication with the battery management system 21 and the DC/DC converters 2F of the charging station 2. The control unit 2H exchanges information with the battery management system 21. This information includes the battery current, the battery voltage, the battery current limit, the battery temperature, battery contactor states as well as possible error flags. In the other direction, the control unit 2H receives information from the battery management system 21. The control unit 2H may inform the battery management system 21 about contactor state setpoints.

The control unit 2H provides the DC/DC converter 2F also with information via the CAN bus. This information can comprise an output current setpoint, an output voltage setpoint, an input current setpoint and/or an input voltage setpoint. Further, the control unit 2H can switch on or off a connected DC/DC converters 2F.

On the other hand, a DC/DC converter 2F can provide the control unit 2H also with information via the CAN bus. This information can comprise the measured output current, the measured output voltage, the measured input current and/or the measured input voltage. Further, the DC/DC converter 2F can indicate a DC/DC operation temperature to the control unit 2H to indicate current limits.

Figure 12:
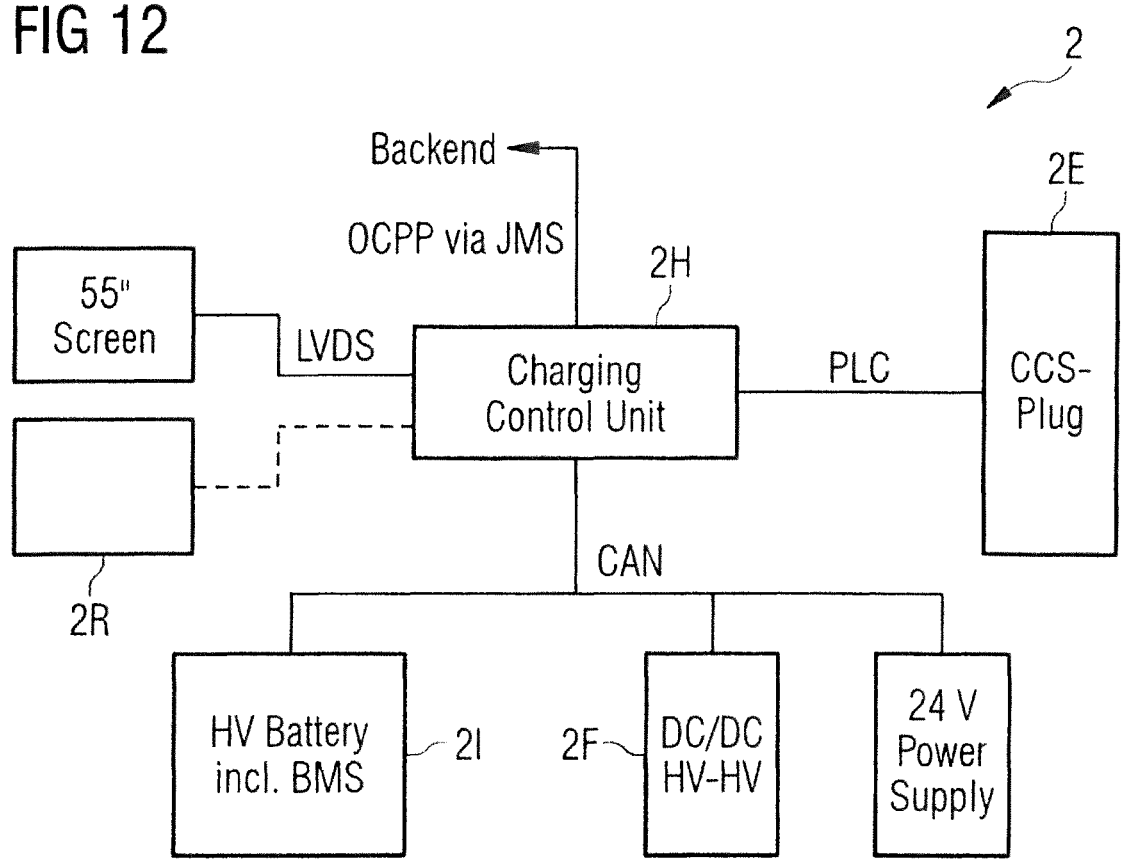
FIG. 12 shows a block diagram of a further possible exemplary embodiment of a transportable charging station used in a distributed charging system according to the first aspect of the present invention, FIGS. 13A, B, C illustrate a possible exemplary implementation of charging connectors of a transportable charging station used in a distributed charging system according to the first aspect of the present invention.

In a possible embodiment as illustrated in FIG. 12, the charging system 2 comprises a 24 V power supply unit. The 24 V power supply unit may indicate to the control unit 2H a power supply temperature and/or possible error flags.

In a possible embodiment, the communication with the connected electrical vehicle 6 can be done via a PLC module. The OCPP communication with the backend servers can be done in a possible implementation via a mobile phone network interface (UMTS/EDGE/GSM interface).

The control unit 2H does communicate with a temperature control system 2R integrated in the charging station 2. A cooler may be controlled via an analog or PWM interface dependent on monitored component temperatures.

The control unit 2H can also be used to monitor and meter the energy supplied to a connected electro vehicle 6. In a possible implementation, an energy meter can be integrated for each charging connector 2E.

Figure 13A:
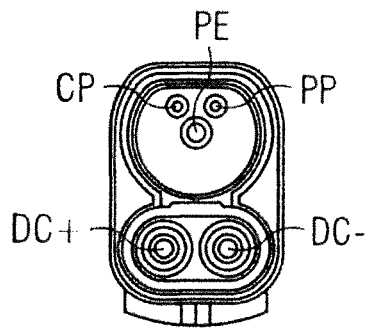
Figure 13B:
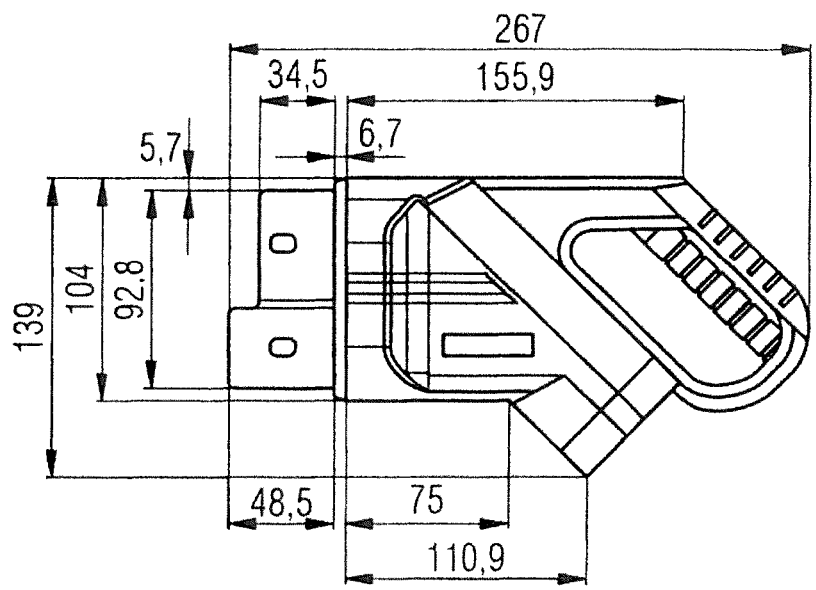
Figure 13C:
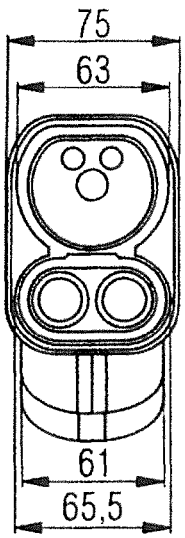

FIGS. 13A, 13B, 13C illustrate a possible exemplary embodiment of a CCS connector 2E which can be used in a transportable charging station 2.

In a charging process, the transportable charging station 2 is used to charge a connected electric driven vehicle 6. The charging process can be performed as defined in IEC 61851-23 Annex CC. From an idle operation state, the charging station 2 can first perform an identification by EIM. Then, the vehicle 6 can be connected to the charging station 2 by a plug. The charging station 2 checks proximity and may establish PWM and Mode 4 communication. In a further step, electrical isolation can be checked. In a further step of the charging process, precharging can be performed and a connection by a relay established. Then, a power flow with the requested current and voltage is provided. The vehicle battery of the vehicle 6 is charged up to an upper SOC limit (e.g., 80 to 85%). Finally, when the power flow has stopped, the relay is disconnected and the plug removed.

In another charging process, the transportable charging station 2 transported to the central energy hub can be recharged by the central station. In a possible embodiment, the charging of the transportable charging station 2 at the central station can be realized by using one of the CCS charge cables. This has the advantage that no additional hardware is required. The software executed by the controller of the control unit 2H can provide the charge function.

From an idle operation state, the charging station 2 can be charged to recharge its battery packs 2D when a CCS connector 2E is plugged into a charging device of the central charging station. The control unit 2H detects an electrical voltage on the DC/DC pins of the CCS connector 2E. The charging device may detect the charging station 2 by proximity. The charging device increases the voltage after a predefined time. The control unit 2H of the charging station 2 detects a defined voltage increase after a predefined time. The control unit 2H may detect a charge request and then check the electrical isolation. A precharge can be performed and the relays closed. The charge operation may be performed with 500 V DC with a maximum charging current of 200 Amp. The DC/DC converters 2F can control the charge current and voltage by communication with the battery management system 21.

Figure 14:
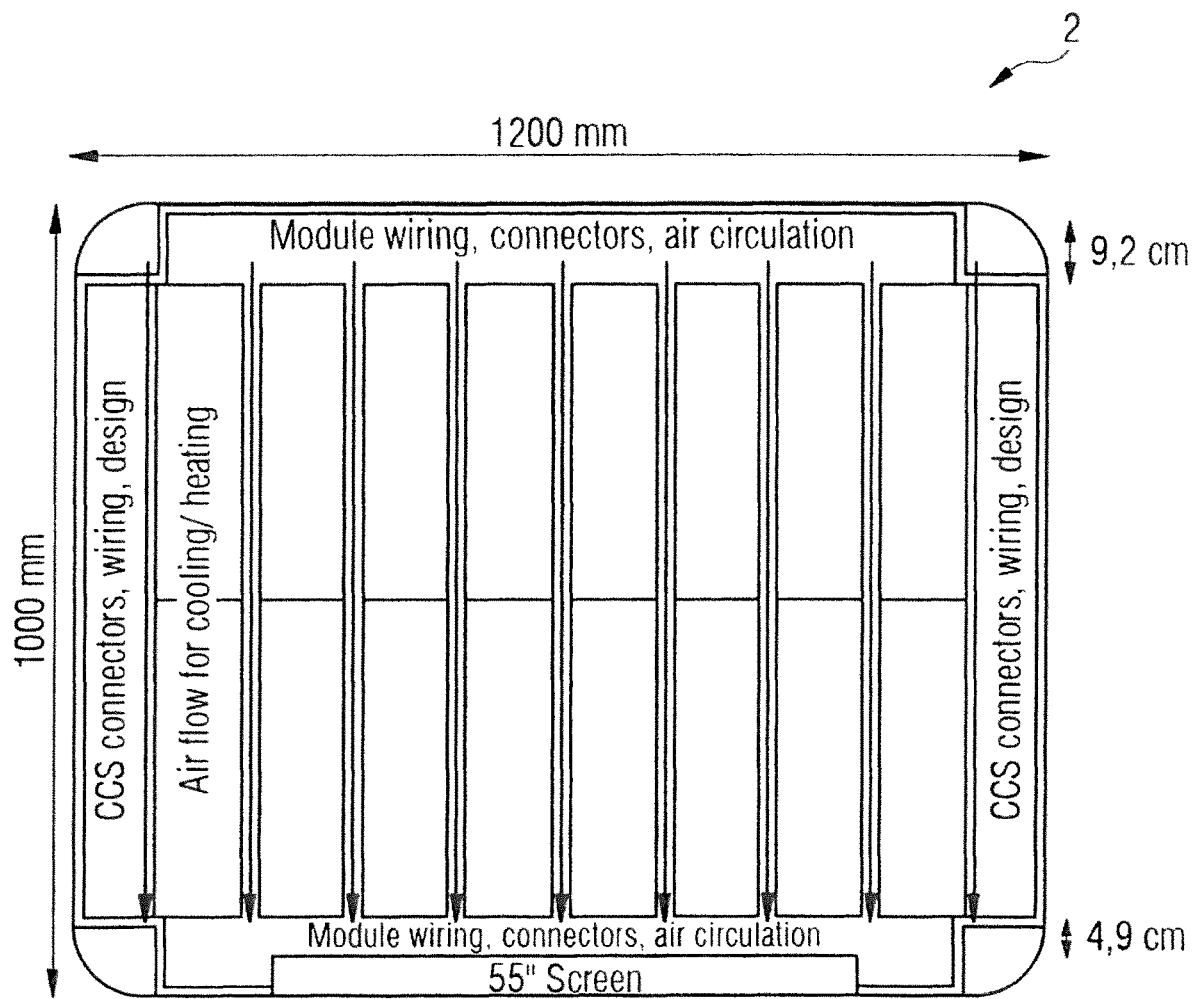
FIG. 14 shows schematically a cooling concept for a transportable charging station used in a distributed charging system according to the first aspect of the present invention.

The transportable charging station 2 comprises an integrated temperature control system 2R. FIG. 14 illustrates the cooling of battery modules by means of an airflow through a 3 mm distance of the modules next to each other.

Figure 15:
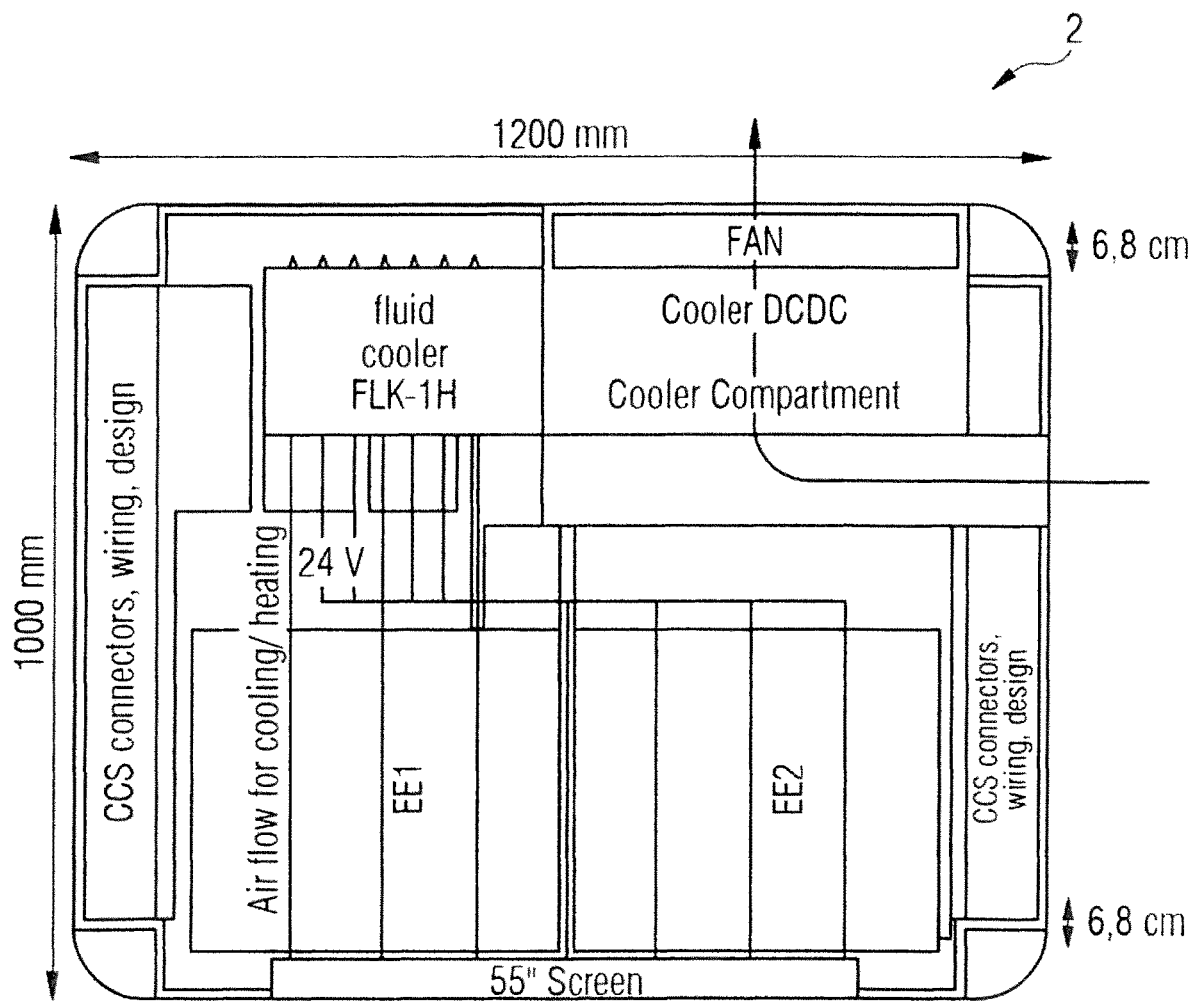
FIG. 15 shows schematically a cooling and/or heating concept used in a transportable charging station of a distributed charging system according to the first aspect of the present invention.

FIG. 15 further illustrates the cooling/heating airflow circle within the housing 2A of the charging station 2.

Figure 16:
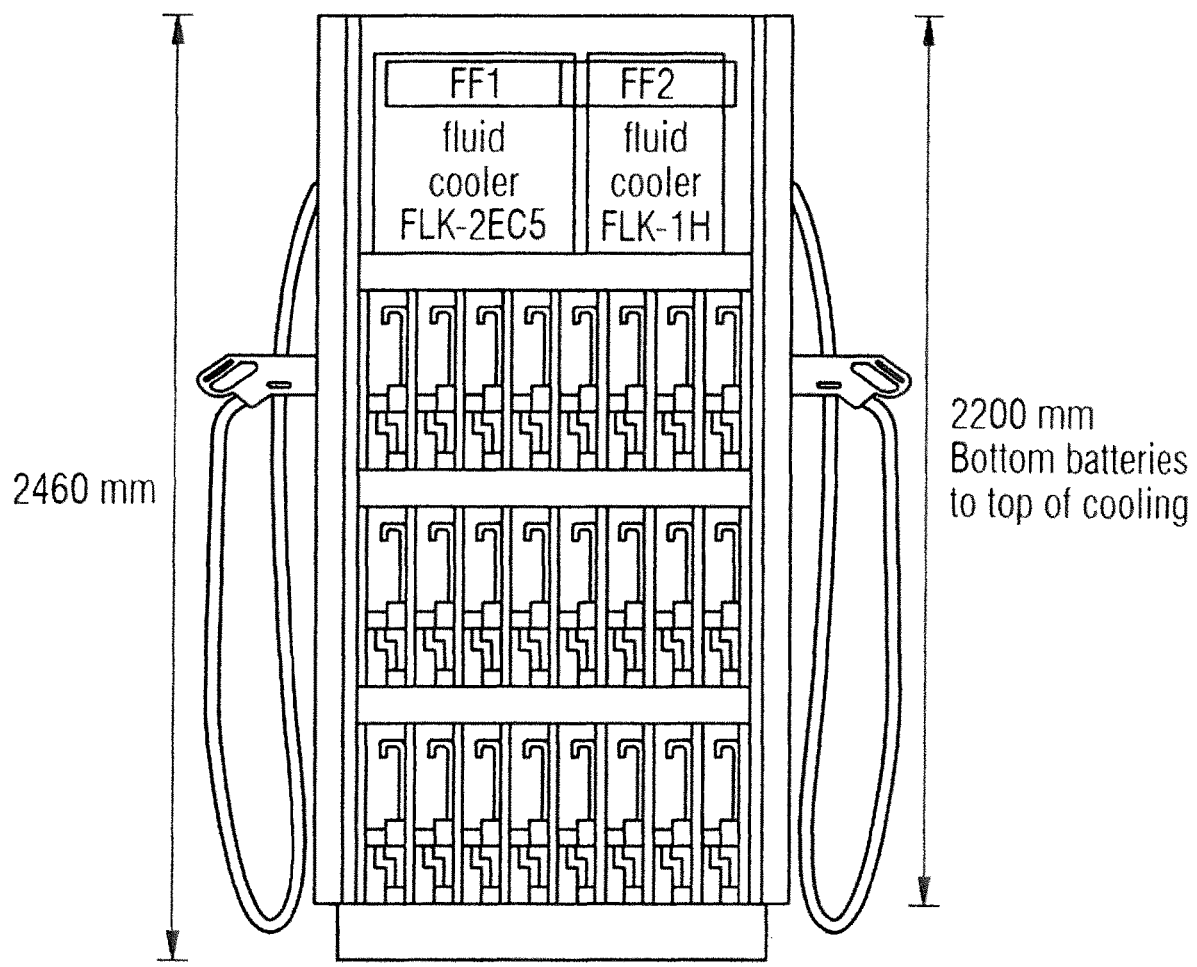
FIG. 16 shows schematically a possible exemplary embodiment of a transportable charging station of a distributed charging system according to the first aspect of the present invention.

FIG. 16 illustrates a possible exemplary embodiment of a transportable charging station 2 with a fluid cooler. The fluid cooler that can be flowed by ambient air can comprise a sandwich cooler for cooling entities next to each other. The ambient air can be sucked through the compartment cooler first, and then through a DC/DC cooler.

Figure 17:
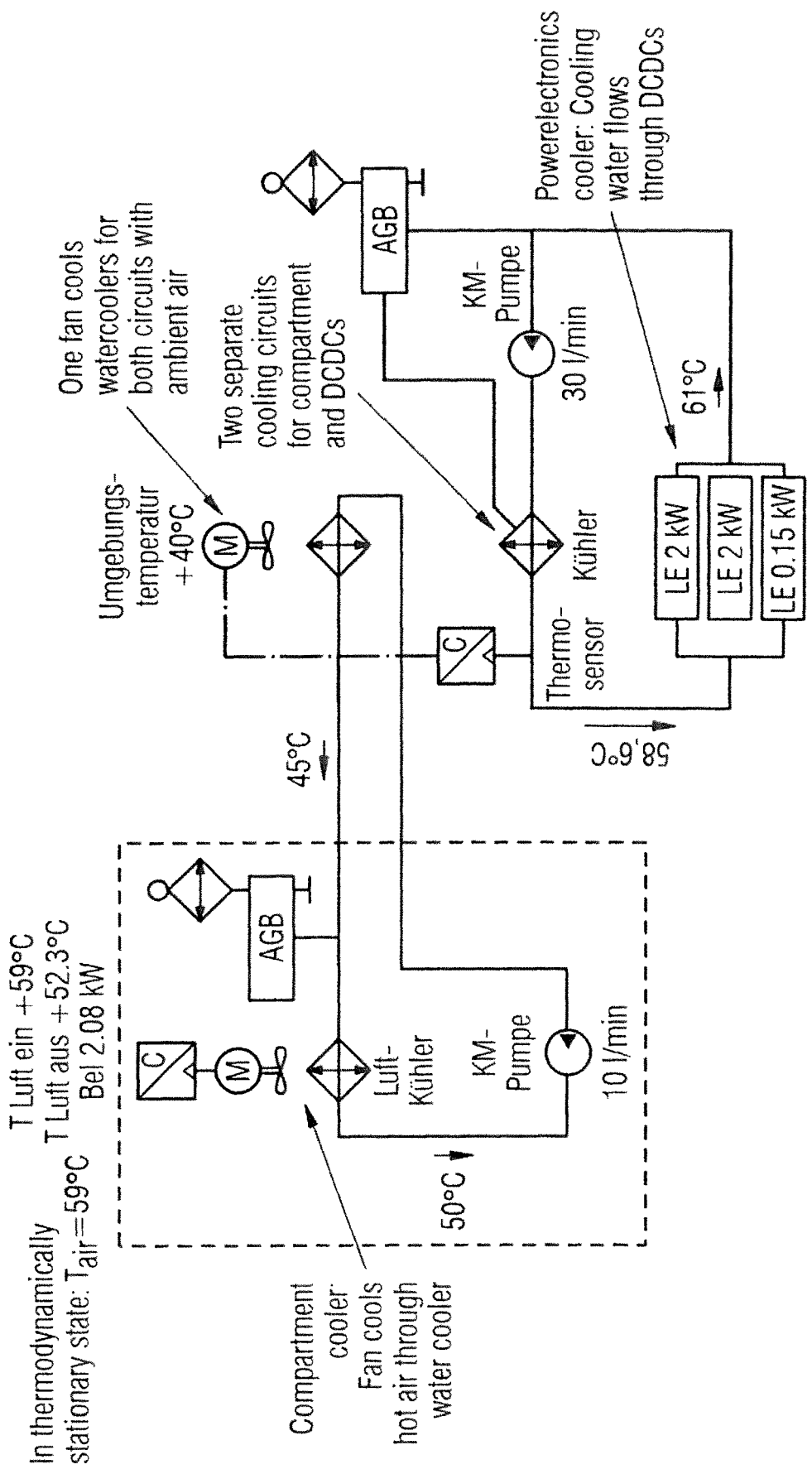
FIG. 17 shows schematically a possible exemplary embodiment of a cooling system used in a distributed charging system according to the first aspect of the present invention.

FIG. 17 shows schematically a possible implementation of a temperature control system 2R. The system 2R can comprise a compartment cooler and/or a power electronics cooler.

Figure 18:
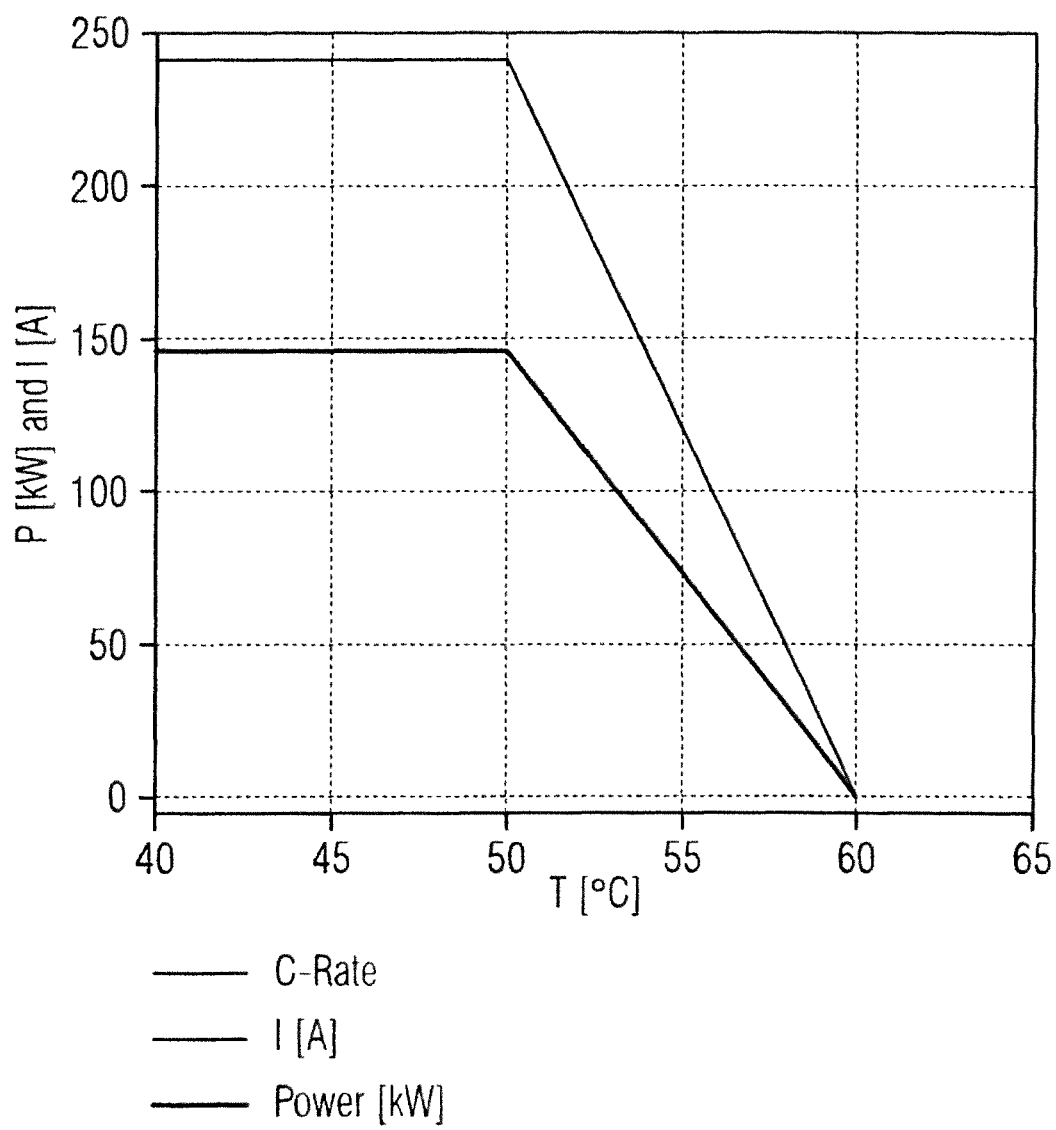
FIG. 18 shows schematically a diagram for illustrating the operation of a transportable charging station within a distributed charging system according to the first aspect of the present invention.

FIG. 18 illustrates a possible derating strategy. Up to 50° C., there is no derating. Between 50° C. and up to 60° C., the derating is performed. At 60° C. and above, the operation is stopped.

Figure 19:
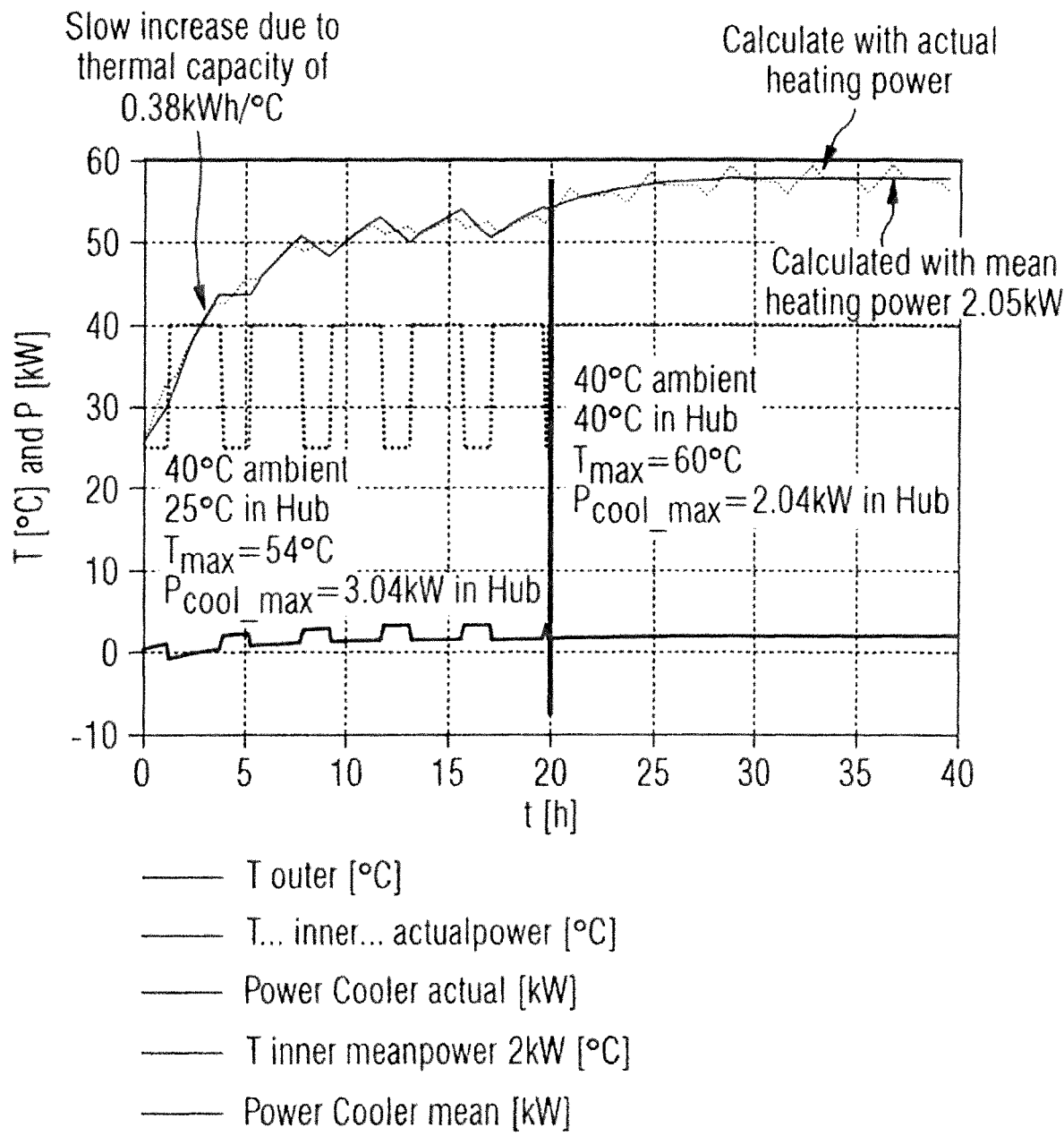
FIG. 19 shows schematically diagrams for illustrating the operation of a distributed charging system according to the first aspect of the present invention.

FIG. 19 illustrates a possible implementation of a temperature control performed by a temperature control system 2R of the charging station 2.

Figure 20:
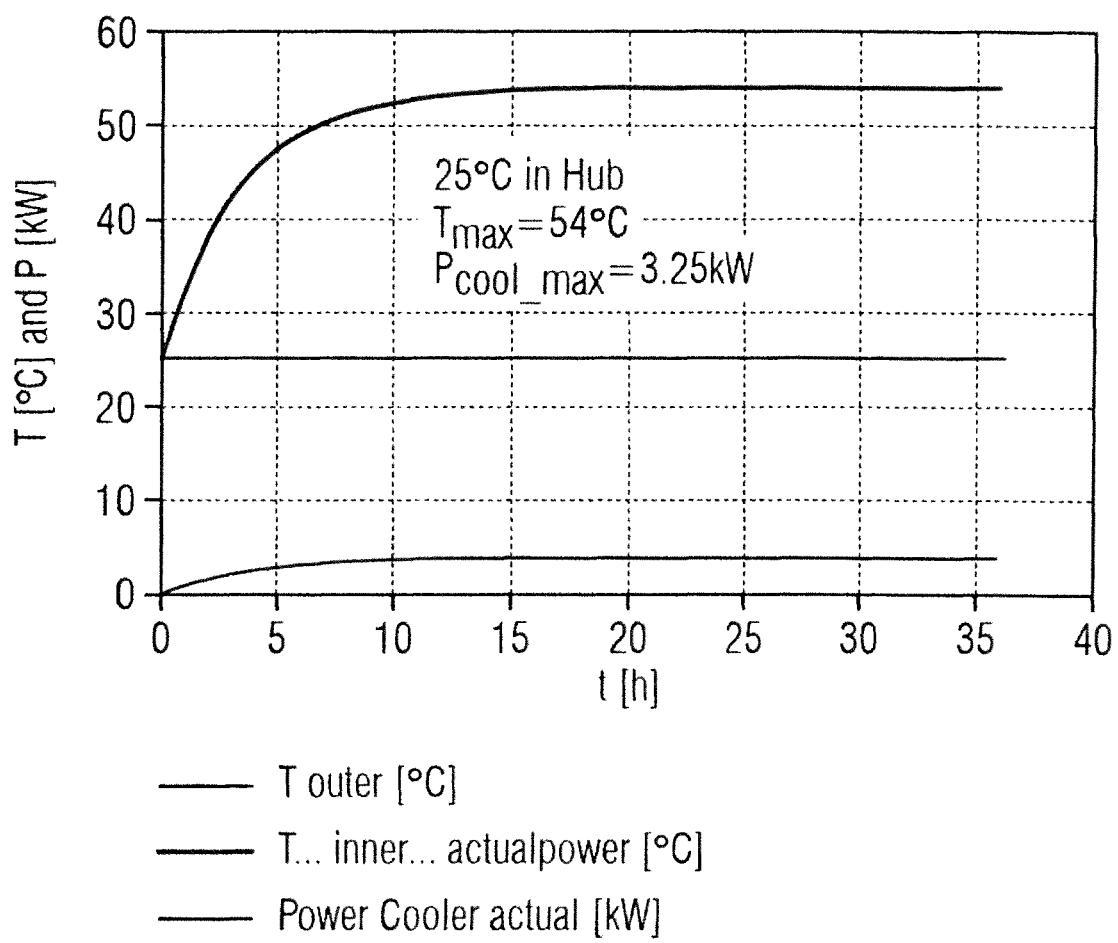
FIG. 20 shows further diagrams for illustrating a possible implementation of a distributed charging system according to the first aspect of the present invention.

FIG. 20 illustrates a mission profile with derating charging/discharging at the central power hub.

Figure 21:
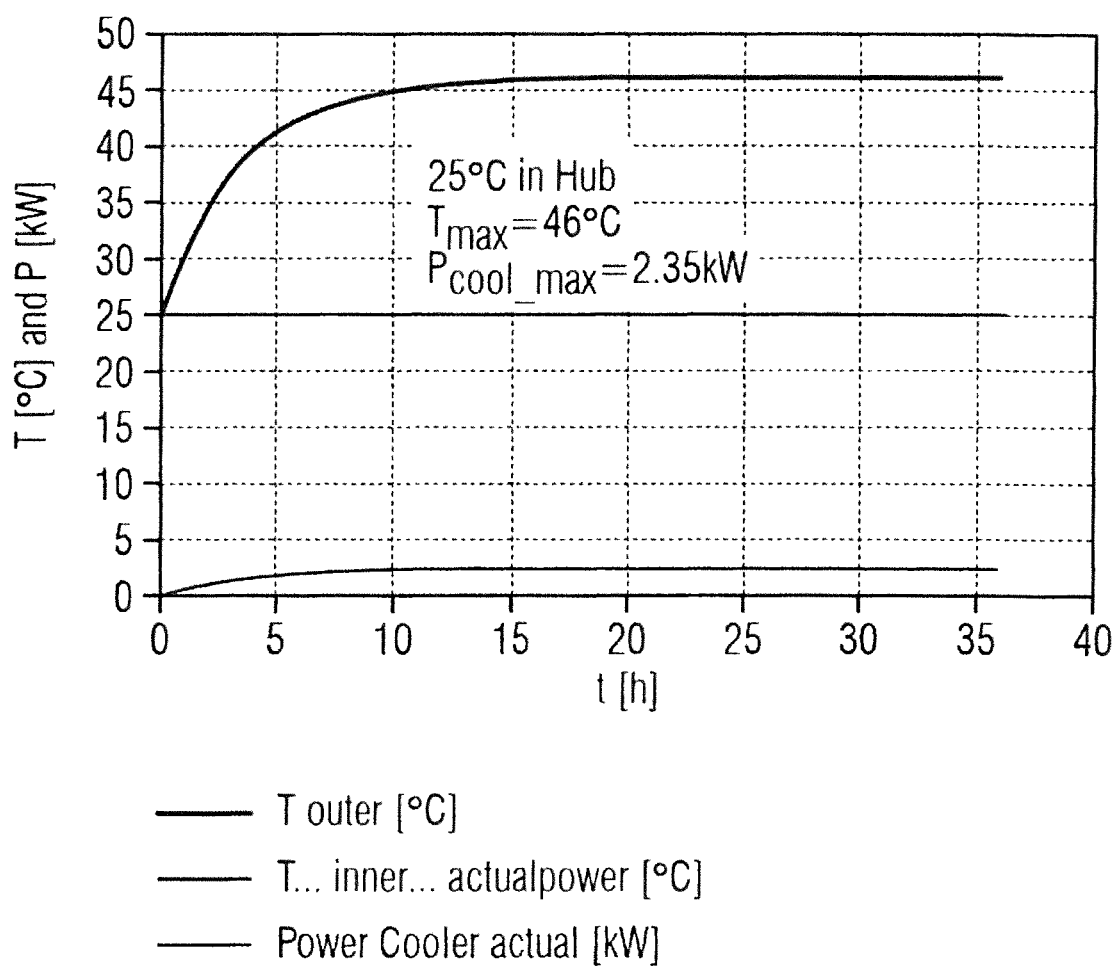
FIG. 21 shows further diagrams for illustrating the operation of a distributed charging system according to the first aspect of the present invention.

FIG. 21 shows a further mission profile for other parameters. To ensure operation of the charging station 2 at a temperature above 40° C., active cooling with a refrigerator can be provided. A water cooling unit can be provided to drive two charging connectors 2E with 200 Amp each. This allows to charge two vehicles 6 with 400 V with 80 kW each.

Figure 22:
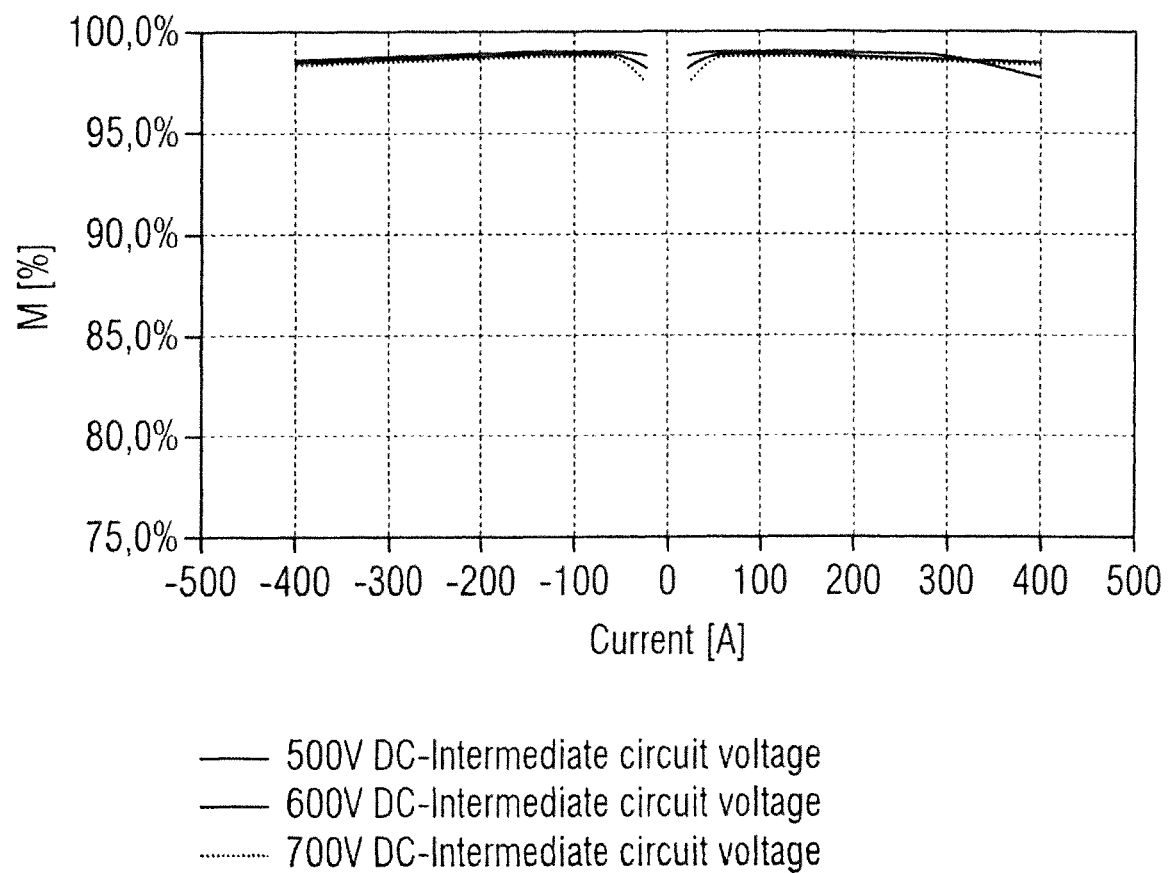
FIG. 22 shows diagrams for illustrating the operation of a distributed charging system according to the first aspect of the present invention.

FIG. 22 illustrates the performance of different DC intermediate circuit voltages for different output current amplitudes. As can be seen from FIG. 22, the efficiency can reach approximately 97.5%.

Figure 23:
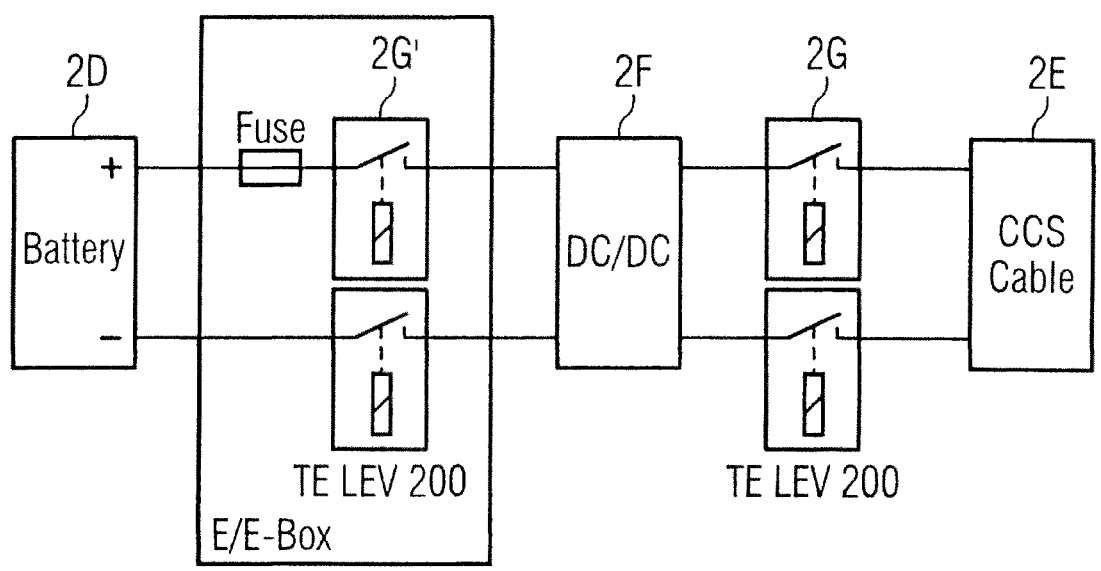
FIG. 23 shows a further diagram for illustrating a possible exemplary embodiment of a transportable charging station used in a distributed charging system according to the first aspect of the present invention.

FIG. 23 shows a block diagram for illustrating a further possible exemplary embodiment of a transportable charging station 2. As can be seen in FIG. 23, the charging station 2 can be switched off by several circuit breakers. The battery strings can be disconnected from the DC/DC converter 2F for both the plus and minus pole. The CCS cable can also be disconnected from the DC/DC converter 2F as illustrated in FIG. 23. For short circuits with measured electrical current of a predefined threshold of e.g., 1000 Amp, the contactor can remain closed because in this case the fuse illustrated in FIG. 23 is responsible to interrupt the circuit.

Figure 24:
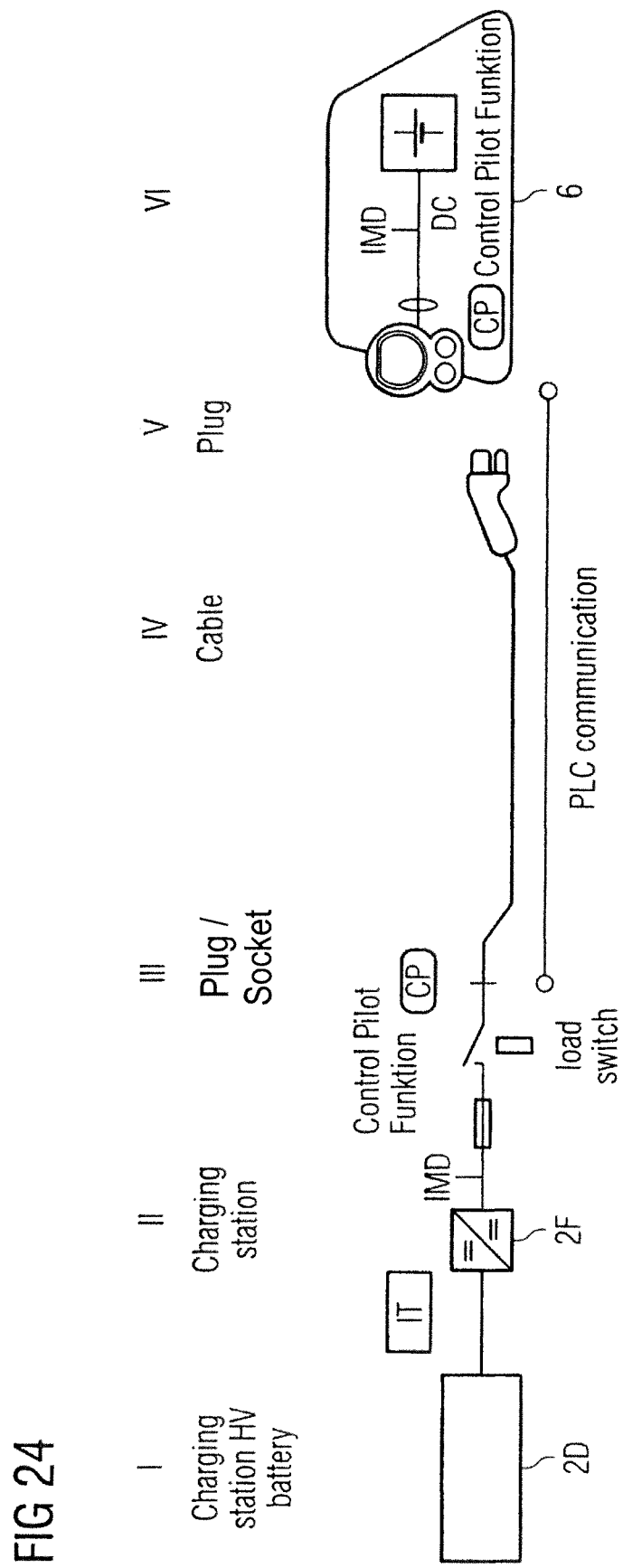
FIG. 24 shows a diagram for illustrating a possible exemplary embodiment of an earthing concept which can be used in a distributed charging system according to the first aspect of the present invention.

FIG. 24 illustrates a possible earthing concept used in a charging station 2 of the system 1 according to the present invention. The charging station 2 and the electric vehicle 6 can build an IT grid. That means there is no earth connection. Touchable parts like the housing 2A the charging station 2 and the vehicle body of the connected vehicle 6 can be monitored for insulation by an IMD. During vehicle charge operation, the IMD integrated in the vehicle shall be turned off according to IEC 61851-23.

In a possible embodiment, a charge process authorization can be performed either directly at the charging station 2, e.g., by using RFID authorization and/or by means of messages exchanged with a central server of the distributed charging system 1. The authorization server can be a backend server connected to the communication interface 2K of the charging station 2 via a wired or wireless link. A local authorization can be performed by using RFID transponders. In this embodiment, the charging station 2 comprises an RFID reader to verify an RFID transponder. Alternatively, a backend server may provide an authorization by means of SMS messages. An SMS number and message can be announced to a user as plain text or as a QR code. The SMS can result in a successful authorization of the charging process. This information can be forwarded to the charging station 2, e.g., via UMTS based on the OCPP protocol. In a possible embodiment, the charging station 2 can send continuously the values of charge current, charge voltage, battery voltage, battery SOC, charging state and diagnostic trouble codes to a remote backend server of the system 1. The remote backend server can be located at the IT center ITC shown in FIG. 37.

FIG. 25 illustrates the operation circle of transportable charging stations 2 in the distributed charging system 1 according to the first aspect of the present invention. Each transportable charging station 2 comprises a control unit 2H which can form a local control unit LCU of a microgrid 7 as shown in the block diagram of FIG. 3 and in the schematic diagram of FIG. 37. A vehicle 6 is connected to the transportable charging station 2 for recharging its vehicle battery at step S1. When the state of charge SoC of the battery packs 2D of the charging station 2 falls beneath a predefined charging level the charging station 2 is replaced by a loaded charging station 2 at the charging location in step S2 as illustrated in FIG. 25. The empty charging station 2 is loaded to the transport platform 3B of the charging station transport truck 3 and transported in step S3 to a central energy center for reloading the charging station 2 as shown in FIG. 25. As can be seen in FIG. 25, the energy center can comprise reloading or recharging stations which can reload at step S4 a plurality of charging stations 2 at the same time. The energy center of the distributed charging system 1 can be connected to a smart grid. Renewable energy sources can be connected to the smart grid 8 to provide in step S5 power for recharging the charging stations 2 at the energy center. A plurality of charging stations 2 connected to the energy center and connected to power supply lines or cables of the power supply grid 8 can also be used for grid balancing in step S6, i.e., for stabilizing the operation of the power supply grid 8. Accordingly, the charging station 2 connected to the smart grid 8 can either draw electrical energy from the smart grid 8 but also supply in step S7 energy into the smart grid 8 for stabilization purposes. If one or more of the charging stations 2 deployed in the field signals that it runs out of electrical power, it may send a message to the closest energy center triggering the uploading of at least one other transportable charging station 2 at step S8 onto a transport truck 3 driving to the identified charging location or site of the charging station 2 which has sent the message.

After having reached the location, the transported full charging station 2 is unloaded in step S9 and can then be used for recharging electric vehicles 6 in step S1 again. The charging stations 2 can form a kind of power banks for electric vehicles 6. The circle comprising steps S1 to S9 illustrated in FIG. 25 shows a flexible concept allowing to recharge a plurality of electrically powered vehicles 6 in an urban environment and also in the field without provision of a charging station infrastructure connected to a power supply grid 8. The transportable charging station 2 does not require an electrical connection to a local grid 7 or to a public power supply grid 8 and can be transported flexibly to any desired charging location. Each energy center for reloading the charging station 2 can be set up at any location having access to a power supply grid 8. The distributed charging system 1 according to the present invention can have several energy centers in different areas supported by the system 1. A central IT system having a central control unit CCU can coordinate automatically the transport of the charging stations 2 by the different transport units 3. The distributed charging system 1 as illustrated in FIG. 25 is very flexible and can change the allocation of the charging stations 2 depending on the current demand at a specific location and/or area. The charging stations 2 can be shifted easily between different locations depending on the momentary charging demand. It is even possible that the transportable charging station 2 can be transported to an electric vehicle 6 having run out of power or standing on a street without the possibility to go on since its vehicle batteries are empty. In such an emergency, the transportable charging stations 2 can be transported by a transport truck 3 to the respective electro vehicle 6 with empty vehicle batteries for recharging. The central IT center ITC of the distributed charging system 1 according to the present invention as shown in FIG. 37 can be linked to a navigation system used for navigating transport units 3 to the charging and recharging locations. A GPS system can be used to navigate the fleet of transport units 3, in particular transport trucks 3, to the right destination locations, i.e., to the locations of the base frames 5. In possible embodiments, position coordinates of the base frames 5 are stored in a database of the distributed charging system 1. A deployed charging station 2 can communicate in a possible embodiment with the central IT center ITC of the system 1 by mobile telephone networks. The IT center ITC of the system 1 can monitor in real time the operation and/or charging state of all charging stations 2 deployed in the field. The IT center ITC can also monitor and control the movement of the transport units 3 between different locations and charging stations 2. This allows for predictive logistic services as well as for predictive maintenance services. The system 1 can also provide intrusion detection services as well as antitheft protection services. Further, the backend servers of the system 1 can provide for a user authorization service and/or electronic payment services.

Figure 27:
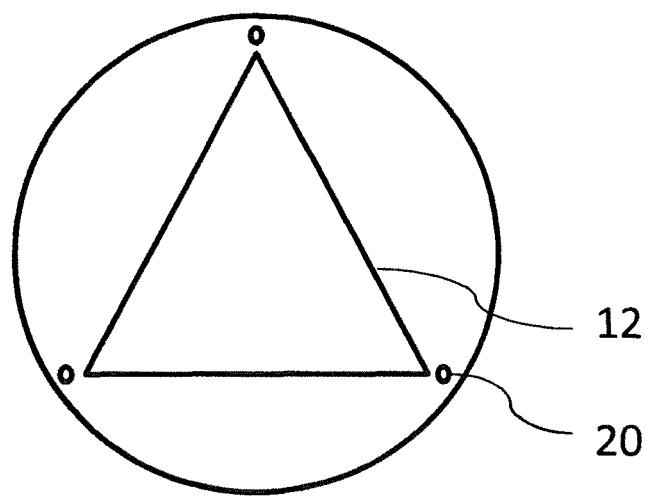
FIG. 27 shows schematically a vertical view of a side without moving parts of an automatically engaging ground-locking interface unit according to a further aspect of the present invention.
Figure 28:
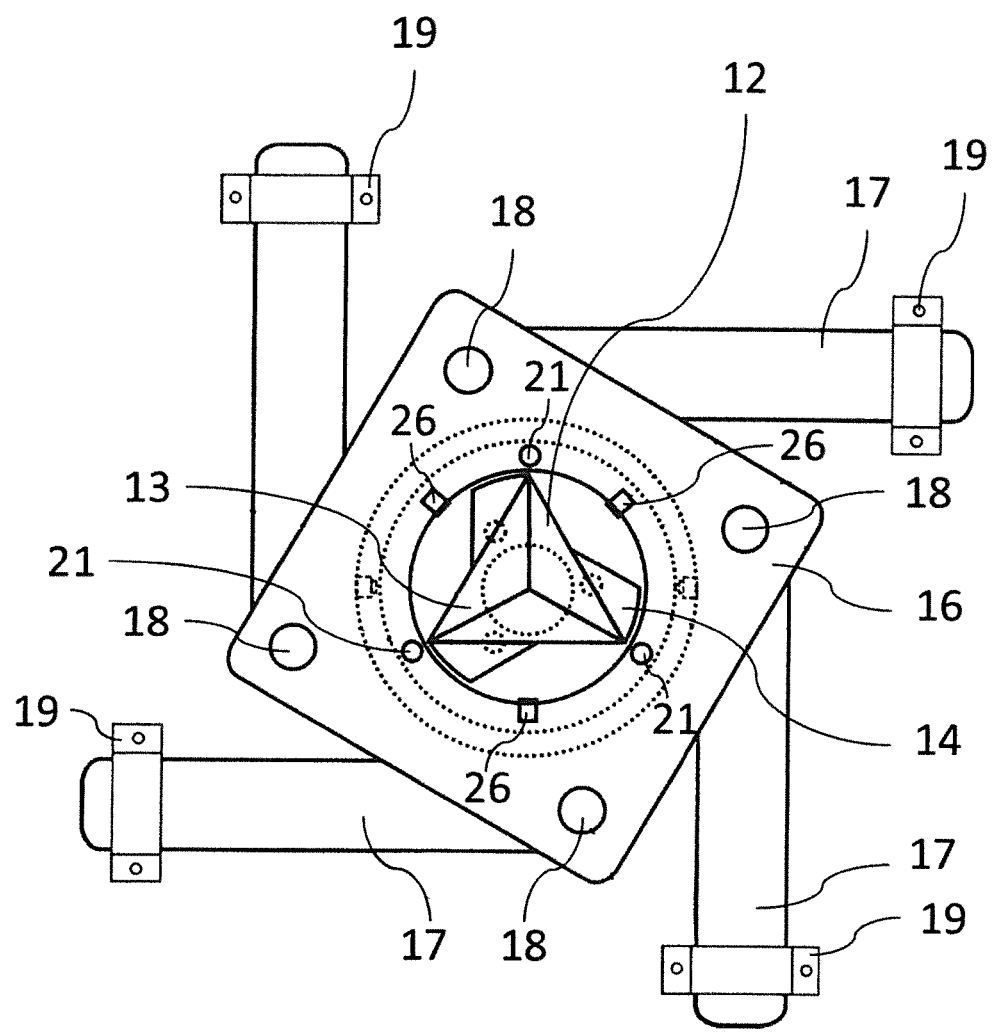
FIG. 28 shows schematically a vertical view of a side with moving parts of an automatically engaging ground-locking interface unit according to a further aspect of the present invention.
Figure 29:
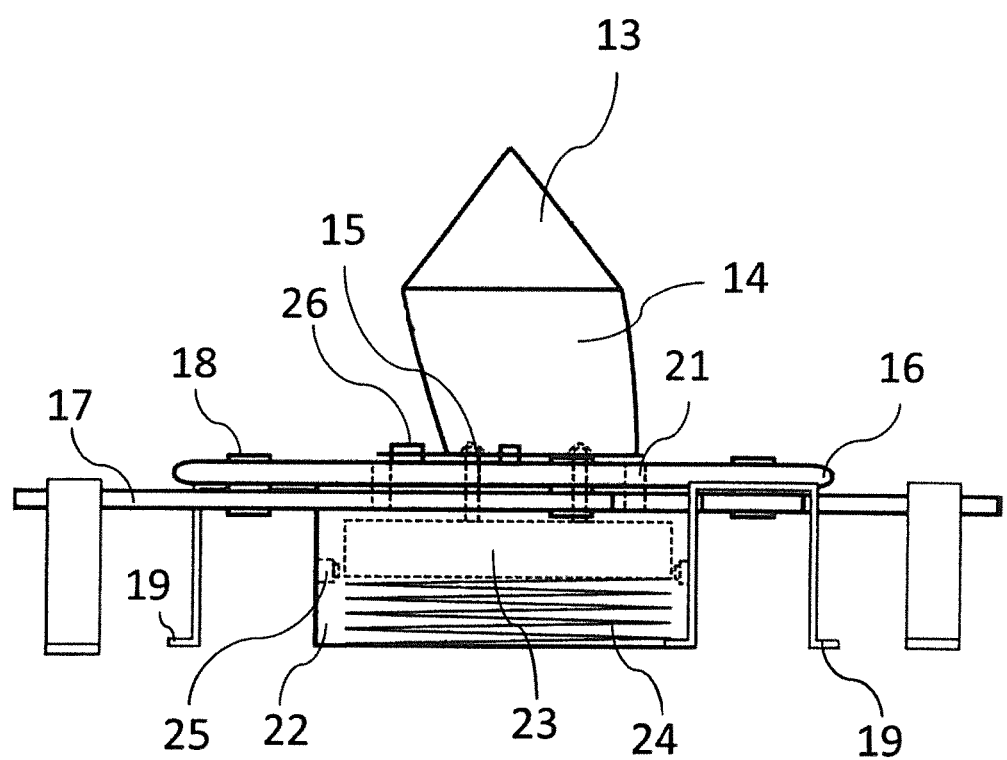
FIG. 29 shows schematically a side view of a side with moving parts of an automatically engaging ground-locking interface unit according to a further aspect of the present invention.

The following is a description of a possible implementation of an automatically engaging ground-locking interface unit of a mechanical locking mechanism 11 as illustrated in FIG. 4 with moving parts on one side only and with a triangular symmetry, as shown in FIG. 27, FIG. 28 and FIG. 29.

The locking process pre-supposes that the portable charging station 2 is being lowered onto the base frame 5 and a mechanical guiding system, for example guide rails 26, locks the lateral motion of the portable charging station 2.

In the following, "first side" refers to either the base frame 5 or the portable charging station 2, and "second side" refers to the portable charging station 2 and the base frame 5, respectively.

The locking process starts with a triangular push-down bore 12 on the first side engaging with a push-down guide 13 in the shape of a triangular pyramid on the second side. The push-down guide 13 performs precise lateral alignment of the push-down bore 12 with a push-down rotator 14 in the shape of an extruded triangle which is rotated in the extrusion process. The pushdown rotator 14 translates the relative linear motion of the push-down bore 12 relative to the push-down rotator 14 into an angular momentum. Coupling bolts 15 transfer the angular momentum to a motion distribution plate 16 of the base frame 5. The motion distribution plate 16 translates the angular momentum into a quasi-linear force on locking bars 17 connected to the motion distribution plate 16 by rotating locking bar joints 18. The quasi-linear force pushes the locking bars 17 out where they engage with recesses (not shown) on the first side, thus locking the first-side recesses to second-side square brackets 19 over the locking bars 17.

Uncoupling bolts 20 are mounted on the first side. In the pushdown process, the uncoupling bolts 20 thread through uncoupling bores 21 in the motion distribution plate 16 and in the locking mechanism base 22. Towards the end of the push-down motion, the uncoupling bolts 20 push on a coupling base annulus 23 in the locking mechanism base 22, on which the motion distribution mechanism rotates. A coupling spring 24 pushes the coupling base annulus 23 towards the push-down rotator 14. As the force from the uncoupling bolts 20 overcomes the spring force, the coupling base annulus 23 moves away from the push-down rotator 14 and spring catches 25 arrest the coupling base annulus 23.

The coupling base annulus 23 pulls coupling bolts 15 out of the push-down rotator 14, thus disengaging the push-down rotator 14 from the motion distribution plate 16.

The locking is complete since any relative transversal motion separating the first side and the second side exerts a force separating the push-down rotator 14 from the motion distribution plate 16 in addition to any residual angular momentum that may result from friction between the push-down rotator 14 and the motion distribution plate 16. This separating force completes the uncoupling of the push-down rotator 14 from the motion distribution plate 16 and removes any residual angular momentum. Therefore, no linear lateral force is exerted on the locking bars 17 and they remain in the recesses of the first side, preventing any further transversal motion separating the first side and the second side.

The unlocking process starts with the release of the spring catches 25. This release can be accomplished in several ways: electronically, for example by an electromagnet; mechanically, for example by a lock & key mechanism; pneumatically and hydraulically, for example by a pump. With the release of the spring catches 25, the coupling spring 24 pushes the coupling base annulus 23 towards the push-down rotator 14. Any linear motion separating the first side and the second side now withdraws the uncoupling bolts 20, allowing the coupling base annulus 23 driven by the coupling spring 24 to thread the coupling bolts 15 back into the push-down rotator 14. This couples the push-down rotator 14 to the motion distribution plate 16, so that the motion distribution plate 16 translates the angular momentum from the push-down rotator 14 into a quasi-linear force withdrawing the locking bars 17 from the recesses on the first side. The transversal motion continues unimpeded as the push-down bore 12 clears the push-down rotator 14.

Figure 30:
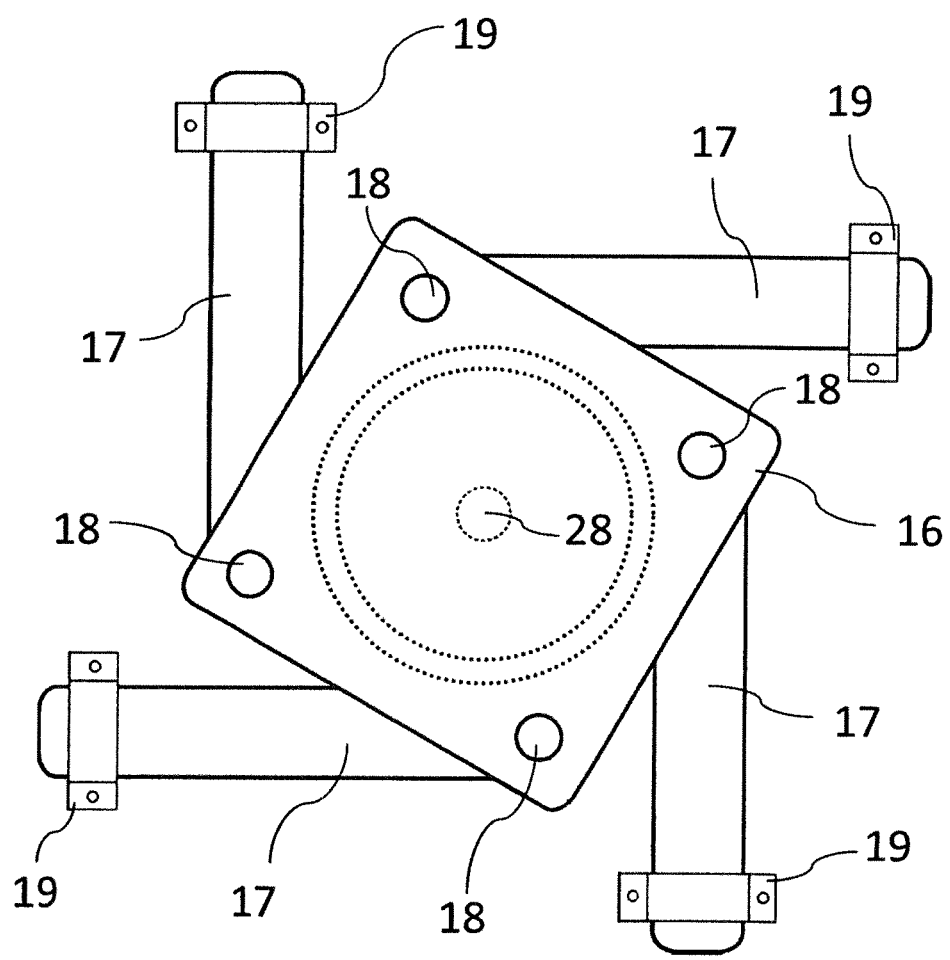
FIG. 30 shows schematically a vertical view of a remote-controllable ground-locking interface according to a further aspect of the present invention.
Figure 31:
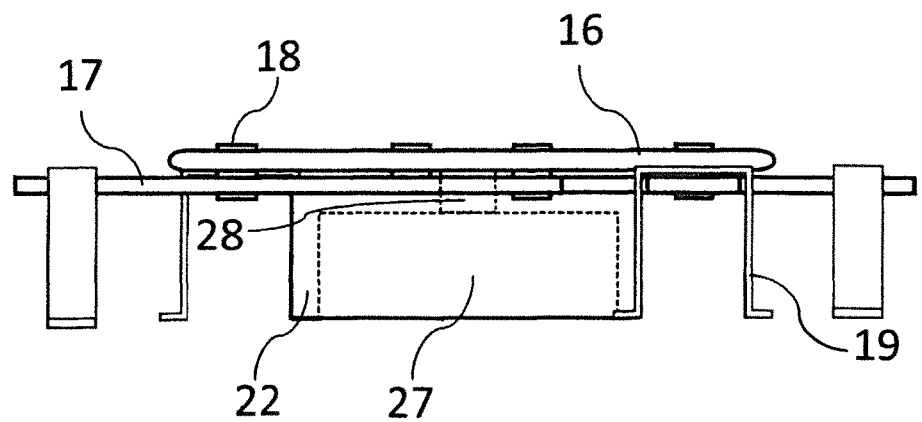
FIG. 31 shows schematically a vertical view of a remote-controllable ground-locking interface according to a further aspect of the present invention.

The following is a description of a locking mechanism of a ground locking interface unit that can be remote-controlled, see also FIG. 30 and FIG. 31.

The locking process pre-supposes that the portable charging station 2 has been lowered onto the base frame 5 in the correct alignment.

In the following, "first side" refers to either the base frame 5 or the portable charging station 2, and "second side" refers to the portable charging station 2 and the base frame 5, respectively.

The locking process starts with a remote control activating a locking actuator 27 inside the locking mechanism base 22, for example through an electric, hydraulic, pneumatic, or mechanical signal. The locking actuator 27, using for example an electric, hydraulic, pneumatic, or mechanical force, turns a quadratic motion distribution plate 16 via a shaft 28. The motion distribution plate 16 connects mechanically to locking bars 17 via rotating locking bar joints. This construction translates the angular momentum from the locking actuator 27 into a quasilinear force driving the locking bars 17 outward. The locking bars 17 engage with recesses (not shown) on the second side, preventing any transversal motion of the first side relative to the second side.

The unlocking process works the same, with the actuator 27 turning the motion distribution plate 16 in the opposite direction.

The following is a description of a locking mechanism of a ground locking interface unit that locks automatically as a portable charging station 2 is lowered onto the base plate of the base frame 5 as shown in FIG. 31.

The locking process pre-supposes that the portable charging station 2 has been lowered onto the base plate of the base frame 5.

The locking process starts with the weight of the portable charging station 2 activating a pressure sensor 29. The pressure sensor 29 triggers the locking actuator 27, which drives the locking bars 17 as already described above.

The following describes a self-covering and self-uncovering plug 36 and socket 30 for a portable charging station 2, see also FIGS. 32 to 35. The plug 36 and the socket 30 comprise electrical contacts which are adapted to establish an electrical connection between a charging station 2 locked to the base frame 5.

A plug 36 is mounted transversally to the bottom of the charging station 2. The plug 36 has a contact in the shape of a disc wider than the plug's core 40. This electrical contact also spreads mechanical loads over a wider area. The plug 36 is mounted to the bottom of the charging station 2 using an insulating pull ring 37 partially covering the charging station contact 34. The charging station contact 34 and pull ring 37 allow lateral movement of the plug 36 sufficient to compensate for residual lateral errors in the alignment of the portable charging station 2 with the base plate of the base frame 5.

Figure 32:
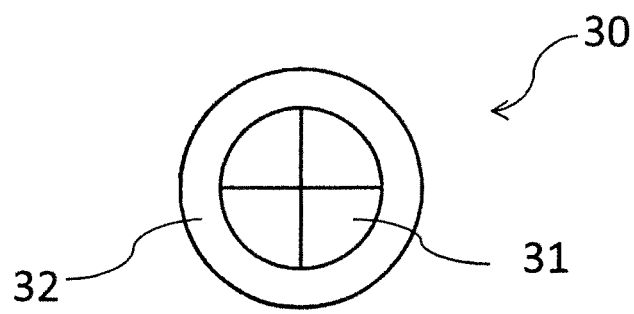
FIG. 32 shows schematically a self-covering socket cartridge according to a further aspect of the present invention.
Figure 33:
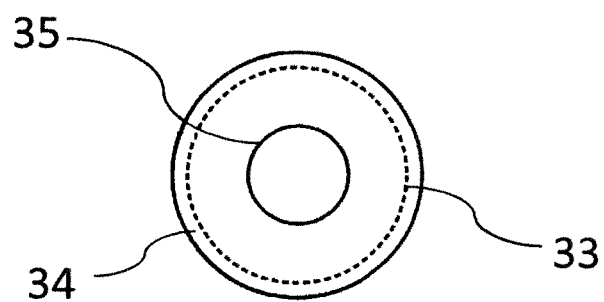
FIG. 33 shows schematically a self-covering socket cartridge according to a further aspect of the present invention.
Figure 34:
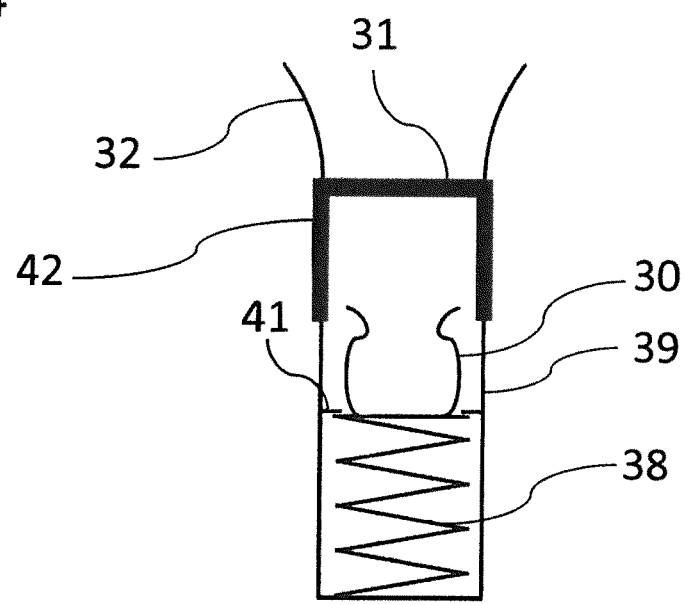
FIG. 34 shows schematically a plug for a portable charging station according to a further aspect of the present invention.
Figure 35:
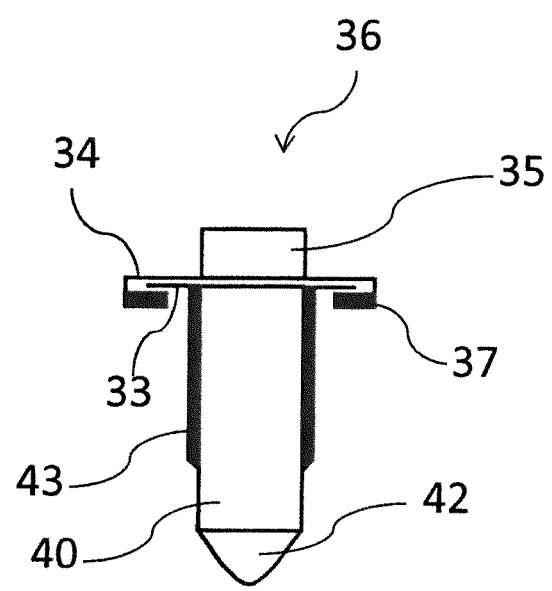
FIG. 35 shows schematically a plug for a portable charging station according to a further aspect of the present invention.

The socket cartridge 30 features a guide 32 that compensates for residual errors in lateral alignment of the portable charging station 2 with the base plate of the base frame 5. It features a rubber cover 31 that is cut crosswise as is shown in FIG. 32. It also features a spring-powered mechanism that compensates for transversal tolerance in the base plate of the base frame 5 and the portable charging station 2 and ensures the galvanic connection.

The portable charging station 2 can be lowered onto a base plate of the base frame 5 as a prerequisite of the connection process. It is further assumed that the base plate of the base frame 5 and the charging station 2 are properly aligned within the limits of such a mechanical alignment, i.e., with no more than residual misalignments.

The connection process proceeds as follows. The relative motion of the plug 36 with the aligned charging station 2 engages the plug 36 with the guide 32 of the socket cartridge 30. The guide 32 directs the tip of the plug 30 onto the cover 31, which is made of rubber and cut crosswise. The guide 32 thus compensates for lateral tolerance. The guide 32 can move the plug 36 since the plug contact 33 has lateral tolerance between the charging station contact 34 and a pull ring 37. The pointed tip 42 of the plug 36 thus penetrates the rubber 31 and finds the socket 30. A spring 38 mounted in the cartridge 39 under the socket 30 compensates transversal mounting tolerance. The spring 38 can also conduct an electrical current between the socket 30 and the cartridge 39. The spring 38 also generates an upward mechanical force that presses the plug contact 33 against the charging station contact 34, ensuring the galvanic connection between the plug 36 and the portable charging station 2. This completes the electrical connection process of connecting the transportable charging station 2 locked mechanically to the base frame 5 electrically with the base frame 5.

The portable charging station 2 can be raised from the base frame 5 as a prerequisite of the disconnection process. The base frame 5 and the charging station 2 can be properly aligned within the limits of such a mechanical alignment, i.e., there are residual misalignments.

The disconnection process proceeds as follows. As the portable charging station 2 is withdrawn from the base plate of the base frame 5, the plug 36 is pulled out of the socket cartridge 39 by the pull ring 37. The socket 30 is stopped by a socket stopping ring 41 and the core 40 of the plug 36 disengages from the socket 30. As the core 40 clears the cover 31, the rubber cover 31 recovers its original configuration, covering the socket cartridge 30.

The plug contact 33 and the charging station contact 34 form electrical contacts 9 as shown in FIG. 4 and are adapted to connect the charging station 2 electrically to the base frame 5.

Figure 36:
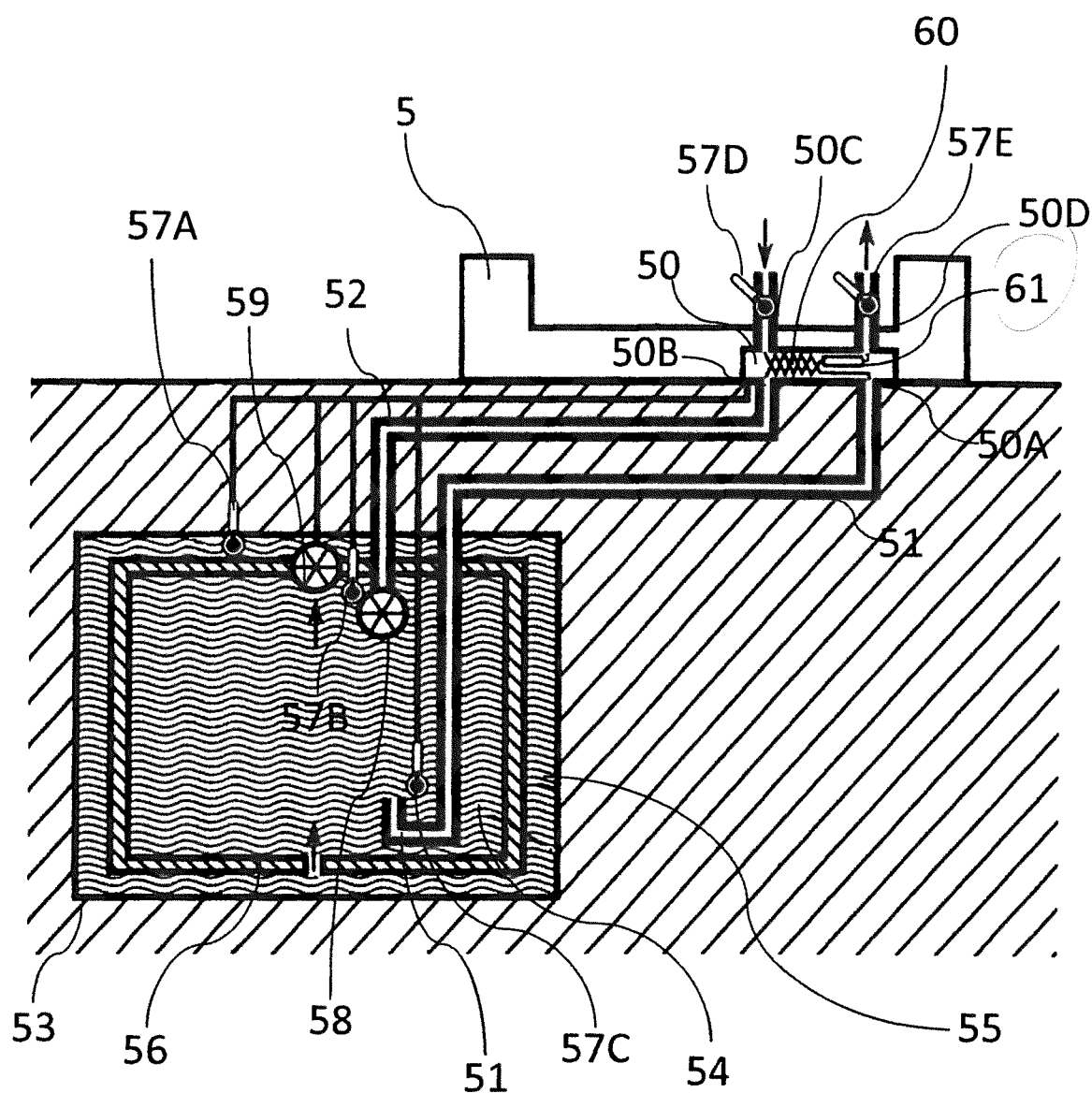
FIG. 36 shows a diagram for illustrating a possible exemplary embodiment of a base plate with a temperature control unit and an adjustable heat exchange with a ground according to a further aspect of the present invention.

The following describes a base frame 5 with a fluid temperature control unit 50 and a fluid tank 53 that can exchange heat with the ground, as shown in FIG. 36.

There can be more than one fluid tank 53 filled with different fluids, e.g., a fluid used as a cooling fluid filled in a first fluid tank and another fluid or gas filled in a second fluid tank combusted to generate electrical power locally at the location of the base frame 5.

A recharging unit can be implemented at the base frame 5 adapted to generate electrical power from a fluid or gas filled into a fluid tank which can be positioned beneath the base frame 5.

This recharging unit can comprise fuel cells adapted to generate locally electrical power from a fuel such as methanol or a redox-flow battery module to generate electrical power from electrolytes.

The fluid temperature control unit 50 shown in FIG. 36 has four ports 50A, 50B, 50C, 50D that allow liquid flow. Two ports 50A, 50B are connected by pipes 51, 52 to the fluid tank 53, and two ports 50C, 50D are exposed in the base plate of the base frame 5. One of the pipes 51, 52 leading into the fluid tank 53 terminates at the top, one pipe 51 terminates at the bottom of the tank 53. One pipe 52 of the pipes has a reversible pump 58 connected to it that is controlled by a controller of the fluid temperature control unit 50.

The fluid tank 53 consists of two zones: an inner heat storage zone 54 and a surrounding heat exchange zone 55. The heat exchange zone 55 and the heat storage zone 54 are isolated from each other by an isolation 56. Fluid is exchanged between the two zones 54, 55 at two points. The two points are located at diametrically opposed ends of the fluid tank 53. The separator has a pass-through for fluid at a point diametrically opposite to the two points where the heat exchange zone 55 and the heat storage zone 54 exchange fluid or gas. At one of the exchange points, the fluid exchange can be driven by a pump 59 driving flow from the heat storage zone 54 to the heat exchange zone 55. The controller of the fluid temperature control unit 50 controls the pump 59.

The fluid temperature control unit 50 reads measurements from four temperature sensors 57A, 57B, 57C. One temperature sensor 57A is in the heat exchange zone 55, close to the point connecting the heat exchange zone 55 and the heat storage zone 54 which has no pump installed. Two temperature sensors 57B, 57C are in the heat storage zone 54, close to each of the two pipe ends of the pipes 51, 52. Two temperature sensors 57D, 57E are in the temperature control unit 50, measuring the temperature of the fluid or gas at each of the ports 50C, 50D exposed in the base plate of the base frame 5.

The fluid temperature control unit 50 can pump fluid or gas from one of the pipes by activating a pump attached to said pipe.

For illustration purposes, it is assumed that the pump is at the top pipe. The fluid temperature control unit 50 can thus draw heat from the fluid tank 53. The fluid temperature control unit 50 can also deposit heat in the fluid tank 53. The fluid temperature control unit 50 features a heat exchanger

60 for exchanging heat between fluid from the tank 53 and fluid from the ports exposed in the base frame 5. The temperature control unit 50 also features a heater and cooler 61 through which the fluid or gas from the ports exposed in the base plate of the base frame 5 passes.

For cooling and heating, the fluid temperature control unit 50 follows the following computer-implemented method based on a requested temperature of the liquid to flow out of the port T_r in the base frame 5. Let T_o be the measured outflowing temperature into the port in the base frame 5, T_i be the measured inflowing temperature from the port in the base frame 5, T_t be the temperature at the top of the fluid tank 53 and T_b be the temperature at the bottom of the fluid tank 53. In the following description, "If this fails" means "If there is a change in the conditions leading to the previous step or if the action in the previous step failed to achieve T_o=T_r in the stationary state or if it is impossible to implement the action in the previous step any further".

1. If T_r<T_i:
    a. If T_o>T_r:
        i. Stop heating using the heater 60
        ii. If this fails:
            1. If T_t<T_i and T_t<=T_b:
                a. Stop pumping fluid or gas into the tank 53
                b. If this fails, pump more fluid or gas from the tank 53
                c. If this fails, cool more using the cooler 61
                d. If this fails, report warning
            2. If T_b<T_i and T_t>T_b:
                a. Stop pumping fluid or gas from the tank 53
                b. If this fails, pump more fluid or gas into the tank 53
                c. If this fails, cool more using the cooler 61
                d. If this fails, report warning
            3. All other cases:
                a. Cool more using the cooler 61
                b. If this fails, report warning
    b. If T_o<T_r:
        i. Cool less using the cooler 61
        ii. If this fails, reduce pump flow
        iii. If this fails, report warning
    c. If T_o=Tr: Change nothing
2. If T_r>T_i:
    a. If T_o<T_r:
        i. Stop cooling using the cooler 61
        ii. If this fails:
            1. If T_t>T_i and T_t>=T_b:
                a. Stop pumping fluid or gas into the tank 53
                b. If this fails, pump more fluid or gas from the tank 53
                c. If this fails, heat more using the heater 61
                d. If this fails, report warning
            2. If T_b>T_i and T_t<T_b:
                a. Stop pumping fluid or gas from the tank 53
                b. If this fails, pump more fluid or gas into the tank 53
                c. If this fails, heat more using the heater 61
                d. If this fails, report warning
            3. All other cases: report warning
                a. Heat more using the heater 61
                b. If this fails, report warning
    b. If T_o>T_r:
        i. Heat less using the heater 61
        ii. If this fails, reduce pump flow
    If this fails, report warning For managing the temperature in the heat storage zone 54, the temperature control unit 50 activates the pump 59 at one of the connection points between the heat storage zone 54 and the heat exchange zone 55 ("the pump" in the following) according to the algorithm described below.

Let T_r be a typical temperature requested to be provided in the base frame 5 and T_i be a typical temperature inflow into the base frame 5 from the ports exposed in the base frame 5. Let T_t be the temperature at the top of the fluid tank 53 and T_b be the temperature at the bottom of the fluid tank 53. Let T_n be the temperature at the connection point between the heat exchange zone 54 and the heat storage zone 55 where there is no pump installed.

1. If T_r>T_i:
    a. If T_n>T_t or T_n>T_b, run the pump 59
    b. Otherwise, stop the pump 59
2. If T_r<T_i:
    a. If T_n<T_t and T_n<T_b, run the pump 59
    b. Otherwise, stop the pump 59
3. Otherwise, stop the pump 59

The fluid temperature control unit 50 illustrated in FIG. 36 can be implemented by a controller integrated into the base frame 5 or connected locally to the base frame 5. The controller can also be adapted to control the electrical current flowing via the electrical contacts to the charging station 2 being electrically and mechanically connected to the base frame 5. As illustrated in FIG. 3, the transportable charging station 2 can comprise a control unit 2H and a communication module 2K adapted to communicate with the local controller of the base frame 5 and/or with remote backend servers via a data network. The controller integrated in the base frame 5 can both communicate with the control unit 2H of the transportable charging station 2 connected to the base frame 5 and via a communication interface of the base frame 5 to at least one remote centralized server or central control unit CCU of the distributed charging system 1. In this embodiment, the portable charging station 2 can use the data network connection of the base frame 5 to connect to a centralized server of the distributed charging system 1. In this way, it is possible to signal for a replacement of a portable charging station 2 being discharged and to provide other status report data to the centralized server CCU of the distributed charging system 1. The communication interface of the controller integrated in the base frame 5 can comprise a wired or wireless communication interface.

In a possible embodiment, a local power supply grid 7 may comprise several base frames 5 each having an integrated controller. In an alternative embodiment, the local power supply grid 7 may comprise a single controller or local control unit LCU adapted to communicate with the different control units 2H of all connected portable charging stations 2.

In a possible embodiment, the local power supply grid or microgrid 7 can also comprise at least one local power generation unit PGU adapted to generate locally electrical energy at the site of the at least one base frame 5 of the local power supply grid 7 as also illustrated in FIG. 39. The power generation unit PGU can comprise in a possible embodiment at least one photovoltaic panel or photovoltaic module adapted to generate DC power from solar radiation. The local power generation unit PGU of the local power supply grid 7 can also comprise at least one wind turbine adapted to generate electrical power from wind. Other kinds of local power supply generation units PGUs are possible, for instance a generator generating electrical power from gas or a fluid combusted by a combustion engine. Accordingly, the power generation unit PGU can also comprise a turbine.

The locally generated electrical energy can be used to charge or recharge the battery cells of at least one battery pack 2D of a charging station 2 connected via a base frame 5 to the local power supply grid 7. The locally generated power or energy can also be used for performing a local load balancing between different charging stations 2 connected electrically via base frames 5 to the local power supply grid 7. Further, the locally generated energy can also be fed via a meter device MD into a public power supply grid 8 being connected to the local power supply grid 7. This can be performed for instance for stabilization of the frequency f of the public power supply grid 8. The provided power can be used to shave peaks within the power supply network.

The local power supply grid or a microgrid 7 can be located conveniently at different sites such as a fuel service station. The local power supply grid 7 comprising one or more deployed charging stations 2 can for instance conveniently be located at gas stations, drugstores, retail stores, banks, universities, stadiums, sport clubs, schools, or hospitals. The deployed charging stations 2 can be recharged by the local power generation units PGUs of its microgrid 7, for instance at night or during off-peak times of the public power supply grid 8.

The base frames 5 can be located at suitable locations, e.g., in an urban environment without disturbing the traffic. A barrier can be provided to protect the base frame 5 and/or a charging station 2 deployed on the base frame 5 against mechanical damages caused by traffic participants. A base frame 5 may also comprise an integrated GPS unit to notify its current position to the control center ITC of the distributed charging system 1. The base frame 5 can be mounted at a fixed position or can itself be moveable to predefined locations in a traffic infrastructure.

FIG. 37 shows schematically a possible exemplary embodiment of a distributed charging system 1 according to the present invention. As can be seen in FIG. 37, a public power supply grid 8 can receive electrical energy or power from at least one central power generation unit PGU of a power plant $P_{max}$ The central power generation unit PGU can be controlled by a central control unit CCU which can form part of an IT center ITC of the distributed charging system 1.

The schematic diagram of FIG. 37 illustrates different transportable charging stations 2-1, 2-2, 2-3 deployed in the field by means of a truck 3. In the illustrated example, the first transportable charging station 2-1 is placed on a base frame 5 connected by means of its electrical contacts directly to the public power supply grid 8. The transportable charging station 2-1 can form a microgrid 7 which comprises a single charging station 2-1. In this embodiment, the local control unit 2H of the charging station 2-1 can form the local control unit LCU of this microgrid 7.

The charging station 2-2 as illustrated in FIG. 37 forms also a microgrid 7 connected to the power supply grid 8. In the embodiment shown in FIG. 37, the microgrid 7-2 further comprises a load device LD connected to the microgrid 7-2 by means of a metering entity MD. In the illustrated example, an electrically powered vehicle 6 is connected to the deployed charging station 2-2.

As further illustrated in the example of FIG. 37, the distributed charging system 1 comprises a third microgrid 7-3 having a deployed charging station 2-3 and a local power generation unit PGU feeding energy into the local grid 7 and/or into the public power supply grid 8.

A local power supply grid or micro-grid 7 may comprise one or more charging stations 2 as well as local power generation units PGUs and local load devices LD. The different charging stations 2-$i$ of a micro-grid 7 can be placed on base frames 5 to establish electrical connection with a local power supply grid network and/or with power generation units PGUs or local load devices LD. In a preferred embodiment, the charging stations 2-$i$ of a micro-grid can be connected to the micro-grid or local power supply grid 7 by means of a base frame 5 as illustrated in FIG. 4. In other embodiments, different deployed charging stations 2-$i$ of a micro-grid 7 can also be connected electrically with each other in another manner, for instance via an electrical interface connecting two neighboring charging stations 2-$i$, 2-$j$ directly with each other. In this embodiment, a group of charging stations can form a cluster or a package wherein the charging stations 2 are connected directly with each other.

As also illustrated in FIG. 37, the charging stations 2 of the different local micro-grids 7 can be transported to other sites of other micro-grids 7 or to a central recharging location of an energy center by means of a transport unit 3.

In the embodiment illustrated in FIG. 37, a central control unit CCU of the IT center ITC of the distributed charging system 1 can communicate with the different local control units LCUs of the different micro-grids 7-$i$ wireless by means of transceivers or e.g., by means of a telephone network.

In case that the micro-grid 7 comprises more than one charging station 2, it is possible that one control unit 2H of a charging station 2 operates as the local control unit LCU of the whole local micro-grid 7. In this embodiment, one control unit 2H of a charging station 2 acts as a master control unit forming the local control unit LCU of the whole local micro-grid 7-$i$. In a possible implementation, the different control units 2H of the micro-grid 7 communicate to each other and define which control unit 2H forms the master control unit of the local micro-grid 7. In a possible implementation, the control unit 2H of the first charging station 2-1 deployed at the site of the local micro-grid 7 can form automatically the master control unit of the micro-grid 7, wherein the control units 2H of the remaining charging stations become client or serving control units. When the battery packs 2D of the charging station 2 having a control unit 2H forming currently the master control unit is uploaded to the platform of the truck 3 for transport to the remote recharging station, it can automatically assign a master functionality to other control units 2H of another charging station 2 within the local micro-grid 7.

The uploaded charging stations 2 transported by the transport truck 3 can form also a micro-grid 7 which may be used to supply the vehicle batteries of the truck 3 with electrical energy during transport. Although the charging stations 2-$i$ may comprise only a limited low state of charge SoC, this energy can still be used for power supply of the vehicle batteries of the transport truck 3 thus extending its range of operation. If the transport truck 3 is parked at a site it can form a micro-grid or local power supply grid 7. This can be a stand-alone insular micro-grid or a micro-grid connectable to a wide area power supply grid 8 forming part of the distributed charging system 1.

Figure 38:
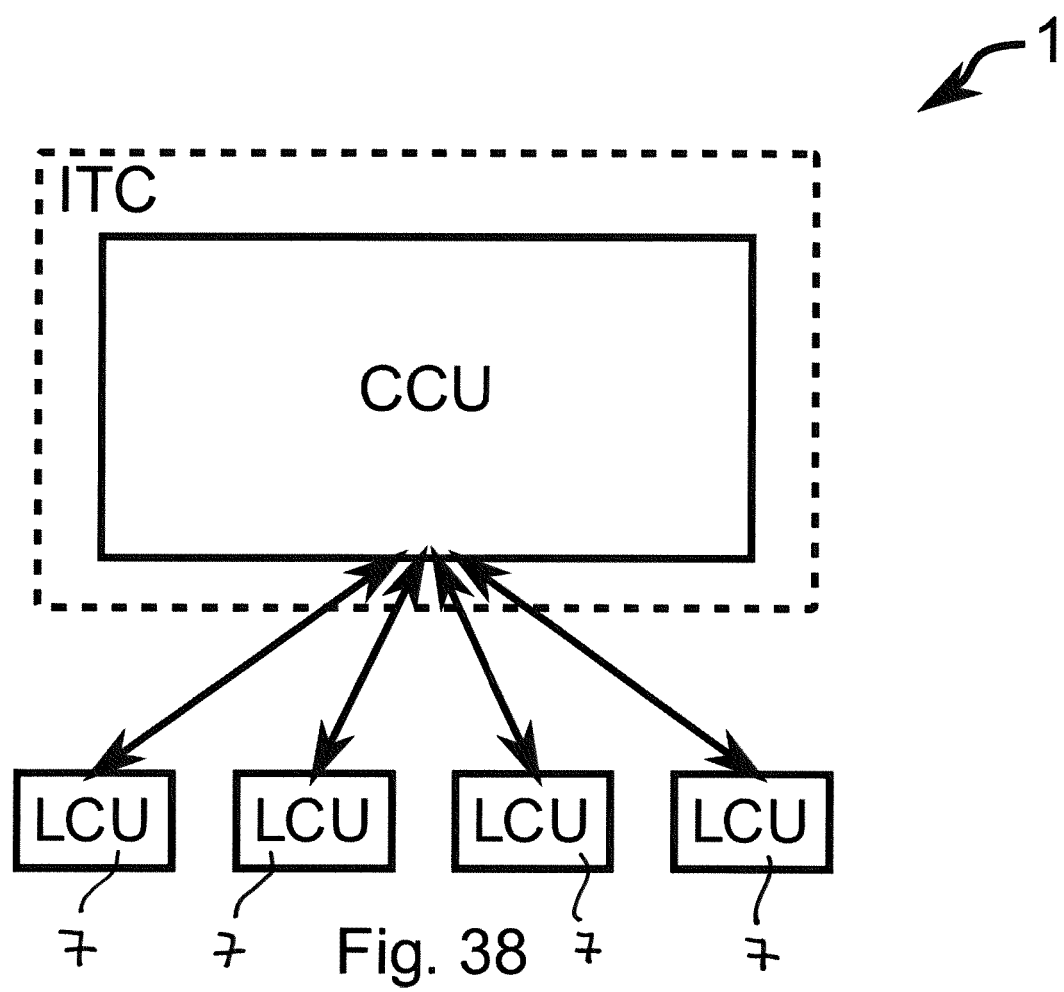
FIG. 38 shows schematically a communication between a central control unit of the distributed charging system and a local control unit.

FIG. 38 shows schematically the communication flow between the central control unit CCU of the IT center ITC of the charging system 1 and local control units LCUs of different micro-grids 7 provided in the field. The communication can be bidirectional. Each LCU may use a separate assigned communication channel for communication with the CCU using for instance different communication frequencies and/or encryption keys. The communication can be performed wireless as illustrated in the example of FIG. 1 and/or via a data network such as the Internet. Each LCU of a micro-grid 7 can comprise a transceiver for communication with a transceiver of the CCU via a wireless link. This may also involve a satellite communication. In an alternative embodiment, a public telephone network can be used for communication between the LCUs of the micro-grids 7 and the CCU at the IT center ITC of the distributed charging system 1. The communication between the LCUs and the CCU is performed in a preferred embodiment in encrypted form using encryption keys to increase security against cyber-attacks.

FIG. 39 shows schematically a possible exemplary embodiment of a local power supply grid or micro-grid 7. The micro-grid 7 comprises a local control unit LCU, at least one local power generation unit PGU such as a photovoltaic panel, a metering device MD and/or at least one power consuming load. The metering device MD can measure in a possible embodiment the electrical energy exchanged with the power supply grid 8. In a preferred embodiment, the local control unit LCU can be formed by a control unit 2H of a charging station 2 connected to the micro-grid 7, for instance by means of electrical contacts of a base frame 5. The communication between the different entities of the micro-grid 7 can be performed in a possible embodiment via a local wireless communication network. In an alternative embodiment, the communication between the entities of the micro-grid 7 can also be performed by a local data network LAN of the micro-grid 7.

The invention also relates to the control of a fleet of e-vehicle chargers 2 that have an integrated battery pack 2D and that can be dispatched together with their integrated battery 2D and that also have limited connections to the public power supply grid 8 when they are not being displaced.

An extension of this invention relates to the control of the above fleet but also including one or more centralized charging locations where e-vehicle chargers or transportable charging stations 2 can be connected to the public power supply grid 8 without any relevant limit on the connection, but where they do not usually charge electrical vehicles 6.

An aspect of this invention relates to the control of the above fleet but also including a truck or transport unit 3 for the purpose of displacing the e-vehicle chargers 2 with all e-vehicle chargers 2 loaded onto the truck 3 connected to a join a micro-grid 7 or vehicle power grid 3D provided by the truck 3 as also illustrated in FIG. 6.

Concretely, the invention relates to a control system 1 having a central control unit CCU and local control units LCUs, where each e-vehicle charger 2 is connected to a local control unit LCU and all the local control units LCUs are connected directly or indirectly to the central control unit CCU.

In a concrete implementation of the invention, the local control units LCUs are adapted to send the state of charge SoC of the battery packs 2D to the central control unit CCU. The local control units LCUs are further adapted to send maximum charge and discharge powers to the central control unit CCU. The local control units LCUs determine the maximum charge power by the bottleneck principle from the maximum charge power of the battery, the maximum rectifying power of the converter and the maximum consumption power of the grid connection, which is set to zero when the batteries are displayed; equivalently for the maximum discharge power, with the exception that the maximum charge power of the battery is replaced by the maximum discharge power minus the current rate of discharge for charging an e-vehicle 6, that the maximum rectifying power is replaced by the maximum inverting power, and that the maximum consumption power of the grid connection is replaced by the maximum generation power of the grid connection. The central control unit CCU is adapted to receive measurements containing at least the state of charge SoC and maximum charge and discharge powers of each battery from the local control units LCUs and to communicate setpoints including at least the power to be discharged to or charged from the public power supply grid 8 to the local control units LCUs.

The central control unit CCU dispatches in a possible embodiment the batteries according to the following process or algorithm A:

A-1. Receive all states of charge SoC and all maximum charge and discharge powers from the local control units LCUs. Calculate the average state of charge SoC over all the battery packs 2D. Order the batteries by their state of charge SoC from greatest to smallest and assign the batteries with above-average, average and below-average states of charge SoC to separate lists. Set the grid charge and grid discharge setpoint for each battery to zero.

A-2. If there is at least one battery in the list of below-average battery and the cumulative rate of discharging to the grid is greater than or equal to the cumulative rate of charging from the grid, set the grid charge setpoint of the last battery in the list to full power and remove the battery from the list of below-average batteries. If the new cumulative rate of charging from the grid is greater than the cumulative rate of discharging to the grid, continue at A-3; otherwise, continue at A-2.

A-3. If there is at least one battery in the list of above-average batteries and the cumulative rate of charging from the grid is greater than or equal to the cumulative rate of discharging to the grid, set the grid discharge setpoint of the first battery in the list to full power and remove the battery from the list of above-average batteries. If the cumulative rate of charging from the grid is greater than the new cumulative rate of discharging to the grid, continue at A-3; otherwise, continue at A-2.

A-4. If the list of above-average batteries is empty, reset the list of above-average batteries to the status of step A-1; otherwise, continue at A-5.

A-4.1. If there is at least one battery in the list of above-average batteries and the cumulative rate of discharging to the grid is greater than the cumulative rate of charging from the grid, reduce the grid discharge setpoint of the last battery in the list by the difference between the cumulative rate of discharging to the grid and the cumulative rate of charging from the grid, but at most to zero. Remove the battery from the list and continue at A-4.1.

A-4.2. If there is at least one battery in the list of average batteries and the cumulative rate of discharging to the grid is higher than the cumulative rate of charging from the grid, increase the grid charge setpoint of the first battery in the list by the difference between the cumulative rate of discharging to the grid and the cumulative rate of charging from the grid, but at most to the maximum charge power. Remove the battery from the list and continue at A-4.2.

A-5. If the cumulative rate of discharging to the grid is greater than the cumulative rate of charging from the grid, reset the list of above-average batteries to the status of step A-1, else continue at A-6.

A-5.1. If the cumulative rate of discharging to the grid is greater than the cumulative rate of charging from the grid, increase the grid charge setpoint of the last battery in the list to the difference between the cumulative rate of discharging to the grid and the cumulative rate of charging from the grid, but at most to the maximum charge power and remove the battery from the list and continue at A-5.1.

A-6. If the list of below-average batteries is empty, reset the list of below-average batteries to the status of step A-1; otherwise, continue at A-7.

A-6.1. If there is at least one battery in the list of below-average batteries and the cumulative rate of charging from the grid is greater than the cumulative rate of discharging to the grid, reduce the grid charge setpoint of the first battery in the list by the difference between the cumulative rate of charging from the grid and the cumulative rate of discharging to the grid, but at most to zero. Remove the battery from the list and continue at A-6.1.

A-6.2. If there is at least one battery in the list of average batteries and the cumulative rate of charging from the grid is higher than the cumulative rate of discharging to the grid, increase the grid discharge setpoint to the first battery in the list by the difference between the cumulative rate of charging from the grid and the cumulative rate of discharging to the grid, but at most to the maximum discharge power. Remove the battery from the list and continue at A-6.2.

A-7. If the cumulative rate of charging from the grid is greater than the cumulative rate of discharging to the grid, reset the list of below-average batteries to the status of step A-1, else continue at A-8.

A-7.1 If the cumulative rate of charging from the grid 8 is greater than the cumulative rate of discharging to the grid, increase the grid discharge setpoint of the first battery in the list to the difference between the cumulative rate of discharging to the grid and the cumulative rate of charging from the grid, but at most to the maximum charge power and remove the battery from the list and continue at A-7.1.

A-8. Send each charging and discharging power setpoint to the corresponding local control unit LCU.

A-9. Each local control unit LCU controls the attached power converter so that the charge from/discharge to the grid 8 equals the setpoint received from the control center.

A-10. Continue at A-1.

The advantage of this implementation is that the charging stations or chargers 2 are balanced as fast as is possible given any local situation including displacement and therefore, a maximum number of e-vehicles 6 can be charged at any given point of time by the e-vehicle charger fleet without disturbing the balance of the grid 8, since the chargers charge from the grid just as much as they discharge into the grid. A key idea here is to consider the chargers 2 under displacement with their actual state of charge SoC but with maximum charge and discharge power set to zero. Conventional systems do not consider displaceable chargers. The straightforward extension of such conventional systems is to remove chargers under displacement from consideration. However, this leads to re-arrangements every time a charger is displaced or re-connected: some batteries would go from discharging to charging, reducing their longevity due to increased cycling.

In an extension of the concrete implementation outlined above, at least one local control unit LCU is also connected to a local generator PGU such as a PV power plant, wind power plant, CHP or fuel cell power plant that shares the limited grid connection of the e-vehicle charger 2. The local control units LCUs are adapted so that they always have a measurement of the current power generation of the connected generator PGU, either from the generator itself or from a separate measuring device MD, and send this measurement to the central control unit CCU. The local control units LCUs add the current power generation to the maximum consumption power of the grid connection and subtract the power generation from the maximum generation power of the grid connection.

The central control unit CCU is adapted so that it also calculates the total power generation over all micro-grid sites. It then implements the algorithm outlined for the concrete implementation above, adding the total power generation over all sites to the cumulative rate of discharging to the grid in each step of the process. This extension has the advantage that charge that is provided to e-vehicles 6 can be replenished from the power generators without placing any net load on the grid 8. It has the further advantage that generators can be operated in parallel to the e-vehicle charger 2 most of the time even if the grid connection is too limited to allow parallel operation all the time.

In an extension of embodiment outlined directly above of the concrete implementation outlined further above, the local control unit LCU is adapted to transfer the maximum charge and discharge power of the battery 2D, the maximum inverting and rectifying powers of the converter and the maximum generation and consumption powers of the grid connection separately.

Step 1 of the algorithm outlined above is changed to read:

A-1. Receive all states of charge SoCs, all maximum battery charge and discharge powers, all maximum rectifying and inverting powers, all grid power limits and all local power generation measurements from the local control units (LCUs) 2H. Calculate the average state of charge SoC over all the batteries 2D. Order the batteries or battery packs 2D by their state of charge SoC from greatest to smallest and assign the batteries 2D with above-average, average, and below-average states of charge SoCs to separate lists. Set the grid charge and grid discharge setpoint for each battery 2D to zero.

A-1.1. For each battery 2D that has a state of charge SoC less than 1 and that has nonzero local power generation, increase the grid charge setpoint of the battery by the local power generation measurement, but at most to the maximum charge power of the battery. Reduce the local power generation measurement by the increase in the grid charge setpoint of the battery. Increase the maximum generation power of the grid connection by the increase in the grid charge setpoint in this step. Decrease the maximum consumption power of the grid connection by the increase in the grid charge setpoint in this step.

A-1.2. For each battery 2D, determine the maximum charge power by the bottleneck principle from the maximum charge power of the battery, the maximum rectifying power of the converter and the maximum power of the grid connection, which is set to zero when the charger is displayed; equivalently for the maximum discharge power, with the exception that the maximum charge power of the battery is replaced by the maximum discharge power minus the current rate of discharge for charging an e-vehicle 6 and that the maximum rectifying power is replaced by the maximum inverting power.

The advantage of this embodiment is that more power remains local, reducing the load on the limited grid connections.

In an extension of the concrete implementation or the embodiment outlined above, at least one local control unit (LCU) 2H is also connected to at least one local load sharing the limited grid connection of the e-vehicle charger 2. The local control units LCUs are adapted so that they always have a measurement of the current power consumption of the connected load or loads, either from the loads themselves or from a separate measuring device MD, and send this measurement to the central control unit CCU. The local control units LCUs add the current power consumption to the maximum grid discharge power of the battery 2D and subtract the power generation from the maximum grid charge power of the battery. The central control unit CCU is adapted so that it also calculates the total power consumption over all sites. It then implements the algorithm outlined for the concrete implementation above, adding the total power consumption over all sites to the cumulative rate of charging from the grid 8 in each step of the process. This extension has the advantage that local loads can be operated even with a limited grid connection. It has the further advantage that loads can be operated in parallel to the e-vehicle charger 2 most of the time even if the grid connection is too limited to allow parallel operation all the time.

In an extension of the embodiment outlined directly above of the concrete implementation outlined further above, the local control unit LCU is adapted to transfer the maximum charge and discharge power of the battery 2D, the maximum inverting and rectifying powers of the converter and the maximum generation and consumption powers of the grid connection separately.

Step 1 of the algorithm outlined above is changed to read:
A-1. Receive all states of charge SoC, all maximum battery charge and discharge powers, all maximum rectifying and inverting powers, all grid power limits and all local power load measurements from the local control units LCUs. Calculate the average state of charge SoC over all the batteries 2D. Order the batteries 2D by their state of charge SoC from greatest to smallest and assign the batteries with above-average, average, and below-average states of charge SoC to separate lists. Set the grid charge and grid discharge setpoint for each battery to zero.
  A.1-1. For each battery that has nonzero local power generation, increase the grid discharge setpoint of the battery by the local power generation measurement, but at most to the maximum discharge power of the battery. Reduce the local power load measurement by the increase in the grid discharge setpoint of the battery. Increase the maximum consumption power of the grid connection by the increase in the grid discharge setpoint in this step. Decrease the maximum generation power of the grid connection by the increase in the grid discharge setpoint in this step.
  A-1.2. For each battery 2D, determine the maximum charge power by the bottleneck principle from the maximum charge power of the battery, the maximum rectifying power of the converter and the maximum power of the grid connection, which is set to zero when the charger is displaced; equivalently for the maximum discharge power, with the exception that the maximum charge power of the battery is replaced by the maximum discharge power minus the current rate of discharge for charging an e-vehicle 6 and that the maximum rectifying power is replaced by the maximum inverting power.

In a combination of the extensions of the embodiments of the concrete implementations, the local control unit LCU is adapted to transfer the maximum charge and discharge power of the battery 2D, the maximum inverting and rectifying powers of the converter and the maximum generation and consumption powers of the grid connection separately.

Step 1 of the algorithm outlined above is changed to read:
A-1. Receive all states of charge, all maximum battery charge and discharge powers, all maximum rectifying and inverting powers, all grid power limits, all local power generation measurements, and all local power load measurements from the local control units LCUs.
  A-1.1. For each battery 2D that has a state of charge SoC less than 1 and where the local power generation measurement is greater than the local power load measurement, increase the grid charge setpoint of the battery by the difference between the local power generation measurement and the local power load measurement, but at most to the maximum charge power of the battery. Reduce the local power generation measurement by the increase in the grid charge setpoint of the battery in this step. Increase the maximum generation power of the grid connection by the increase in the grid charge setpoint in this step. Decrease the maximum consumption power of the grid connection by the increase in the grid charge setpoint in this step.
  A-1.2. For each battery 2D where the local power load measurement is greater than the local power generation measurement, increase the grid discharge setpoint of the battery by the local power generation measurement, but at most to the maximum discharge power of the battery. Reduce the local power load measurement by the increase in the grid discharge setpoint of the battery. Increase the maximum consumption power of the grid connection by the increase in the grid discharge setpoint in this step. Decrease the maximum generation power of the grid connection by the increase in the grid discharge setpoint in this step.
  A-1.3. For each battery 2D, determine the maximum charge power by the bottleneck principle from the maximum charge power of the battery, the maximum rectifying power of the converter and the maximum power of the grid connection, which is set to zero when the charger is displaced; equivalently for the maximum discharge power, with the exception that the maximum charge power of the battery is replaced by the maximum discharge power minus the current rate of discharge for charging an e-vehicle and that the maximum rectifying power is replaced by the maximum inverting power.

In an extension of any of the embodiments and combinations of the concrete implementation outlined above, the local control units LCUs can also set the maximum power generation of the connected local power generators PGUs. In this extension, the central control unit CCU is adapted so that it controls the total power generation over all sites so as not to exceed the demand for charging the batteries 2D. Concretely, step A-8 of the above algorithm is changed to read:

A-8. The central control unit CCU sets the maximum generation setpoint of each generator to infinity. If the cumulative rate of discharging to the grid 8 is greater than the total rate of charging from the grid and there is at least one local generator PGU generating power, the central control unit CCU divides the difference between the cumulative rate of discharging to the grid 8 and the total rate of charging from the grid 8 by the cumulative generating power of the local generators PGUs. The central control unit CCU sets the maximum power generation setpoint of each local power generator PGU to the power generated by the local generator multiplied by the ratio above.

A-8.1. Send each charging and discharging power setpoint and each maximum power generation setpoint to the corresponding local control unit LCU.

In extensions to any embodiment or combination outlined above, the central control unit CCU also adds power generation from any other power source to the cumulative rate of discharging to the grid 8. Such sources could be power plants PPs dispatched through direct control or through a market mechanism or demand response resources, either dispatched through direct control or through a market mechanism. This has the advantage that energy charged to e-vehicles 6 can also be replaced in the batteries even if there is no local generation.

In extensions to any embodiment or combination outlined above, the central control unit CCU also adds power consumption from any other load to the cumulative rate of charging from the grid 8. Such sources could be electrical load groups dispatched through direct control or through a market mechanism or power generators that can be variably curtailed, either dispatched through direct control or through a market mechanism. This has the advantage that excess power produced by local power generators PGUs can be consumed and that power with undesirable side effects, such as $CO_2$ emissions, can be curtailed instead of the locally generated power.

In extension to any embodiment or combination outlined above, the central control unit CCU dispatches the transport unit 3 to displace electric vehicle chargers 2 with below-average state of charge SoC and emplace electric vehicle chargers 2 with above-average state of charge SoC. When there are no chargers 2 with above-average state of charge SoC left on the truck 3, the central control unit CCU dispatches the truck 3 to emplace all chargers 2 at the next centralized charging location. If any battery 2D at a centralized recharging location is full, the central control unit CCU dispatches the next charging truck 3 with remaining carrying capacity or carrying a battery 2D with below-average state of charge SoC to pick up the e-vehicle charger 2 with the full battery 2D from the centralized recharging location.

In extension to the embodiment directly above, the central control unit CCU chooses the actions of each transport unit or truck 3 by minimizing the following cost or optimization function:

$$C = T \times C\_driving + C\_calculatory + C\_energy$$

where T is the minimum of the set of all $T\_i$, where $T\_i$ is the time required by the i-th truck 3 for its next n actions, where n is a parameter of the calculation;

where C_driving is calculated by multiplying the distance traveled by a truck 3 as determined by a traveling-salesman solver in the time T and multiplying by a distance-specific cost, dividing by T then adding the time-specific cost including wage and truck amortization, then summing over all trucks;

where C_calculatory is calculated by multiplying the energy not charged to electric vehicles 6 because of insufficient battery state of charge SoC by an average e-vehicle energy price, where the energy not charged is determined by simulation over the time T: decrease all states of charge SoC by the average e-vehicle charging rate at the given time of day and given site less the maximum grid charging rate at the given site, but at most up to full charge; bump the state of charge SoC whenever an e-vehicle charger 2 is replaced and integrate all negative states of charge SoC over time and all e-vehicle chargers 2;

where C_energy is calculated by multiplying the total energy charged locally during the time T by the local charging cost, adding the total energy charged centrally during the time T multiplied by the central charging cost.

The minimization can be achieved for example by a Monte Carlo/Simulated Annealing approach or any other solver.

In an extension of the concrete implementation outlined above, the batteries 2D that are scheduled for displacement by the central control unit CCU are discharged with priority, i.e., step 1 of the algorithm outlined above is replaced by:

A-1. Calculate the average state of charge SoC over all the batteries. Order the batteries by their state of charge SoC from greatest to smallest and assign the batteries 2D with above-average, average, and below-average states of charge SoC to separate lists. Re-assign all batteries 2D scheduled for displacement to the beginning of the list of batteries with above-average state of charge SoC. Set the grid charge and grid discharge setpoint for each battery to zero.

This has the effect of discharging the batteries 2D scheduled for pick-up. The advantage is that the truck 3 will pick up batteries 2D that have a lower state of charge SoC thus keeping more energy in the chargers 2 that are not under displacement.

In an implementation of the present invention, the central control unit CCU is adapted to control the charging and discharging of the batteries 2D on the truck 3 employing the following process B:

B-1. Receive the state of charge SoC and the maximum battery charge and discharge powers from the local control units LCUs of the batteries.

B-2. Order the batteries on each truck 3 by decreasing state of charge SoC.

B-3. For each battery in the list of batteries on the truck 3 ordered by decreasing state of charge SoC, continue at B-3.1; after processing the last battery, continue at B-1.

B-3.1. If the battery is not full, label the battery as the charge candidate and continue at B-3.2., else continue with the next battery at B-3.

B-3.2. Form a sub-list of the list of batteries on the truck 3 ordered by decreasing state of charge SoC which includes all batteries from the battery after the charge candidate to the end of the list.

B-3.3. For each battery in the sub-list, if the battery is not empty, increase the battery's discharge power by the difference between the maximum charge power of the charge candidate and the current charge power of the charge candidate, but at most to the maximum discharge power of the battery, and increase the charge power of the charge candidate by the increase in discharge power of the battery. If the battery is the last battery in the sublist, continue at B-3.

The advantage of this implementation is that the transport unit 3 does not need to return to the centralized recharging location as often, reducing the mileage on the transport unit 3 per energy charged into electric vehicles 6 or mobile devices.

In a possible abstract extension of the concrete implementation, the local control units LCUs are connected to a measuring device MD measuring at least one grid parameter, such as the grid frequency. The local control units LCUs follow the following process to set the actual power of the converter:

C-1. Calculate a stabilizing power by subtracting the discharge power setpoint from the charge power setpoint.

C-2. Add a function of the grid parameter to the stabilizing power.

C-3. If the stabilizing power is greater 0, set the converter to rectify the stabilizing power; else invert the sign of the stabilizing power and set the converter to invert the stabilizing power.

This embodiment has the advantage that the grid 8 is not only placed under additional load/generation asymmetry, but that the e-vehicle chargers 2 even counteract an existing load/generation asymmetry.

In a concrete implementation of the abstract extension, the grid parameter is the grid frequency f and the function P(f) for a given maximum power parameter $P_{max}$ is defined by $$P_{max} \frac{f - 50 \text{ Hz}}{20 \text{ mHz}}, \text{ if } 49.8 \text{ Hz} < f < 50.2 \text{ Hz}$$

$$P_{max} \text{ if } f \geq 50.2 \text{ Hz}$$

$$-P_{max} \text{ if } f \leq 49.8 \text{ Hz}$$

This concrete implementation has the advantage that since the frequency f is constant in grids where currents are primarily generated by rotating equipment, it stabilizes the grid 8 without any further central action and therefore any central point of failure.

In a concrete implementation of the abstract extension, the grid parameter is the voltage U and the function P(U) for a given maximum power parameter $P_{max}$ is defined by $$P_{max} \frac{U - 230 \text{ V}}{23 \text{ V}}, \text{ if } 207 \text{ V} < U < 253 \text{ V}$$

$$P_{max} \text{ if } U \geq 253 \text{ V}$$

$$-P_{max} \text{ if } U \leq 207 \text{ V}$$

This concrete implementation has the advantage that over- and undervoltage of the grid 8 at the connection point is automatically countered without the need for central action.

In a slightly different implementation of the abstract extension, the grid parameter is the voltage U and the function Q(U) for a given maximum power parameter $Q_{max}$ is defined by $$Q_{max} \frac{U - 230 \text{ V}}{10 \text{ V}}, \text{ if } 225 \text{ V} < U < 235 \text{ V}$$

-continued $$Q_{max} \text{ if } U \geq 235 \text{ V}$$

$$-Q_{max} \text{ if } U \leq 225 \text{ V}$$

where Q represents reactive, not active power. This implementation has the advantage that the grid voltage is stabilized without changing the amount of energy that is charged into/discharged from the battery in a time frame.

In an extension of any of the concrete implementation of the embodiment above, the central control unit CCU is adapted to send a separate maximum power parameter $P_{max}$ and/or $Q_{max}$ to each local control unit LCU in a concrete implementation where the grid parameter is the grid frequency f, the central control unit CCU is adapted to receive the grid frequency f from one or more of the local control units LCUs or from a central measuring device and to split a total maximum power $P_{max}$ over the e-vehicle charger 2. The total maximum power is, for example, the maximum amount of power generation that might be removed from the grid in any single incident. The central control unit CCU is adapted to follow this process:

D-1. Receive all states of charge SoC and all maximum charge and discharge powers. Calculate the average state of charge SoC. Receive the grid frequency f.

D-2. If the grid frequency f is greater than the nominal grid frequency, order the batteries 2D by increasing state of charge SoC into a list; if the grid frequency f is smaller than the nominal grid frequency f, order the batteries by decreasing state of charge SoC into a list; if the grid frequency f is equal to the nominal grid frequency f within measurement accuracy or any technically-relevant dead band, order the batteries by the increasing absolute difference of their state of charge SoC to the average state of charge SoC into a list.

D-3. If there is at least one battery in the list and $P_{max} > 0$, pick the first battery in the list. Assign the minimum of $P_{max}$, the maximum charge power, and the maximum discharge power to the maximum power parameter $P_{max}$, bat of the battery. Subtract $P_{max}$, bat from $P_{max}$. Remove the battery from the list and continue at D-3.

This implementation has the advantage that an oversupply of power in the grid 8 is first used to charge the batteries 2D with lower states of charge SoC, thus maximizing the number of e-vehicle chargers 2 that can be charged from, while an undersupply of power is counteracted from the batteries 2D with a higher state of charge SoC, again maximizing the number of e-vehicle chargers 2 that can be charged from.

In a straightforward extension of the above extension, the total maximum power $P_{max}$ is replaced by $P_{max}^+$ and $P_{max}^-$, which are the total maximum power in times of oversupply and undersupply, respectively. The process D is repeated for both total maximum power values where the list in D-2 is ordered by decreasing state of charge SoC for the total maximum power in times of undersupply and inversely for the total maximum power in times of oversupply, irrespective of the grid frequency f.

In an extension of the concrete implementation outlined above, the central control unit CCU is adapted to forecast a state of charge SoC for each e-vehicle charger 2 for a future timepoint related to the hour-count capacity (i.e., the capacity in kWh divided by the maximum discharge power in kW), for example 25% of the average hour-count capacity of the batteries. The forecast is based on the e-vehicle charging history for the location of the e-vehicle charger 2. The process step A-1 is adapted to include, immediately after the reception of values from the local control units LCUs:

A-1. ... Calculate the forecast for each e-vehicle charger
2. Replace each state of charge SoC with the forecast state of charge SoC . . . .

Figure 40A:
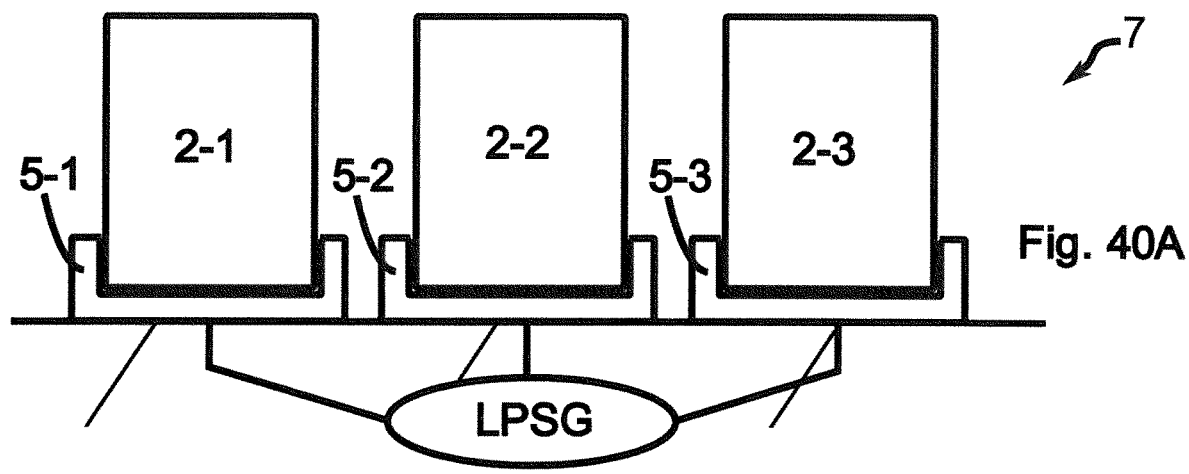
FIG. 40A,B,C show schematically different embodiments of a microgrid according to a further aspect of the present invention.
Figure 40B:
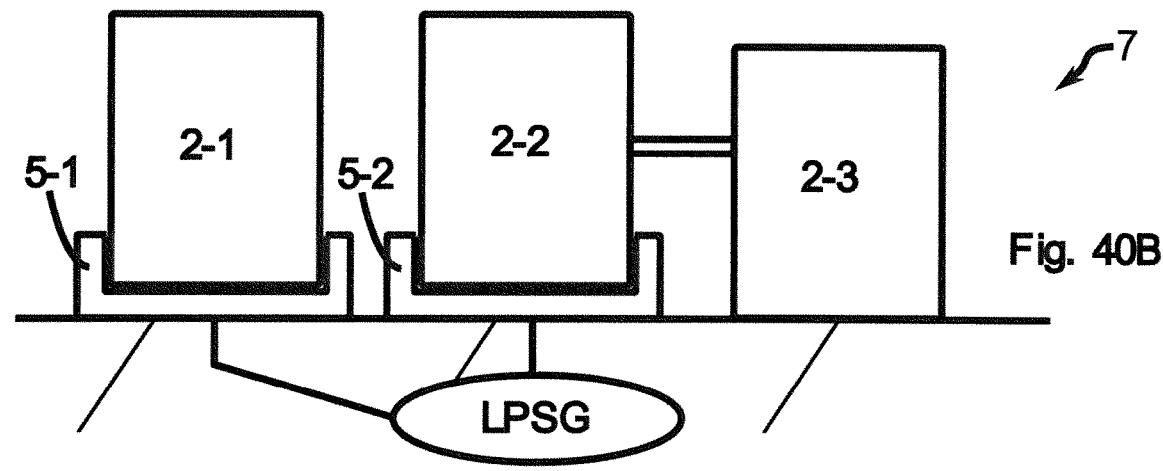
Figure 40C:
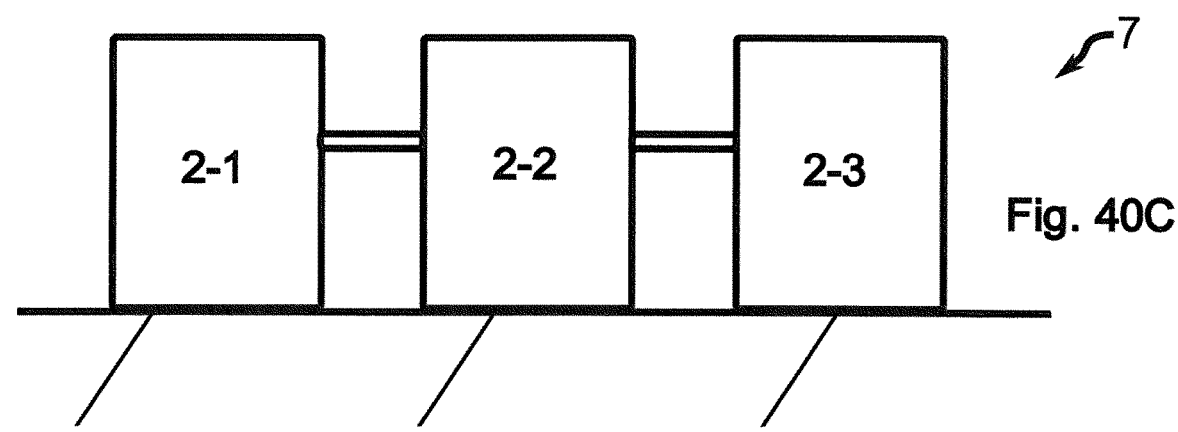

In a concrete implementation, the forecast is calculated like this:

$$SoC_{t_{forecast}} = SoC_{t_{now}} + (t_{forecast} - t_{now}) \frac{\sum_{t_i}(\theta(TOD(t_i) - TOD(t_{now})) - \theta(TOD(t_i) - TOD(t_{forecast})))P_{t_i}}{\sum_{t_i}(\theta(TOD(t_i) - TOD(t_{now})) - \theta(TOD(t_i) - TOD(t_{forecast})))}$$

where θ is the Heaviside function, TOD maps a point in time to the number of seconds between the previous start of a day and that point in time, $SoC_t$ is the state of charge in kWh at time t, $P_t$ is the charger power measured at time t, and $\{t_i\}$ is the set of all times for which charger power measurements have been recorded. the forecast can be extended to include re-charging the battery by adding the linear term again, only exchanging $P_{t_i}$ with $R_{t_i}$, the recharge power measured at time $t_i$. This forecast will produce useful results early in operations, when the set of all times recorded is small. When the set of all times recorded is large, the forecast can be advantageously refined by replacing TOD with TOW, which maps a point in time to the number of seconds between the previous start of a week and that point in time FIGS. 40A, 40B, 40C are exemplary embodiments of local power supply grids or microgrids 7 used in a charging and control system 1 according to the present invention. The transportable charging stations 2 can either be deployed on ground floor or placed on a base frame 5. In the embodiment illustrated in FIG. 40A, the local power supply grid 7 comprises three transportable charging stations 2-1, 2-2, 2-3 placed on corresponding base frames 5-1, 5-2, 5-3 of the local power supply grid 7. The transportable charging stations 2 comprise ground locking interface units adapted to place the transportable charging stations 2 on corresponding fitting base frames 5 mounted on the ground floor as illustrated in FIG. 40A. The base frames 5-i provide electrical connections to the local power supply grid 7. Further, the base frames 5 can provide a mechanical locking as also described in context with the mechanical locking mechanism 11 illustrated in FIG. 4.

The transportable charging units 2 can also be deployed directly on a ground floor or open field. In the embodiment illustrated in FIG. 40B, the third transportable charging station 2-3 is directly deployed on ground floor and not placed on a base frame 5. In a possible embodiment, such a directly deployed transportable charging station 2-3 can be connected to a closest transportable charging station such as transportable charging station 2-2 connected via a corresponding base frame 5-2 to the local power supply grid 7. Accordingly, in the embodiment illustrated in FIG. 40B, the local power supply grid 7 comprises both transportable charging stations 2-1, 2-2 placed on corresponding base frames 5-1, 5-2 but also a transportable charging station 2-3 placed directly on ground floor.

In the embodiment illustrated in FIG. 40C, all charging stations 2-1, 2-2, 2-3 are deployed directly on ground floor without the provision of any base frames 5. The different charging stations 2-1, 2-2, 2-3 are directly to each other via power interfaces to provide the local power supply grid 7. In a possible implementation, the different transportable charging stations 2-1, 2-2, 2-3 can also be connected mechanically to provide a power pack which can be transported by a transport unit 3 to the desired site of the local power supply grid 7. In a possible implementation, the housings 2A of the different charging stations 2-i may comprise mechanical provisions to connect the charging station 2 to another charging station 2 mechanically. The local power supply grid 7 as shown in FIG. 40C can be established at any location even when there are no base frames 5. For instance, the power supply grid 7 as shown in FIG. 40C can be placed in the open field, for instance to provide power for equipment used in an open-air event such as an open-air rock concert. The charging station 2 can comprise interfaces to load electrically powered vehicles or other mobile devices or user equipment UE. The different local power supply grids 7 as illustrated in FIGS. 40A, 40B, 40C may comprise at least one local control unit LCU. In a possible embodiment, the local control unit LCU of the local power supply grid 7 is formed by the control unit 2H of the transportable charging station 2 as illustrated in the block diagram of FIG. 3.

Figure 41:
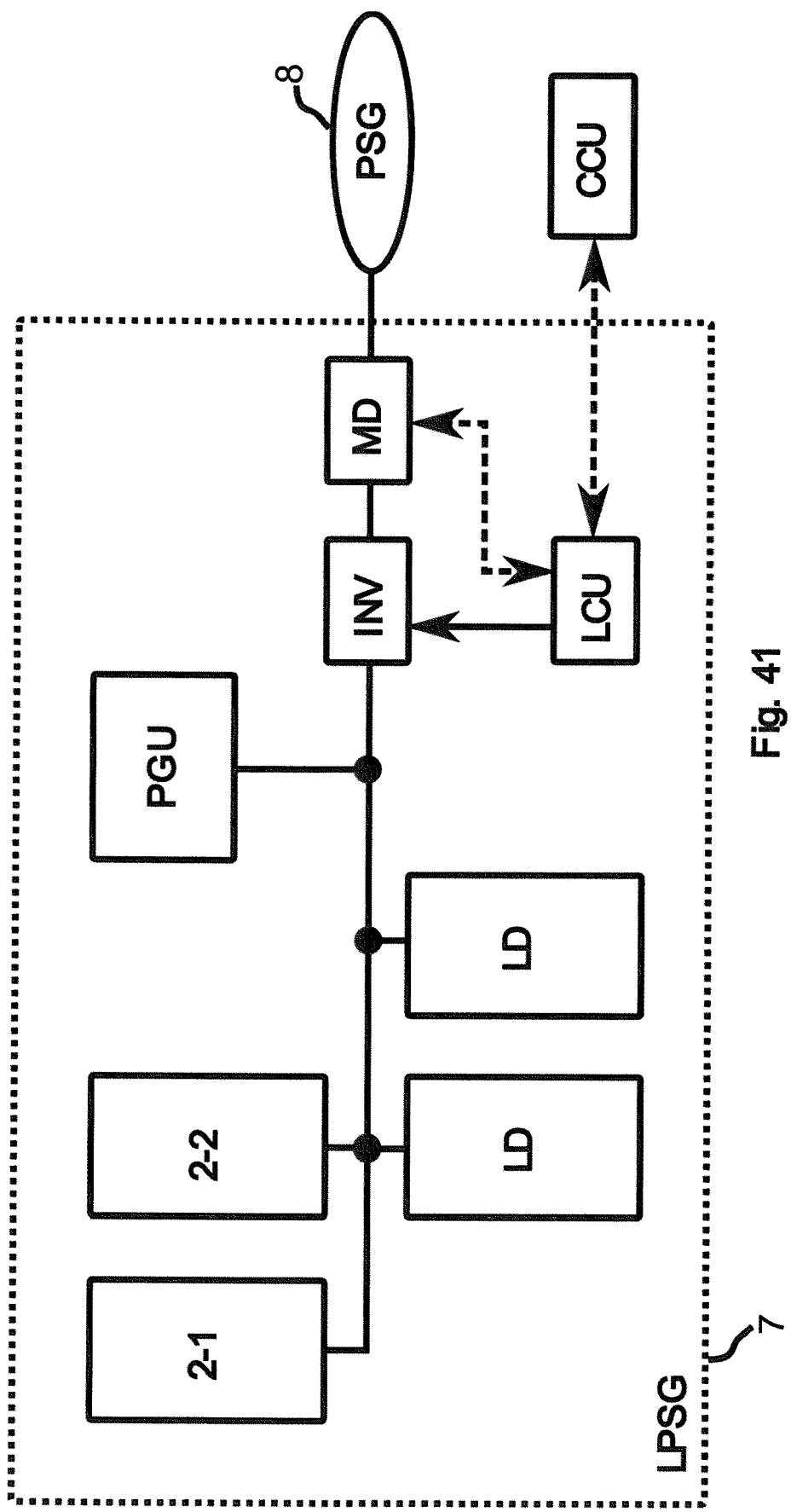
FIG. 41 shows a block diagram of possible embodiment of a microgrid according to the present invention.

FIG. 41 shows a block diagram of a possible exemplary embodiment of a local power supply grid 7 according to a further aspect of the present invention. In the illustrated embodiment, the local power supply grid 7 comprises several transportable charging stations 2-1, 2-2 which can be either directly deployed on the field or placed on corresponding base frames 5. In the illustrated embodiment of FIG. 41, the local power supply grid 7 further comprises load devices LD which consume electrical power. Further, the local power supply grid 7 comprises at least one local power generation unit PGU such as a photovoltaic array to generate electrical power locally. The local power supply grid 7 as shown in the implementation of FIG. 41 can also comprise a DC/AC inverter INV adapted to transform DC power into AC power which can be fed into the power supply grid 8 via a metering device MD as shown in FIG. 41.

In the embodiment shown in FIG. 41, the load devices LD are DC power consuming devices consuming electrical power stored in the transportable charging stations 2-i or generated locally by the power generation unit PGU. In an alternative embodiment, the local power supply grid 7 comprises a local AC power supply network. In this embodiment, the charging stations 2-i further comprise an integrated DC/AC converter circuit INV adapted to convert the DC power stored in the battery packs 2D into an AC power applied to local load devices LD. The load devices LD can comprise mobile electrical devices such as mobile phones or rechargeable batteries of bicycles but also fixed load devices LD such as washing machines or refrigerators of a private household. The local control unit LCU of the local power supply grid 7 can be connected via a wired link or a wireless communication link to the central control unit CCU of the power supply grid 8 as illustrated in FIG. 41. The metering device MD can provide metering data or measurement data of the electrical power exchanged with the power supply grid 8 via a local data network as also illustrated in FIG. 41. The local control unit LCU can be adapted to control the operation of the inverter circuit INV. Further, the local control unit LCU can also control the operation of the transportable charging stations 2-i, the local power generation unit PGU and the local load devices LD. The local control unit LCU of the power supply grid 7 can be used to perform charge balancing between different transportable charging stations 2-i of the local power supply grid 7. Further, the local control unit LCU can communicate with the center control unit CCU to support stabilization of the public power supply grid 8 such as increasing or decreasing a frequency f of the public power supply grid 8.

Figure 42:
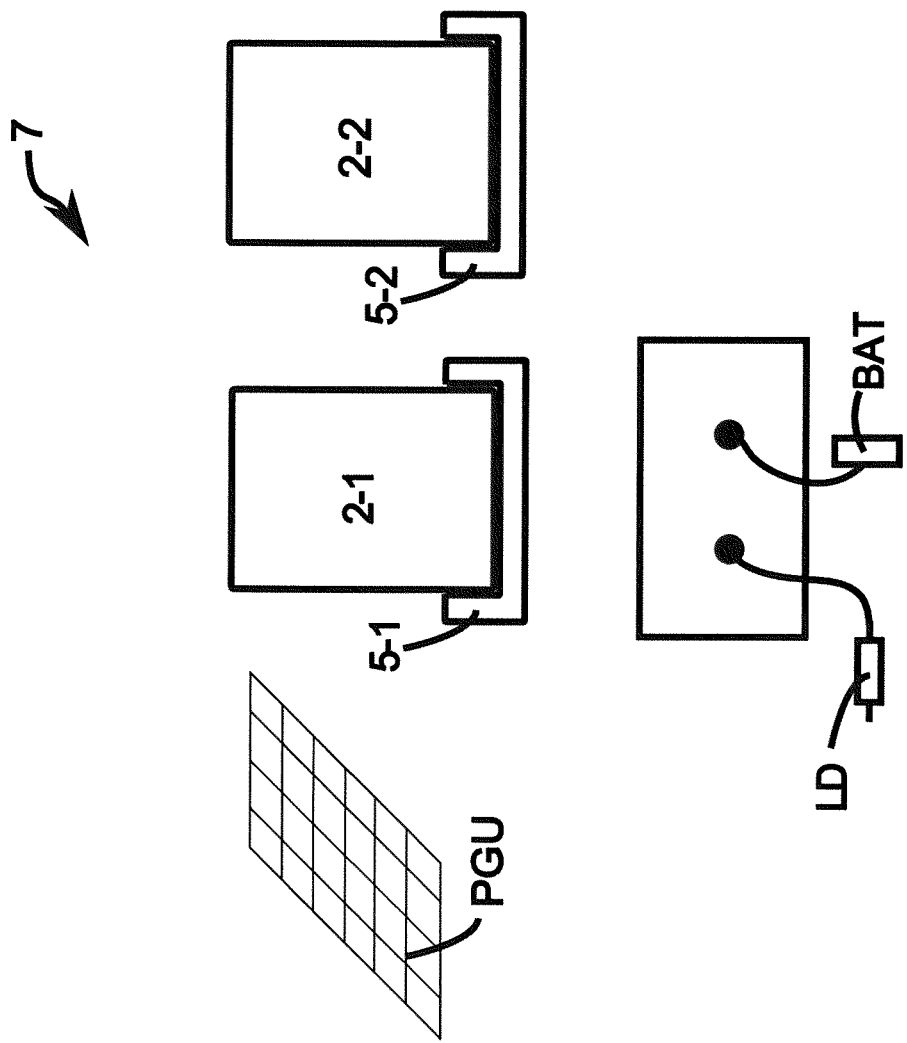
FIG. 42 shows an exemplary implementation of a possible microgrid according to the present invention.
Figure 43:
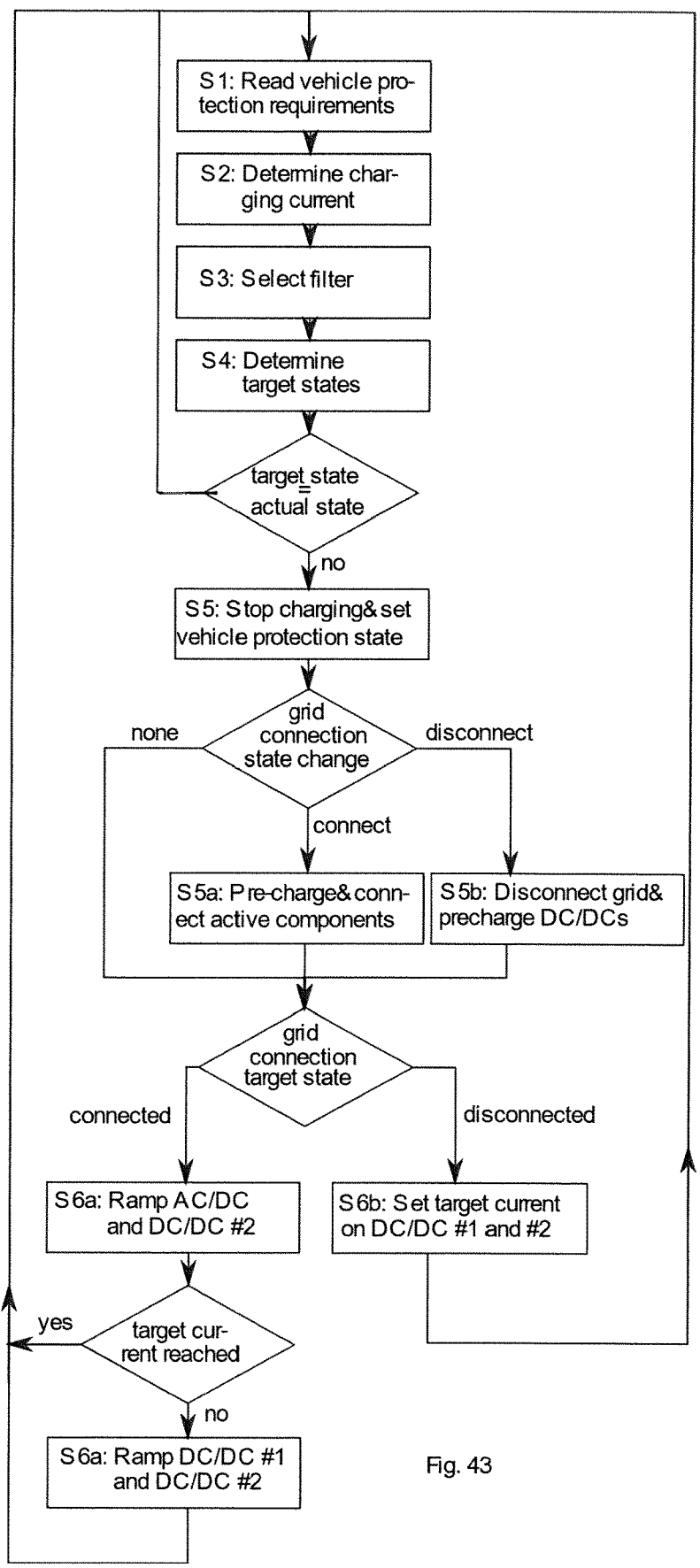
FIG. 43 shows a flowchart to illustrate the operation of a high-power charging station to charge the vehicle's battery according to an aspect of the present invention.

FIG. 42 shows an example of a possible embodiment of a local power supply grid 7 within a charging system 1 according to the present invention. In the illustrated embodiment, the local power supply grid 7 comprises two deployed charging stations 2-1, 2-2 placed on corresponding base frames 5-1, 5-2 of the local power supply grid 7. The local power supply grid 7 comprises local loading columns LCs as illustrated in FIG. 2 for loading a vehicle battery of a car 6A or a battery of an e-bike 6B. Further, transportable user equipment UE such as a mobile phone can be loaded by connecting it to a loading column LC of the local power supply grid 7. Further kind of batteries, for instance batteries of e-bikes, can also be connected to such a loading column LC of the local power supply grid 7. In the illustrated embodiment of FIG. 42, the local power supply grid 7 further comprises a local power generation unit PGU such as a photovoltaic array. As soon as the battery packs 2D of the transportable charging stations 2-1, 2-2 are discharged, they can be replaced by reloaded charging stations 2-i. It can be uploaded by a transport unit 3, in particular a transport truck. In exceptional locations or sites, the transport unit 3 can also comprise a flying transport unit 3 such as a drone or helicopter. The local power supply grid 7 can also comprise electro-motors or actuators powered by the local grid 7 and used to load or unload the transportable charging stations 2 from a transport truck 3 under the control of the LCU of the local grid 7 or a RCU handheld by a user. FIG. 43 shows a flowchart of an exemplary embodiment of a method for charging an electrically powered vehicle 6 by a high-power charging station 2 according to the present invention with adaptive EMC filtering. The high-power charging station 2 according to the present invention can be used to exchange electrical power with a battery of an electrically powered vehicle 6 or other mobile device which is connected by means of a power cable to the high-power charging station 2. The high-power charging station 2 according to the present invention comprises at least one DC/DC converter adapted to convert electrical DC power. During conversion, unwanted frequencies can be generated by the DC/DC converter or other converters of the high-power charging station 2. Suppression of these unwanted frequencies generated by the DC/DC converter of the high-power charging station 2 by means of electronic filters implemented in the high-power charging station 2 is controlled by the control unit 2H of the high-power charging station 2. The suppression of unwanted frequencies generated by the at least one DC/DC converter or other converters by means of the electronic filters of the high-power charging station 2 can be controlled by the control unit 2H of the high-power charging station 2 in a possible embodiment depending on electromagnetic requirements of the vehicle 6 notified by a controller of the vehicle 6 to the control unit 2H of the high-power charging station 2.

In a possible embodiment, the high-power charging station 2 is adapted to operate at very high-power, for example more than 500 kW or even more than 1 Megawatt. This does pose a challenge that even low losses in the power electronics of the charging station 2, for example 2% losses, already require 20 kW of heat to be dissipated from the high-power charging station 2. Now, significant amounts of heat are generated by the electronic filters of the charging station 2 which dissipate the energy content of electrical currents which comprise unwanted frequencies. These unwanted generated frequencies, in particular switching frequencies and their harmonic frequencies generated by switching transistor components of converters within the high-power charging station 2 are limited as input to any power supply grid connected to the high-power charging station 2. In a possible embodiment, the high-power charging station 2 comprises a grid connection interface to receive electrical AC power converted by an AC/DC converter integrated in the high-power charging station 2 into a DC power supplied to an input of the DC/DC converter of the high-power charging station 2. Via the grid connection interface, the charging station 2 can be connected also to a local power supply grid 7 or to a public power supply grid 8. The unwanted switching frequencies and their harmonic frequencies have to be suppressed as input to the connected power supply grid since the power supply grid can connect a multitude of devices which may all generate disturbances and/or can be impacted by such disturbances. Accordingly, standards for emissions into the power supply grid, in particular into the public power supply grid 8 are more strict than they can be for the connection between the electric vehicle 7 and the charging station 2. For example, lithium-ion batteries of an electrically powered vehicle 6 are unaffected mostly by the presence of such unwanted frequencies because they behave as capacitors and let higher frequencies pass through; furthermore, even frequencies that are absorbed by the vehicle battery and are converted into heat instead of electrical energy are beneficial for the charging process since warmer Li-Ion batteries require lower voltages to charge at higher currents than colder batteries. The energy contained in the capacitors is swapped back and forth electronically between the switched power electronics in the charging station 2 and the switched power electronics in the electrically powered vehicle 6.

The high-power charging station 2 according to the present invention is therefore adapted to protect the connected power supply grid, in particular the public power supply grid 8, from such unwanted frequencies by selectively decoupling the high-power charging station 2 from the power supply grid and by controlling the electronic filters at the same time. In a possible embodiment, the electrically powered vehicle 6 communicates with the control unit 2H of the charging station 2 ahead of the charging process its capability to deal with electromagnetic disturbances. The control unit 2H of the charging station 2 can then select an appropriated electronic filter and can adjust the actual charging power according to the selected and/or activated electronic filter.

In a possible embodiment, the high-power charging station 2 comprises a grid connection interface to receive electrical DC power from the local or public power supply grid 7, 8. The AC power received via the grid connection interface is then converted by an AC/DC converter integrated in the high-power charging station 2 into a DC power supplied to an input of the main DC/DC converter of the high-power charging station 2. In a possible embodiment, both the at least one DC/DC converter and the AC/DC converter of the high-power charging station 2 include switching transistor components which during conversion operation generate switching frequencies and associated harmonic switching frequencies which are suppressed automatically by the electronic filters of the high-power charging station 2 under control of the control unit 2H. In a possible embodiment, the control unit 2H of the high-power charging station 2 is adapted to communicate via a communication interface module such as the communication interface module 2K with the controller of the electrically powered vehicle 6 which is connected to the charging plug of the high-power charging station 2 by means of the power cable for exchange of electrical power during the charging process.

The control unit 2H of the high-power charging station 2 is adapted to receive power supply from different power supply sources. In a possible implementation, the control unit 2H of the high-power charging station 2 is adapted to receive a power supply from one of the battery packs integrated in the high-power charging station 2. In a further possible embodiment, the control unit is adapted to receive a power supply from an auxiliary battery integrated in the housing of the high-power charging station 2 or attached to the high-power charging station 2. In a still further possible embodiment, the control unit 2H is adapted to receive power supply from a battery of a mobile device or from a battery of the vehicle connected to the high-power charging station 2.

Figure 44:
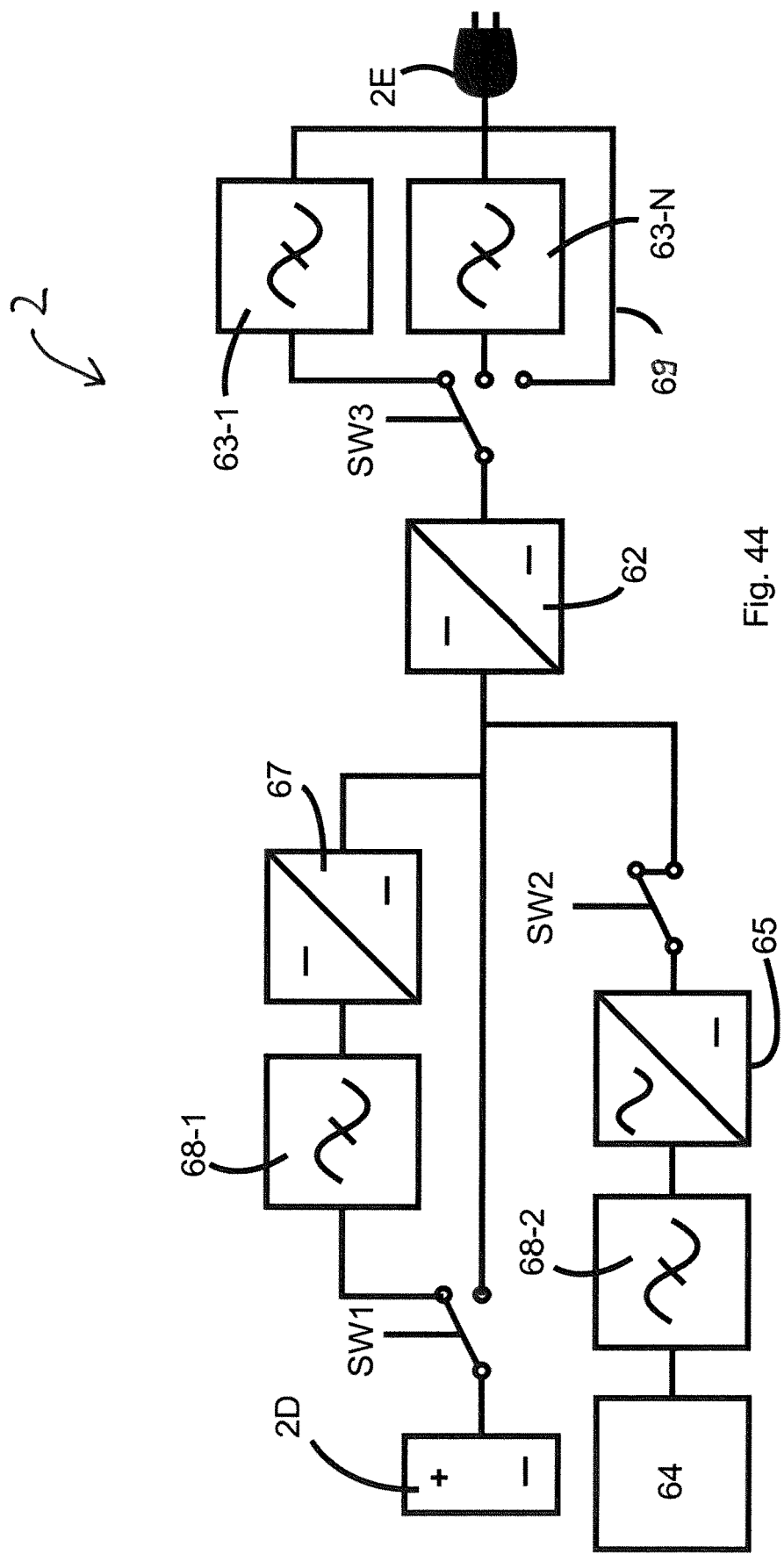
FIG. 44 shows a block diagram of a possible exemplary embodiment of a high-power charging station according to an aspect of the present invention.
Figure 45:
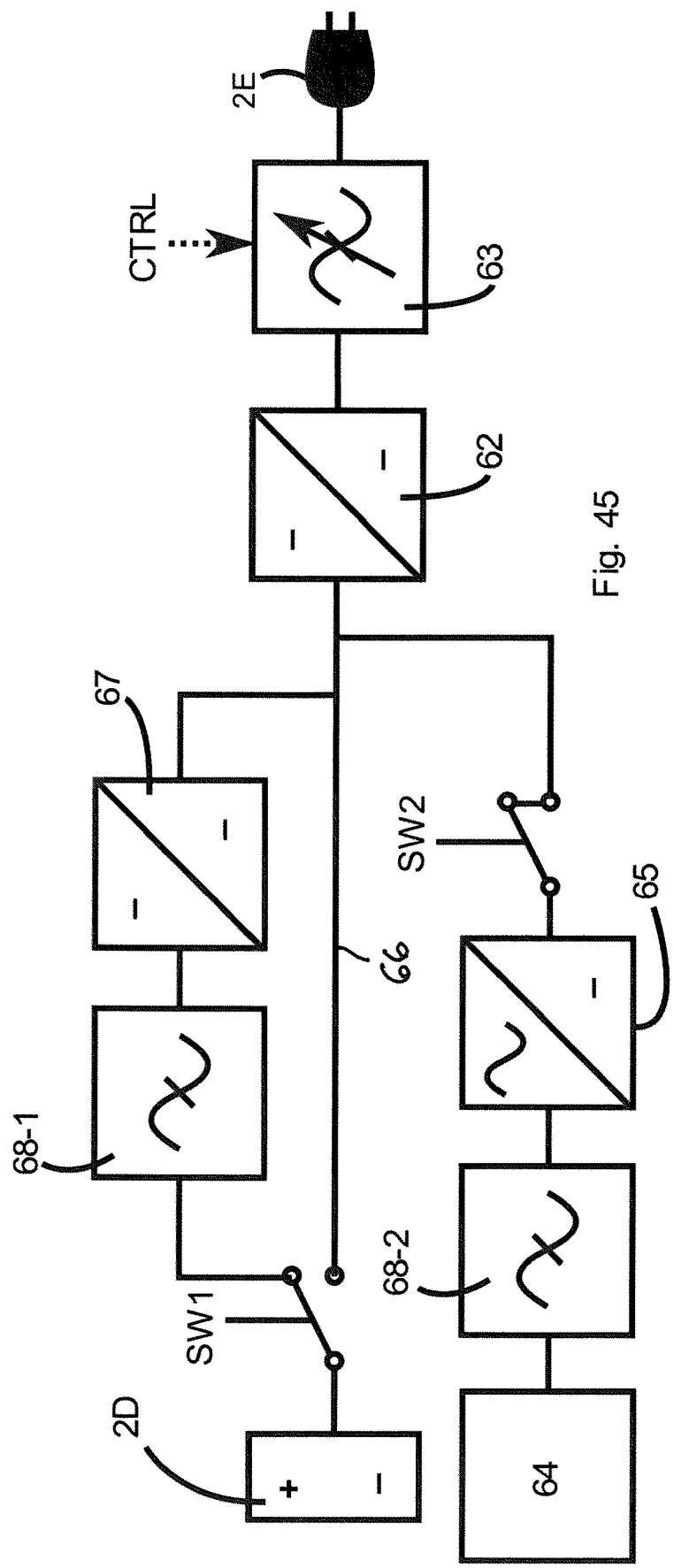
FIG. 45 shows a block diagram of a further possible exemplary embodiment of a high-power charging station according to an aspect of the present invention.

FIGS. 44, 45 show block diagrams of possible embodiments of a high-power charging station 2 according to the present invention. As can be seen in the embodiment of FIG. 44, the high-power charging station 2 comprises a main DC/DC converter 62 adapted to convert electrical DC power. The main DC/DC converter 62 comprises an input to receive power from different power signal paths and an output-to-output DC power via a controllable switch SW3 to a charging plug 2E of the high-power charging station 2. The high-power charging station 2 comprises a grid connection interface 64 to receive electrical power converted by an AC/DC converter 65 of the high-power charging station 2 into a DC power supplied via a switch SW2 to the input of the main DC/DC converter 62 of the high-power charging station 2. The high-power charging station 2 can be connected via the grid connection interface 64 to a local power supply grid 7 or to a public power supply grid 8. The high-power charging station 2 comprises a first controllable switch SW1 which is provided to switch the at least one battery pack 2D of the high-power charging station 2 either directly via a signal line 66 to the input of the main DC/DC converter 62 or indirectly via a power path including a further DC/DC converter 67 connected in series with a first electronic filter 68-1 of the high-power charging station 2. Further, the high-power charging station 2 comprises a second controllable switch SW2 which is provided to connect or disconnect an output of the AC/DC converter 65 from the input of the main DC/DC converter 62 as illustrated in FIG. 44. The AC/DC converter 65 is connected in series with a second electronic filter 68-2 as shown in FIG. 44. The high-power charging station 2 further comprises a third controllable switch SW3 provided to switch the output of the DC/DC converter 62 either directly via a signal line 69 to the charging plug 2E of the high-power charging station 2 or indirectly via an electronic filter 63-$i$ of a group of parallel electronic filters 63-1 to 63-N for connection via the power cable to the vehicle battery of the connected electrically powered vehicle 6.

In the illustrated embodiment of FIG. 44, the high-power charging station 2 comprises three switches SW1, SW2, SW3 to control the suppression of unwanted frequencies generated by the switching transistor components of the different AC/DC and/or DC/DC converters. The controllable first switch SW1, the second switch SW2 and the third switch SW3 are all controlled by a control program executed on a processor of the control unit 2H of the high-power charging station 2. In the illustrated embodiment of FIG. 44, the high-power charging station 2 comprises several electronic filters used to control unwanted generated frequencies to provide electromagnetic protection. These electronic filters used for a suppression of unwanted frequencies comprise electronic power filters consisting of different electronic components including coils, capacitors or resistors. In the embodiment illustrated in FIG. 44, the electronic power filters 63-I on the output side of the main DC/DC converter 62 are not adjustable but a selection between different predefined filter characteristics is provided by controlling switch SW3. In contrast, in the embodiment of FIG. 45, there is only a single electronic filter 63 on the output side having filter characteristics which are directly controlled by the control unit 2H depending on the electromagnetic protection requirements of the connected grid and/or the connected vehicle.

In a possible embodiment, the suppression of the unwanted frequencies generated by the converters of the high-power charging station 2 by means of the electronic filters is controlled by the control unit 2H of the high-power charging station 2 depending on electromagnetic requirements of the vehicle 6 notified by a controller of the vehicle 6 to the control unit 2H of the charging station 2. In a possible embodiment, these electromagnetic requirements are notified to the control unit 2H through a communication module 2K via an established communication link. This communication link can comprise a wired or wireless communication link. The control unit 2H of the high-power charging station 2 is adapted to receive via the communication module 2K information concerning electromagnetic protection requirements of the vehicle 6 as well as information concerning a maximum admissible charging current of the vehicle 6 from the controller of the electrically powered vehicle 6 being connected to the charging plug 2E of the high-power charging station 2 by means of the power cable. Information concerning the electromagnetic protection requirements of the vehicle 6 can indicate required signal attenuations of specific frequency ranges. Further, the information concerning the vehicle's 6 maximum admissible charging current can indicate a maximum charging current amplitude to avoid overheating of the vehicle's 6 power electronics and/or the vehicle's 6 battery during the power exchange via the connected power cable.

For switching the various power electronics elements of the electronic filters into and out of the respective power path, the control unit 2H of the high-power charging station 2 is provided. The charging control unit 2H is able to operate with and without grid support.

In a possible embodiment, the vehicle's 6 maximum charging current is calculated continuously by a controller of the vehicle 6 based on sensor data provided by sensors. These sensors can include in particular temperature sensors of the vehicle 6. The maximum charging current can then be communicated via the communication module 2K via the wired or wireless communication link to the control unit 2H of the high-power charging station 2. The control unit 2H of the high-power charging station 2 is adapted to determine a charging current as a minimum of the communicated vehicle's 6 maximum charging current and the charging station's 2 momentary maximum charging current and to control the suppression of unwanted frequencies generated by the switching transistor components of the DC/DC converters 62, 67 and/or by the switching transistor components of the AC/DC converter 65 by means of the electronic filters 63, 68 with minimum electrical power losses on the basis of the determined charging current and/or on the basis of the received information concerning the electromagnetic protection requirements of the respective electrically powered vehicle 6.

FIG. 43 shows a detailed flowchart of a possible exemplary embodiment of an algorithm for charging the battery of an electrically powered vehicle 6 with adaptive EMC filtering provided by controlled electronic filters as illustrated in the block diagrams of FIGS. 44, 45. In a possible embodiment, the control unit 2H comprises a processor adapted to execute the charging algorithm illustrated in the flowchart of FIG. 43.

In a first step S1, the electromagnetic protection requirements of the connected vehicle 6 can be read by the control unit 2H from the charge controller of the vehicle 6. Further, a maximum charging current can be determined. The electromagnetic protection requirements are notified to the control unit 2H wherein the requirements include in a possible implementation a series of frequency attenuation pairs, a series of frequency/voltage pairs and/or a series of frequency/current pairs. In a further possible embodiment, also an identifier can be communicated from the controller of the vehicle 6 to the control unit 2H of the charging station 2 used for selecting a certain profile of one or more of the above-mentioned series of pairs.

In a further step S2, the charging current is determined as the minimum of the charging station's 2 current maximum charging current and the maximum charging current of the connected electrically powered vehicle 6.

In a further step S3, an electronic filter or in an alternative implementation, an electronic filter configuration, is selected wherein the selected filter that comprises the lowest electrical losses given the determined charging current and that still satisfies the electromagnetic protection requirements of the connected electrically powered vehicle 6.

In a further step S4, a target configuration can be determined. If the selected electronic filter or selected filter configuration makes the charging station 2 compatible with the grid emission requirements of the connected power supply grid, a target state of switch SW2 is connected, else it is disconnected. The target state of switch SW1 is in the upper position in the former case and in the down position in the latter case.

Further, in step S4, the target electromagnetic protection mode of the vehicle 6 becomes the one compatible with the chosen filter or filter configuration. This can be achieved by the electric vehicle isolating one or more electromagnetically sensitive components inside the vehicle from the charging power path and supplying these components from an auxiliary power source. It may also be achieved by galvanically isolating one or more electromagnetically sensitive components inside the vehicle from any power source to prevent mis-operation from radiated electromagnetic interference.

As illustrated in the flowchart of FIG. 43, it is checked further whether the target state corresponds to the actual state. In case that the target configuration differs from the actual configuration, the charging current is brought in step S5 to zero and the target electromagnetic protection mode of the vehicle 6 is requested. The vehicle 6 is accordingly set in step S5 into a protection state. Then, one waits for confirmation that the electromagnetic protection mode of the vehicle 6 has been entered from the vehicle 6. A grid connection state change is determined. If the power supply grid is disconnected in the target configuration and connected in the actual configuration, the DC/DC converter 67 is set to precharging and the coil of the switch SW2 is depowered. The process then verifies that switch SW2 has disconnected the grid AC/DC converter 65 from the input of the DC/DC converter 62 of the high-power charging station 2 as illustrated in the block diagrams of FIGS. 44, 45. The DC/DC converter 62 is then set to precharging. The coil of switch SW1 is then powered and switch SW3 is set such to enable the required electronic filter 63-*i* in the embodiment of FIG. 44 or the required filter configuration of the adjustable electronic filter 63 in the alternative implementation of FIG. 45 is set by the control unit 2H. Then, one waits for the DC/DC converter 62 to precharge.

Accordingly, if the grid is connected in the target configuration and disconnected in the actual configuration, on the contrary, the DC/DC converter 67 is set to precharging. The coil of switch SW1 is depowered. The DC/DC converter 62 is set to precharging. Moreover, switch SW3 is set to enable the required electronic filter 63-*i* or the filter configuration of the adjustable filter 63 illustrated in the block diagram of FIG. 45. The AC/DC converter 65 is set to precharging. Then, the coil of switch SW2 is depowered. Then, all converters are set by the control unit 2H to achieve the same intermediate circuit voltage.

In a further step of the flowchart in FIG. 43, the charge current is set. In step S6*a*, if the grid is connected in the target configuration, the electrical current of the AC/DC converter 65 is brought to its maximum and the electrical current through the DC/DC converter 62 is ramped up commensurately. If the DC/DC converter 62 reaches the target charge current, the electrical current through the AC/DC converter 65 is kept increasing and the electrical current through the DC/DC converter 67 into the battery is increased commensurately, if the battery state of charge does permit this. If the DC/DC converter 62 reaches the charging current, the same is done. On the contrary, in step S6*b*, if the grid is disconnected in the target configuration, the charging current is brought to the target charge current with a control signal applied to the DC/DC converter 62 of the high-power charging station 2. As illustrated in the flowchart of FIG. 43, the process loops then back to step S1.

The advantage of the charging process as illustrated in the flowchart of FIG. 43 is that compared to conventional solutions where strict limits are placed on electromagnetic emissions by the charging station 2, much more efficient electric filters or even no filters at all can be used during the charging process and therefore, energy conversion into heat can be avoided to a large extent. This increases both the efficiency of the charging process and reduces the requirements for cooling the charging station 2 at the same time. This is of importance, in particular at high charging powers of more than 500 kW as achieved by the high-power charging station 2 according to the present invention.

Figure 46:
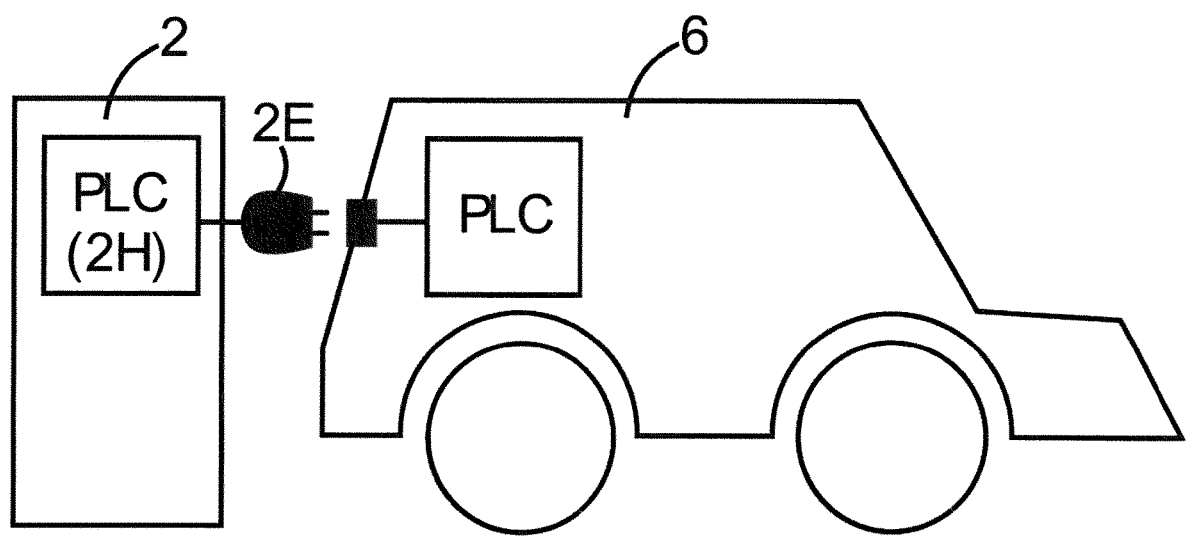
FIG. 46 shows a schematic diagram for illustrating a possible embodiment of a computer-implemented method for increasing safety during charging of a vehicle battery of a vehicle by a charging station according to the present invention.

The invention further provides according to a further aspect a computer-implemented method for increasing safety during charging of a vehicle battery of an electrically powered vehicle 6 by a charging station 2 according to the present invention. FIG. 46 shows schematically the connection of a control unit 2H of the charging station 2, in particular a charger PLC with a controller of the electrically powered vehicle 6, in particular a vehicle charging PLC via the charging plug 2E of the charging station 2 and a power cable.

The high charging electrical current experienced both by the connected vehicle or car 6 and the charging station 2 may damage either system. However, in a conventional setup, only the charging station 2 has the means of controlling the electrical current. The electrical vehicle 6, in case of an unsafe electrical current, can in a conventional setup only interrupt a charging process by switching off the electrical current. However, given the very high electrical currents involved having e.g., an amplitude of more than 100 Ampere, the switching off of the flowing electrical current is a very difficult proposition since switching of high electrical currents invariably involves the generation of arcs and thus would either lead to the provision of very large contactors being installed in the vehicles or very short replacement intervals necessary for smaller contactors. Accordingly, it is necessary to increase the safety during the charging process of the vehicle battery of the vehicle 6 without the necessity of providing very large contactors or the disadvantage of having very short replacement intervals for smaller contactors.

In the computer-implemented method for increasing safety during the charging process, safety responsibility is shared between the charging station 2 and the controller of the vehicle 6. By sharing the safety responsibility, the scenario of the vehicle switching off the full electrical charge current becomes very rare. As a consequence, a smaller contactor that switches rarely leads also to long replacement intervals.

In the computer-implemented method for increasing safety during charging of the vehicle's battery by a charging station 2, first, a forecast value for a maximum safe charging current can be calculated by the controller of the vehicle 6 based on sensor data generated by sensors of the vehicle 6. These sensors can include temperature sensors provided in the vehicle 6. After having calculated the forecast value for the maximum safe charging current, the charging current is provided by the charging station 2 and is adjusted automatically in response to the forecast value of the maximum safe charging current.

In a possible embodiment, first, a communication link is established between the controller of the vehicle 6 and the control unit 2H of the charging station 2. Then, the calculated forecast value for the maximum safe charging current is communicated by the controller of the vehicle 6 via the established communication link to the control 2H of the charging station 2. After the control unit 2H has received the calculated forecast value for the maximum safe charging current, it does automatically adjust the charging current provided by the charging station 2 in response to the forecast value.

The forecast value for the maximum safe charging current is calculated on the basis of sensor data generated by the sensors of the vehicle 6. These sensor data can comprise temperature sensor data generated by temperature sensors provided at measurement points including measurement points at the vehicle's battery, connectors of the vehicle battery, at the vehicle's charging socket and at power electronic components of the respective vehicle 6. The currently observed rate of change in the temperature can be calculated by the controller of the vehicle 6 on the basis of the temperature sensor data generated by the temperature sensors implemented in the vehicle 6. A temperature forecast for each measurement point can be calculated by the controller of the vehicle 6 in a possible embodiment by extrapolation on the basis of the rate of change of the temperature at the respective measurement points. Then, a forecast maximum safe charging current can be determined by the controller of the vehicle 6 iteratively based on the calculated temperature forecasts for the different measurement points and communicated to the control unit 2H of the charging station 2 via the established wired or wireless communication link.

In a possible embodiment, both the control unit 2H of the charging station 2 and the controller of the vehicle 6 can monitor continuously the communication link having been established between them. In a preferred embodiment, the forecast maximum safe charging current value can be communicated by the controller of the vehicle 6 to the control unit 2H of the charging station 2 for instance periodically every 10 to 100 msecs.

In a possible embodiment, the charging current provided by a DC/DC converter of the charging station 2 is controlled by the control unit 2H of the charging station 2 in response to the communicated forecast value of the maximum safe charging current. The DC/DC converter of the charging station 2 is adapted to convert a DC power which can be provided by at least one battery pack 2D of the charging station 2 or which can be provided by an AC/DC converter 65 of the charging station 2 into a DC power supplied as the charging current to the vehicle battery of the vehicle 6 via the connected power cable. The amplitude of the charging current provided by the charging station 2 can be in a range between 100 Ampere and 1500 Ampere to provide in a possible embodiment a charging power of more than 1 Megawatt.

Figure 47:
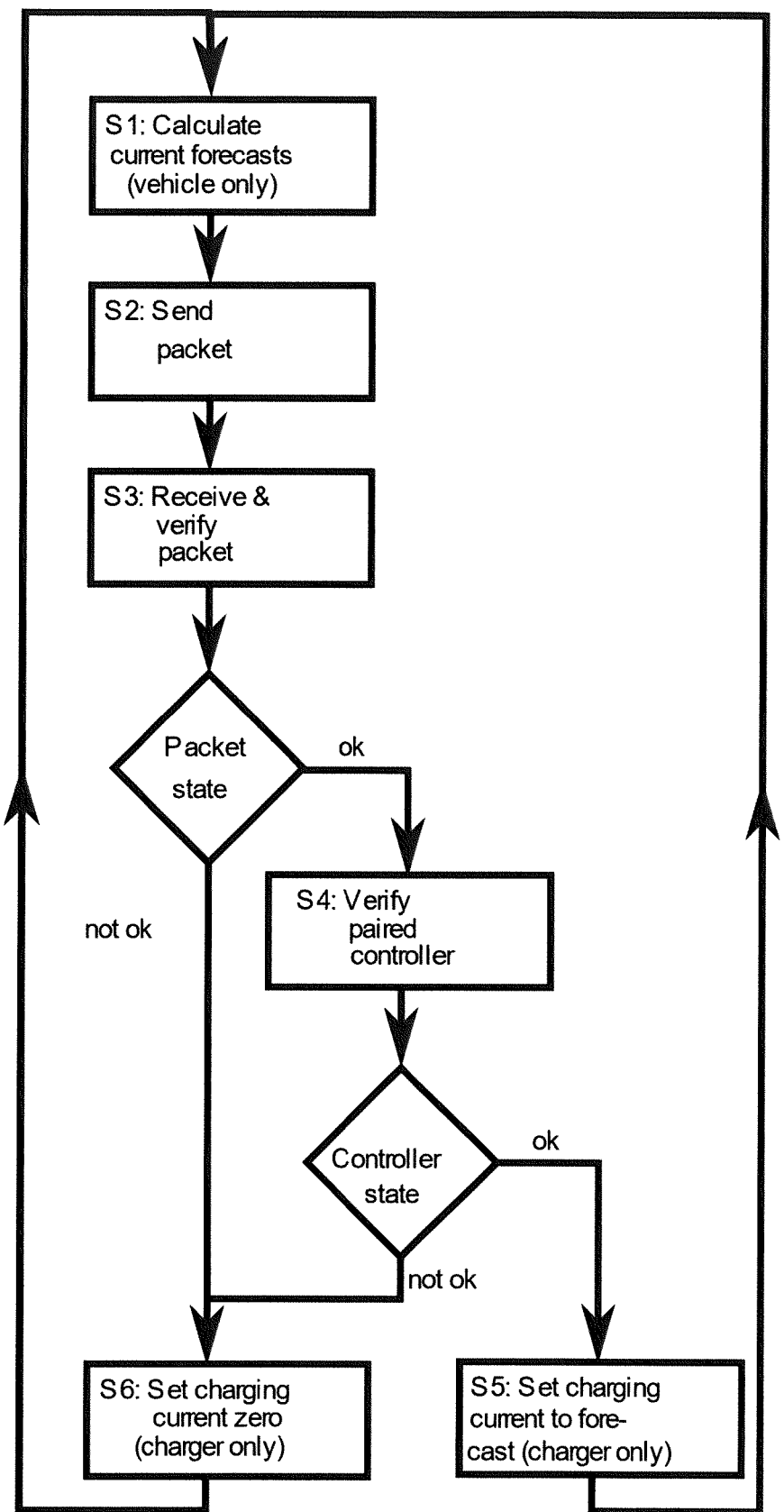
FIG. 47 shows a flowchart for illustrating a possible exemplary embodiment of a computer-implemented method for increasing safety during charging of a vehicle battery.

FIG. 47 shows a flowchart for a possible exemplary implementation of a method for increasing safety during charging of a vehicle battery of a vehicle 6 by a charging station 2 according to the present invention operating in collaboration with the controller of the electrically powered vehicle 6.

As can be seen in the flowchart of FIG. 47, first, a forecast value of the maximum safe charging current is calculated by the controller of the vehicle 6 in step S1. The forecast value can be calculated based on measurements using measurement devices or sensors connected to the controller of the vehicle 6. These measurement devices or sensors can include high-frequency thermos sensors placed on the vehicle's battery, the connectors of the e-vehicle's battery, the connector of the vehicle's charging socket and/or individual high amperage contacts inside the vehicle's charging socket. In a possible embodiment, the forecast value is calculated iteratively as illustrated in the flowchart of FIG. 48.

Figure 48:
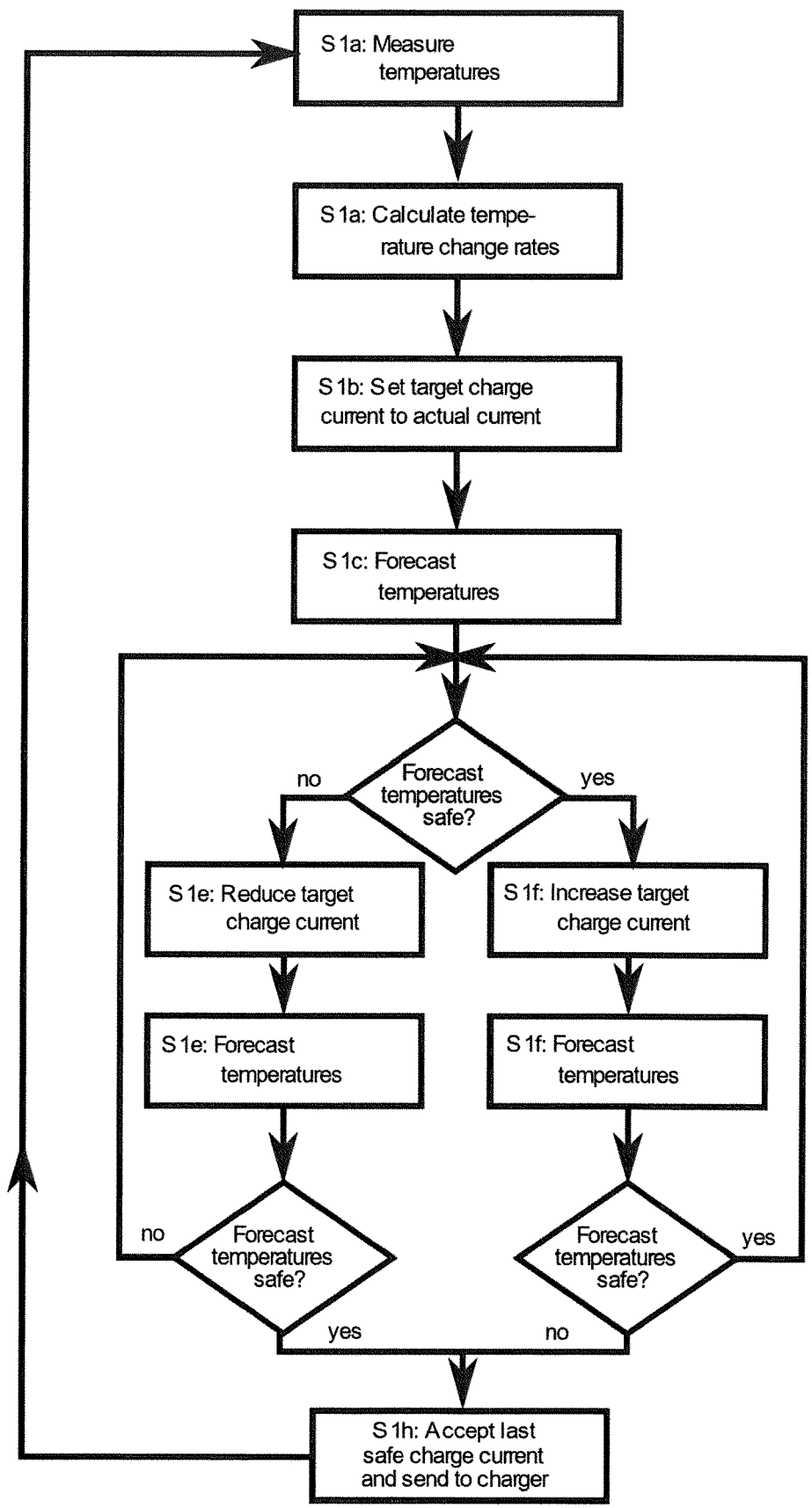
FIG. 48 shows a flowchart for illustrating the iterative calculation of safe current forecast values used by the computer-implemented method for increasing safety during charging of a vehicle battery as illustrated in FIG. 47.

FIG. 48 illustrates the iterative calculation of a forecast value for a maximum safe charging current by a processor of the controller within the vehicle 6 as performed in step S1 in the flowchart of FIG. 47.

As can be seen in FIG. 48, first, temperatures can be measured by temperature sensors of the vehicle 6. A currently observed rate of change in the temperatures can be calculated from past measurements in step S1a as shown in FIG. 48.

In a further step S1b, a safe charging current candidate can be set for the current charging current. In a further step S1c, a temperature forecast for each measurement point can be obtained for instance by linear extrapolation.

If the forecast temperatures do not violate the temperature threshold of each individual temperature measurement point, the momentary safe charging current candidate is considered to be safe, otherwise it is considered to be unsafe.

If the safe charging current candidate is deemed to be unsafe, a new safe charging current candidate can be obtained by reducing the previous safe charging current candidate in step S1e by a ratio R, wherein R is a fraction between 0 and 1. The rate of change of the temperature for each measurement point can be reduced in a possible embodiment by $R^2$ and a new temperature forecast can be calculated.

If the safe charging current candidate is deemed to be safe, a new safe charging current candidate is obtained in step S1f by increasing the previous safe charging current candidate by a ratio R, where R is a fraction between 1 and 2. The rate of change of the temperature for each measurement point can be increased by $R^2$ and new temperature forecasts are calculated.

If the forecast temperatures do not violate the temperature threshold of each individual temperature measurement point, the momentary safe charging current candidate can be considered safe, otherwise it is considered to be unsafe.

If the previous safe charging current candidate is safe and the momentary safe charging current candidate is unsafe, the previous safe charging current candidate is accepted; if vice versa, accept the current safe charging current candidate in step S1h, else continue with step S1e.

After step S1h, the process loops back to step S1 as illustrated in the flowchart of FIG. 48.

Returning back to the main routine illustrated in the flowchart of FIG. 47, a data packet is sent in step S2. A high frequency monitored communication connection is established by using in a possible implementation the built-in clock of each PLC or controller to dispatch a data packet preformed in the memory of either PLC illustrated in the block diagram of FIG. 46. The packet can include as a third memory address a counter value. The counter value can be incremented by one before each packet dispatch. The packet can include at a different memory address the calculated maximum safe charging current. This can be updated by the PLC or controller before dispatching the data packet. The data packet can include in a possible embodiment at a hash memory address a hash value of the packet including the counter and the maximum safe charging current. For example, the data packet can be dispatched to the network adapter of the PLC every N ticks from the clock or every millisecond if the PLC clock is a real-time clock.

In a further step S3, the packet is received and verified. On each PLC, the packet is received and verified using the hash by reading the entire packet received from the network adapter into the memory. The processor of the PLC can perform the hashing algorithm on the packet, comparing the result with the hash included in the packet at the hash memory address. If the comparison fails, a connected flag can be set at a connected memory address outside the packet memory to zero.

In a further step S4, the counter at the third memory address within the data packet is read. The counter value can be compared with a counter value stored at a comparison memory address. If the comparison is successful, a connected flag can be set.

In a further step S5, if the connected flag is set, the charging current can be adjusted automatically to the minimum of the maximum charging current received from the electrical vehicle 6 and the maximum charging current provided by the charging station 2.

If the connected flag is not set, the charging current is reduced to zero in step S6 as illustrated in the flowchart of FIG. 47. Finally, the process loops back to step S1 as illustrated in FIG. 47.

Figure 49:
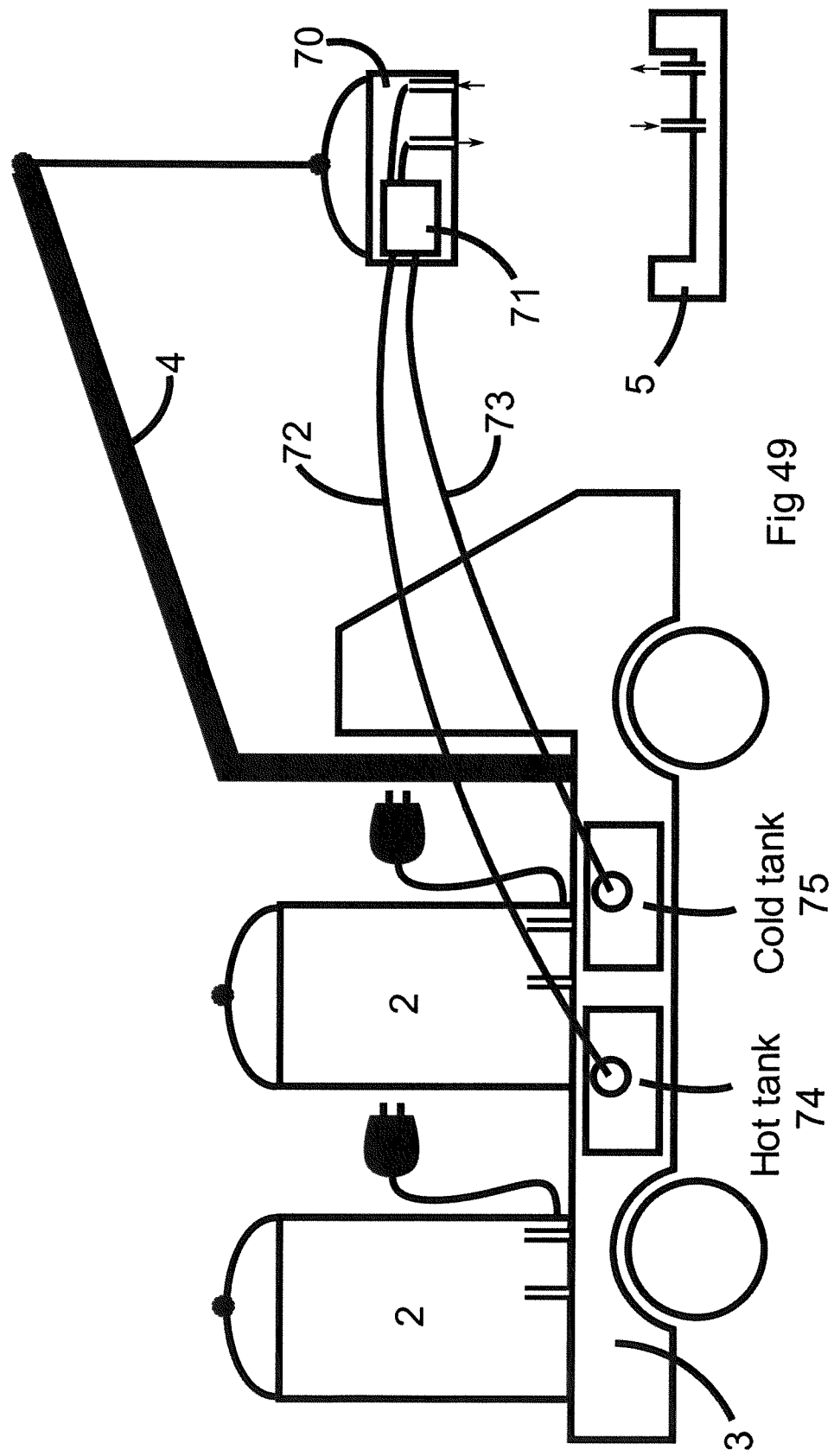
FIG. 49 illustrates a possible exemplary embodiment of a transport unit according to a further aspect of the present invention having a lifting mechanism used for lifting a fluid exchanger according to a further aspect of the present invention.

The invention further provides according to a further aspect a transport unit as illustrated schematically in FIG. 49. The transport unit 3 as shown in FIG. 49 can be used in a distributed charging system 1 comprising a plurality of charging stations 2 which can be transported by the transport unit 3.

In the illustrated embodiment of FIG. 49, the transport unit 3 can also be used to transport a fluid exchanger 70. The transport unit 3 comprises in the illustrated embodiment a lifting mechanism 4 adapted to lift the fluid exchanger 70 onto a base frame 5 of the charging system 1 installed on ground floor. When the fluid exchanger 70 is lifted on the base frame 5 it is adapted to exchange a cooling fluid with a fluid tank. This fluid tank can be connected to the base frame 5 via pipes. The fluid tank can for instance comprise a fluid tank 53 as illustrated in FIG. 36.

The fluid exchanger 70 can comprise in a preferred embodiment an integrated fluid pump 71 connected via one or more tubes 72,73 to at least one fluid tank 74,75 of the transport unit 3 as also illustrated in FIG. 49. The fluid pump 71 integrated in the fluid exchanger 70 is adapted to pump fluid from the fluid tank of the transport unit 3 into the fluid tank 53 of the base frame 5 or to pump fluid in the opposite direction from the fluid tank 53 at the base frame 5 into a fluid tank 74, 75 of the transport unit 3. The fluid pump 71 can be controlled by a controller. The pumping can be performed in response to a control signal received by the fluid pump 71 from a controller integrated in the fluid exchanger 70.

In an alternative embodiment, the fluid pump 71 can also receive the control signal from an external controller or control unit via a wired or wireless communication link. In a preferred embodiment, the controller of the fluid exchanger 70 can be adapted to communicate with a remote-control unit RCU handheld by a user or being integrated in the transport unit 3. Further, the controller of the fluid exchanger 70 can also communicate with a local control unit LCU of a local power supply grid 7 comprising the base frame 5 as illustrated in FIG. 49.

The fluid exchanger 70 comprises a housing comprising a lifting interface unit which is connectable to the lifting mechanism 4 of the transport unit 3. In the illustrated embodiment of FIG. 49, the transport unit 3 comprises a crane with a lifting mechanism 4 which can be connected to the lifting interface unit of the fluid exchanger 70. The lifting mechanism 4 of the transport unit 3 can also be used for lifting the transported charging stations 2 onto base frames 5 of local power supply grids 7.

In a possible embodiment, the housing of the fluid exchanger 70 comprises fluid ports adapted to provide a connection with fluid ports 50C, 50D of the base frame 5 when the fluid exchanger 70 has been lifted by the lifting mechanism 4 of the transport unit 3 onto the base frame 5. In this way, fluid can either be pumped from one of the fluid tanks 74,75 of the transport unit 3 into the fluid tank 53 at the base frame 5 or can be pumped in the opposite direction from the fluid tank 53 at the base frame 5 into a fluid tank 74,75 of the transport unit 3 as also illustrated in FIG. 49. The controller of the fluid exchanger 70 can be adapted to communicate with a control unit of the base frame 5 to control pumps 58, 59 provided at the fluid tank 53 located at the base frame 5 as also shown in FIG. 36.

The fluid tanks 74,75 of the transport unit 3 and the fluid tanks 53 at the base frame 5 can comprise sensors adapted to measure a momentary filling level of the fluid tanks and/or a fluid temperature of a fluid contained in the respective fluid tanks. The filling levels and/or fluid temperature can be communicated to the fluid temperature control unit 50 of the base frame 5 and/or to the controller of the fluid exchanger 70.

In a possible embodiment, a fluid pump rate of the fluid pump 71 of the fluid exchanger 70 can be controlled by the controller of the fluid exchanger 70 depending on the measured filling levels of the fluid tanks of the transport unit 3 and/or the measured filling levels of the fluid tank 53 at the base frame 5. Further, the fluid pump 71 of the fluid exchanger 70 can also be controlled depending on the measured fluid temperatures of the fluid contained in the fluid tanks 74,75 of the transport unit 3 and/or the measured fluid temperature of the fluid contained in the fluid tank 53 or another tank at the base frame 5.

By provision of the fluid exchanger 70, it is possible to reduce the amount of heat that needs to be dissipated from the charging station 2. The reason behind this is that heat dissipation requires either large surfaces or forced airflow if no wastewater connection is available. However, a forced airflow creates acoustic noise which is incompatible since charging stations 2 of the distributed charging system 1 can also be required in areas with strict noise emission regulations, such as residential or mixed residential and commercial areas. The large surfaces can also not be achieved since for a mobile transportable charging station 2 they would impact its mobility. Further, space is a valuable commodity. Large surfaces at the housing of the transportable charging station 2 would increase the required space of the charging station on the platform of the transport unit 3.

The transport unit 3, in particular the transport truck 3 shown in FIG. 49, can exchange the portable charging stations 2 using its lifting mechanism 4. This lifting mechanism 4 can also be used to lift a fluid exchanger 70 onto the base frame 5 of the local power supply grid 7. The fluid exchanger 70 can fill a coolant tank connected to the base plate of the base frame 5 by use of coolant circulation heads contained in the base plate. The transport unit or transport truck 3 can ferry the warm coolant away to a central site where either acoustic noise emission requirements are lower (for example to an industrial site) or where space is less valuable (for example an out-of-town lot) where the coolant can be recooled.

The transport unit 3 or transport truck 3 can be equipped with a draining filling implement forming the fluid exchanger 70 and can share the top and bottom connections of the mobile charging station 2 but instead of battery packs and charging electronics does contain a fluid pump 71. In addition, the fluid exchanger 70 can be connected to coolant tanks on the transportation unit 3 with tubes that extend with the fluid exchanger 70 as also illustrated in FIG. 49.

The fluid exchanger 70 can be used by the transport unit 3 to seamlessly drain or fill coolant tanks located in or under the base frame 5. In a possible alternative embodiment, a fluid pump 71 in the fluid exchanger 70 can be replaced by an embodiment where a controller interfaces to the base plate and uses the fluid pumps implemented in the tank to drain or fill the coolant tank of the base frame 5.

The invention claimed is:

1. A high-power charging station used to exchange electrical power with a battery of an electrically powered vehicle by means of a power cable connecting the high-power charging station with the vehicle, the high-power charging station comprising:
    a DC/DC converter adapted to convert electrical DC power;
    electronic filters configured and operable to suppress unwanted frequencies generated by the DC/DC converter; and
    a control unit configured and operable to control the electronic filters to suppress unwanted frequencies.

2. The high-power charging station according to claim 1 wherein suppression of unwanted frequencies generated by the DC/DC converter by means of electronic filters is controlled by the control unit of the high-power charging station depending on electromagnetic requirements of the vehicle notified to the control unit.

3. The high-power charging station according to claim 1 wherein the high-power charging station further comprises:
    an AC/DC converter; and
    a grid connection interface to receive electrical AC power converted by the AC/DC converter into a DC power supplied to an input of the DC/DC converter of the high-power charging station.

4. The high-power charging station according to claim 3 wherein the DC/DC converter and the AC/DC converter of the high-power charging station include switching transistor components which during conversion operation generate switching frequencies and associated harmonic switching frequencies suppressed automatically by the electronic filters of the high-power charging station.

5. The high-power charging station according to claim 4 wherein the control unit of the high-power charging station is adapted to determine a charging current as the minimum of the vehicle's maximum charging current and the charging station's momentary maximum charging current and to control the suppression of unwanted frequencies generated by the switching transistor components of the DC/DC converters and/or by the switching transistor components of the AC/DC converter by means of the electronic filters with minimum electrical power losses on the basis of the determined charging current and on the basis of the received information concerning the electromagnetic protection requirements of the vehicle.

6. The high-power charging station according to claim 3 wherein the high-power charging station is connected via the grid connection interface to a local power supply grid or to a public power supply grid.

7. The high-power charging station according to claim 3 wherein a second controllable switch is provided to connect or to disconnect an output of the AC/DC converter connected in series with a second electronic filter to the grid connection interface from the input of the DC/DC converter.

8. The high-power charging station according to claim 3 wherein the high-power charging station is configured to be a transportable by a lifting mechanism of a transport unit on ground or placed on a base frame of a distributed charging system to establish electrical connection with a local power supply grid or with a public power supply grid via the grid connection interface of the high-power charging station.

9. The high-power charging station according to claim 1 wherein the high-power charging station is adapted to operate with a high exchanged electrical power of more than 500 kWatt.

10. The high-power charging station according to claim 1 wherein the control unit of the high-power charging station is adapted to communicate via a communication interface module with a controller of the electrically powered vehicle connected to a charging plug of the high-power charging station by means of the power cable for exchange of electrical power.

11. The high-power charging station according to claim 1 wherein the control unit of the high-power charging station is adapted to receive a power supply from a battery pack integrated in the high-power charging station or from an auxiliary battery integrated in the high-power charging station or attached to the high-power charging station or from a battery of a mobile device or from a battery of the vehicle connected to the high-power charging station.

12. The high-power charging station according to claim 1 wherein a first controllable switch is provided to switch the at least one battery pack of the high-power charging station either directly to an input of the DC/DC converter or indirectly via a power path including a further DC/DC converter connected in series with a first electronic filter of the high-power charging station.

13. The high-power charging station according to claim 9 wherein the controllable first, second and/or third switch are controlled by a control program executed on a processor of the control unit of the high-power charging station.

14. The high-power charging station according to claim 1 wherein a third controllable switch is provided to switch the output of the DC/DC converter either directly or indirectly via an electronic filter of a group of parallel electronic filters to a charging plug of the high-power charging station for connection via the power cable to the vehicle battery of the electrically powered vehicle.

15. The high-power charging station according to claim 1 wherein the control unit of the high-power charging station is adapted to receive, via a communication interface module, information concerning electromagnetic protection requirements of the vehicle and information concerning a maximum admissible charging current of the vehicle, from the controller of the electrically powered vehicle connected to the charging plug of the high-power charging station by means of the power cable, wherein the information concerning the electromagnetic protection requirements of the vehicle indicates required signal attenuations for specific frequency ranges and wherein the information concerning the vehicle's maximum admissible charging current indicates a maximum charging current amplitude to avoid overheating of the vehicle's power electronics and/or the vehicle's battery during the power exchange by means of the power cable.

16. The high-power charging station according to claim 15 wherein the vehicle's maximum charging current is calculated continuously by the controller of the vehicle based on sensor data provided by sensors of the vehicle and then communicated via the communication module to the control unit of the high-power charging station.

17. The high-power charging station according to claim 1 wherein the electronic filters used for suppression of unwanted frequencies comprise electronic power filters with components including coils, capacitors and resistors.

18. The high-power charging station according to claim 17 wherein the electronic power filters of the high-power power charging station comprise components having characteristics adjustable by the control unit of the high-power charging station.

19. A method for energy efficient suppression of electromagnetic disturbances caused by converters of a high-power charging station used to exchange electrical power with a battery of a vehicle or other mobile device connected to the high-power charging station, comprising controlling a suppression of unwanted frequencies generated by the converters by means of electronic filters by a control unit of the high-power charging station.

20. The method according to claim 19 wherein the suppression of unwanted frequencies generated by the converters by means of electronic filters is controlled by the control unit of the high-power charging station depending on electromagnetic protection requirements of the vehicle notified by a controller of the vehicle to the control unit of the high-power charging station.

* * * * *